(12) United States Patent
Aoki

(10) Patent No.: US 9,282,322 B2
(45) Date of Patent: Mar. 8, 2016

(54) IMAGE PROCESSING DEVICE, IMAGE PROCESSING METHOD, AND PROGRAM

(71) Applicant: SONY CORPORATION, Tokyo (JP)

(72) Inventor: Suguru Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 14/054,951

(22) Filed: Oct. 16, 2013

(65) Prior Publication Data

US 2014/0152663 A1 Jun. 5, 2014

(30) Foreign Application Priority Data

Dec. 3, 2012 (JP) ................................. 2012-264772

(51) Int. Cl.
*H04N 13/04* (2006.01)
(52) U.S. Cl.
CPC ....... *H04N 13/0404* (2013.01); *H04N 13/0475* (2013.01); *H04N 13/0477* (2013.01)
(58) Field of Classification Search
None
See application file for complete search history.

(56) References Cited

U.S. PATENT DOCUMENTS

| | | | | |
|---|---|---|---|---|
| 6,801,243 B1* | 10/2004 | Van Berkel | ..................... | 348/59 |
| 8,233,036 B2* | 7/2012 | Park | ................................ | 348/59 |
| 2009/0123030 A1* | 5/2009 | De La Barre et al. | ........ | 382/103 |
| 2012/0062556 A1* | 3/2012 | Yamamoto et al. | ........... | 345/419 |
| 2012/0249525 A1* | 10/2012 | Ahn et al. | ...................... | 345/419 |
| 2012/0257018 A1* | 10/2012 | Shigemura et al. | ............. | 348/46 |
| 2013/0088526 A1* | 4/2013 | Koito et al. | .................... | 345/690 |
| 2013/0114135 A1* | 5/2013 | Lin | ................................ | 359/464 |
| 2014/0028670 A1* | 1/2014 | Tsurumi et al. | ............... | 345/419 |
| 2014/0071255 A1* | 3/2014 | Okuyama | .............. | G03B 35/18 348/55 |
| 2014/0098201 A1* | 4/2014 | Park | ...................... | G09G 3/003 348/54 |
| 2014/0340746 A1* | 11/2014 | Watanabe | .............. | G09G 3/003 359/464 |

FOREIGN PATENT DOCUMENTS

| | | |
|---|---|---|
| JP | 03-040692 | 2/1991 |
| JP | 2003-107392 | 4/2003 |
| WO | WO/2012/161076 | * 11/2012 |

* cited by examiner

*Primary Examiner* — Ming Hon
*Assistant Examiner* — Phuc Doan
(74) *Attorney, Agent, or Firm* — Paratus Law Group, PLLC

(57) ABSTRACT

There is provided an image processing device including a phase calculation unit configured to calculate a phase of pixels of a 3D image projected onto a light shielding unit that limits a region seen by a left eye and a region seen by a right eye of the 3D image displayed on a display unit, and a blend processing unit configured to combine an image for the left eye with an image for the right eye for each pixel based on the phase calculated by the phase calculation unit, the image for the left eye and the image for the right eye being included in the 3D image.

8 Claims, 73 Drawing Sheets

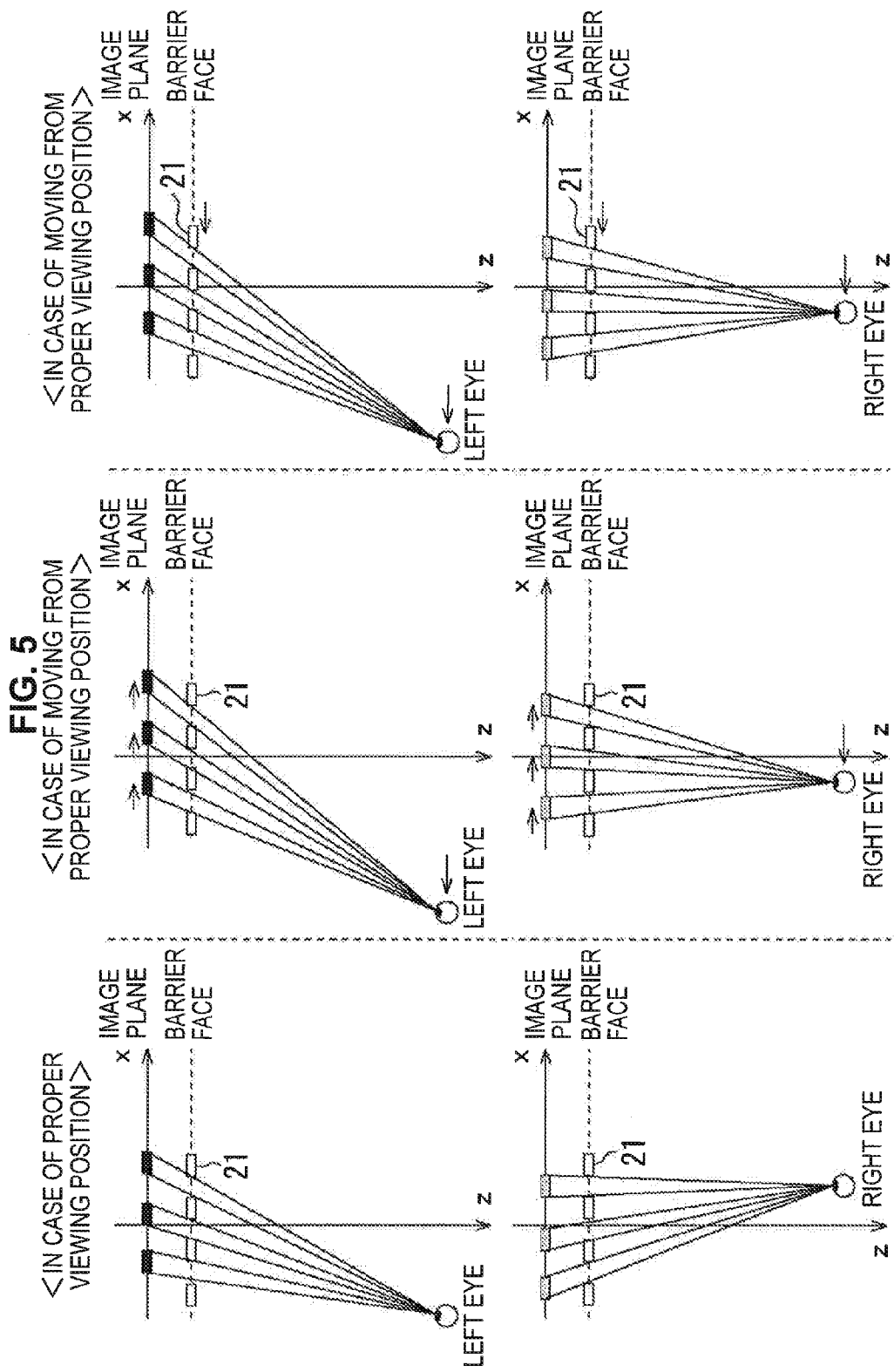

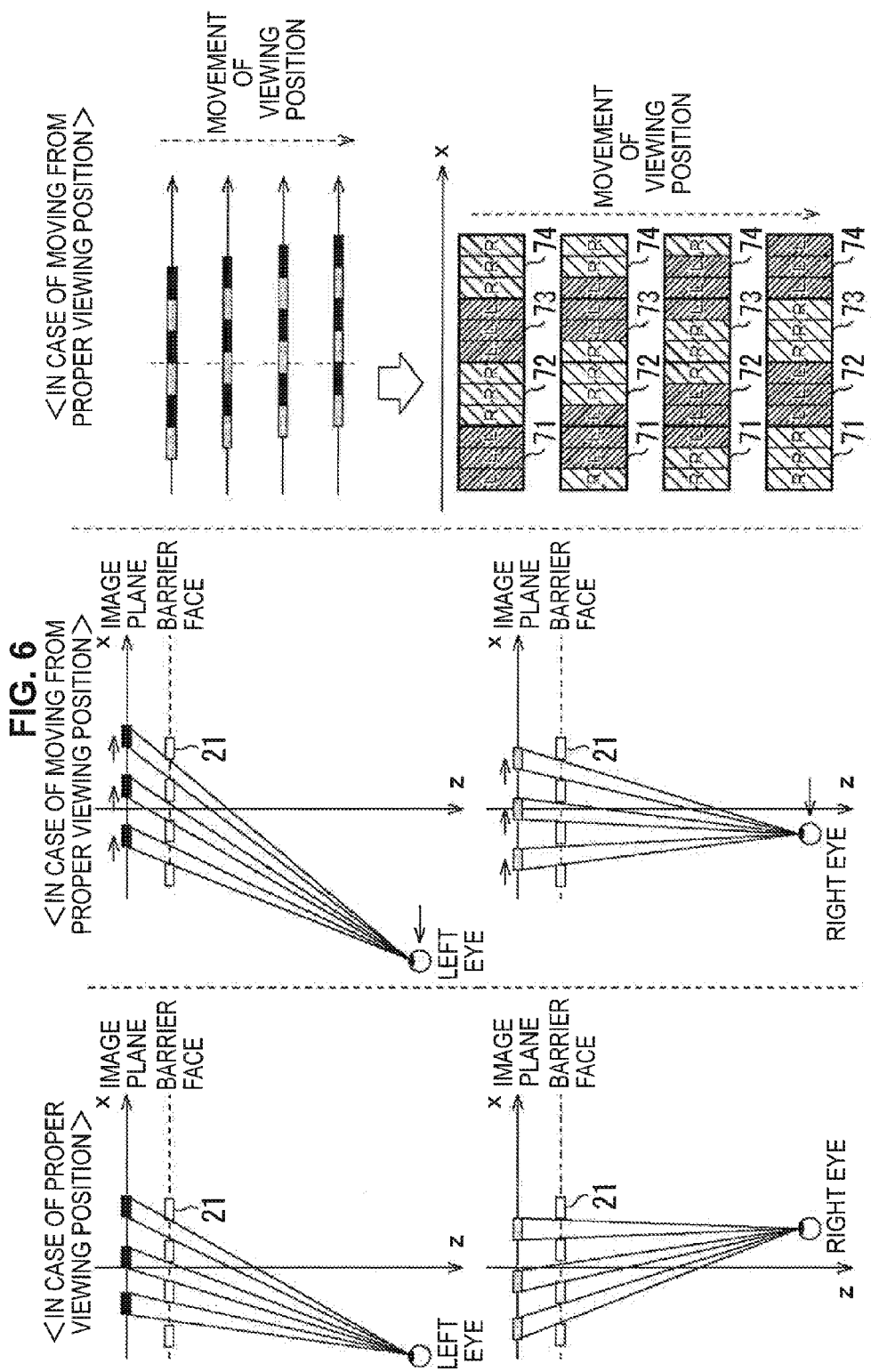

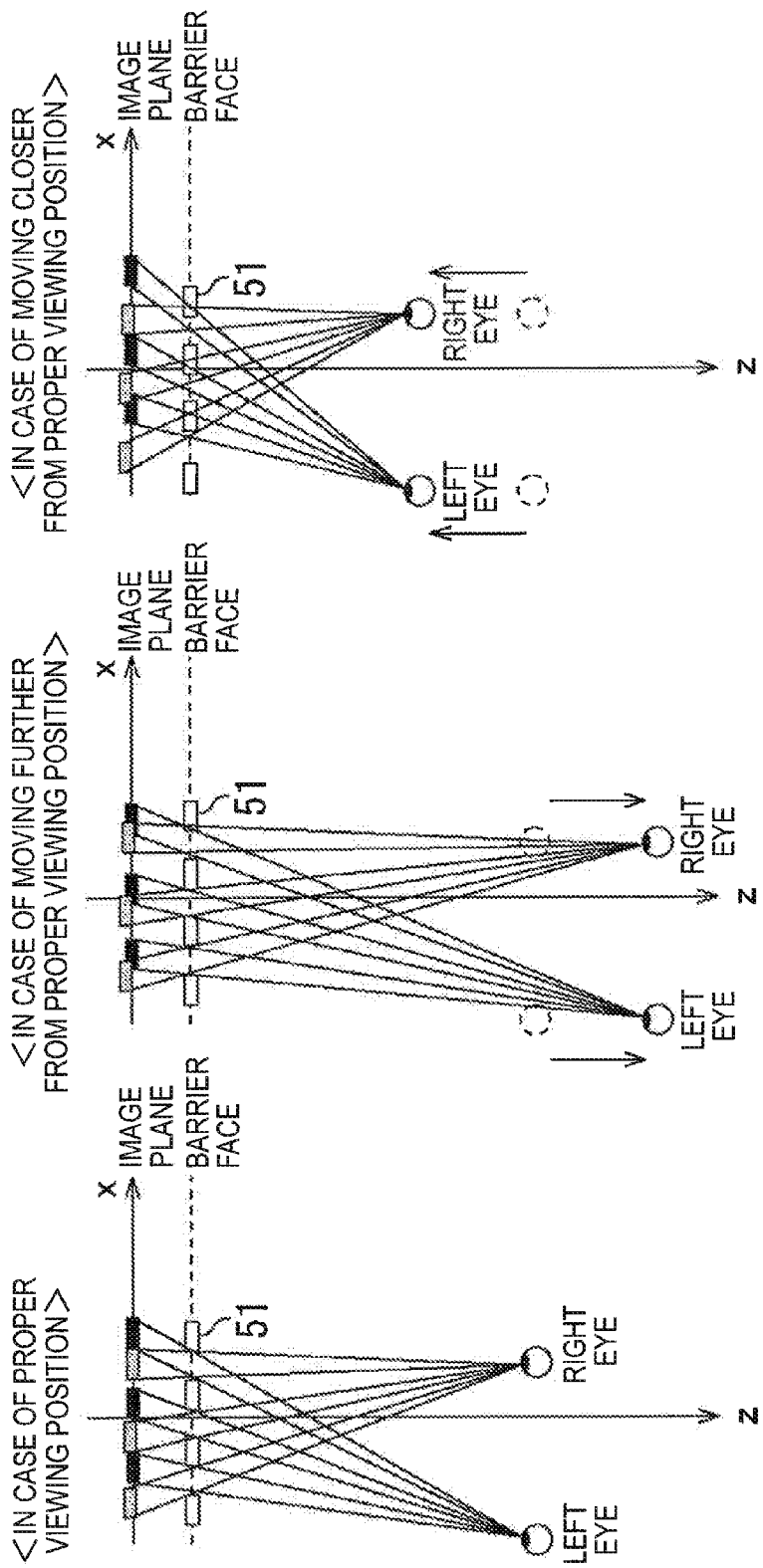

OVERLAPPING PIXELS GENERATED → CROSSTALK OCCURS

OVERLAPPING PIXELS GENERATED → CROSSTALK OCCURS

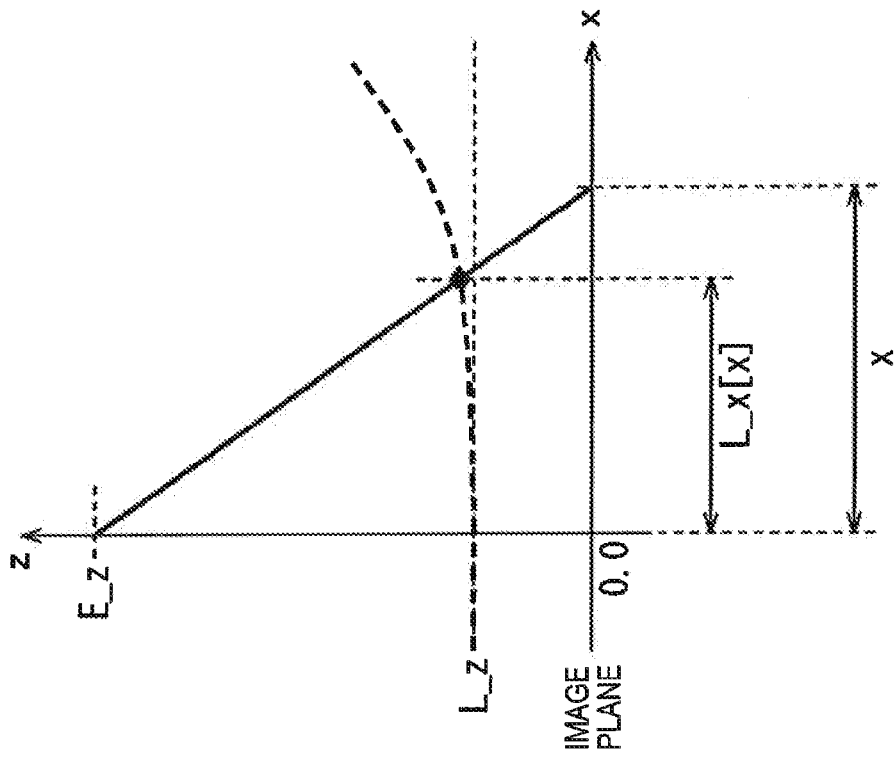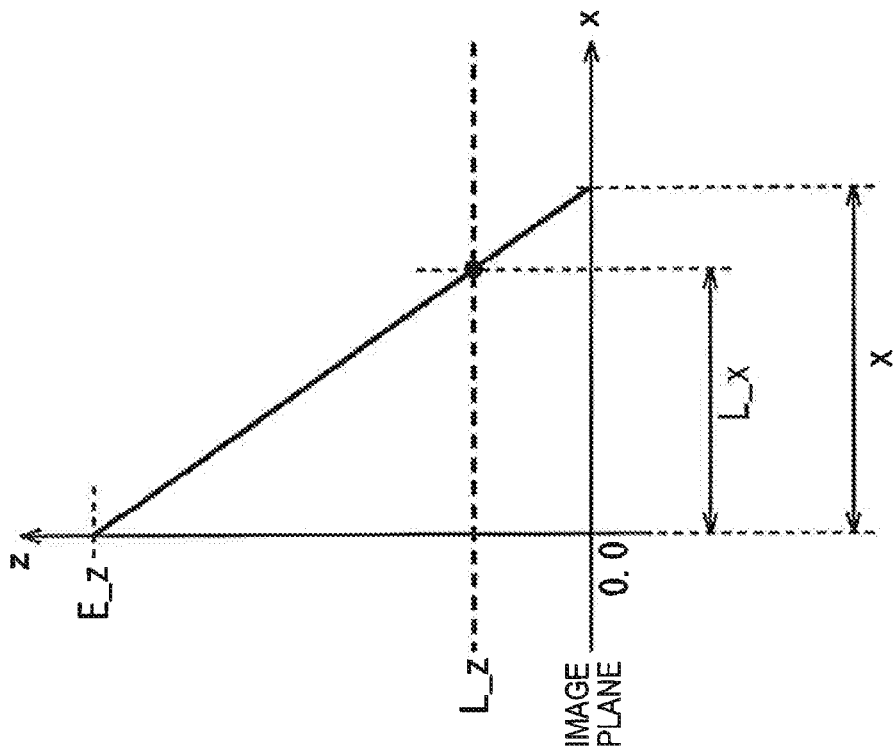

FIG. 34

| STATE | INNER SIDE | OUTER SIDE | EXAMPLE OF RELATIONSHIP BETWEEN PIXEL AND LENTICULAR LENS |
|---|---|---|---|
| OPTIMUM VIEWING POSITION (ACCURATE) | BOUNDARY | BOUNDARY | |
| WITHIN PROPER VIEWING POSITION | WITH MARGIN | WITH MARGIN | |
| WITHIN PROPER VIEWING POSITION | BOUNDARY | WITH MARGIN | |
| WITHIN PROPER VIEWING POSITION | WITH MARGIN | BOUNDARY | |
| OUT OF PROPER VIEWING POSITION | OVERLAP | OVERLAP | |
| OUT OF PROPER VIEWING POSITION | BOUNDARY | OVERLAP | |
| OUT OF PROPER VIEWING POSITION | OVERLAP | BOUNDARY | |
| OUT OF PROPER VIEWING POSITION | WITH MARGIN | OVERLAP | |
| OUT OF PROPER VIEWING POSITION | OVERLAP | WITH MARGIN | |

FIG. 39
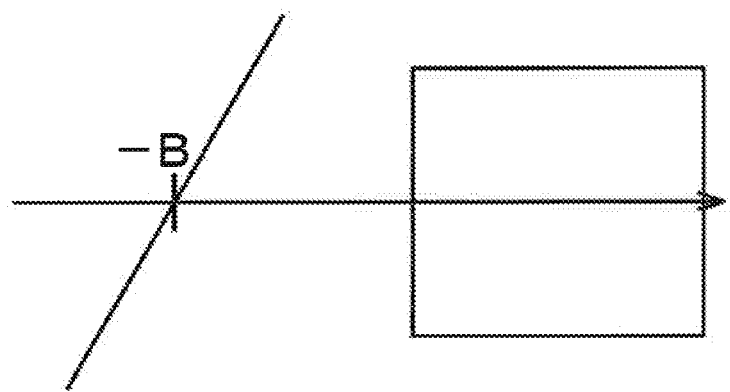
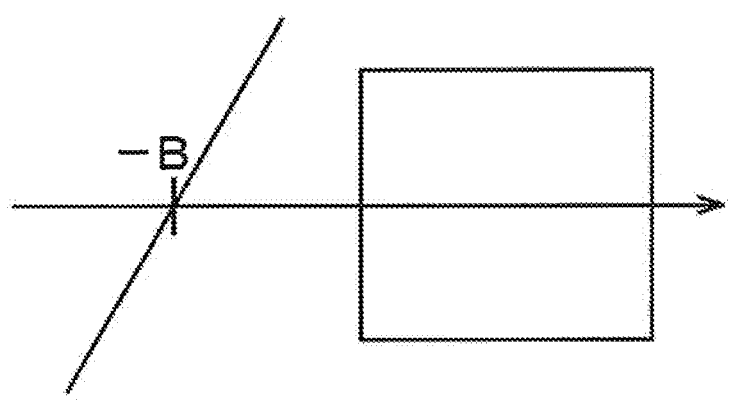
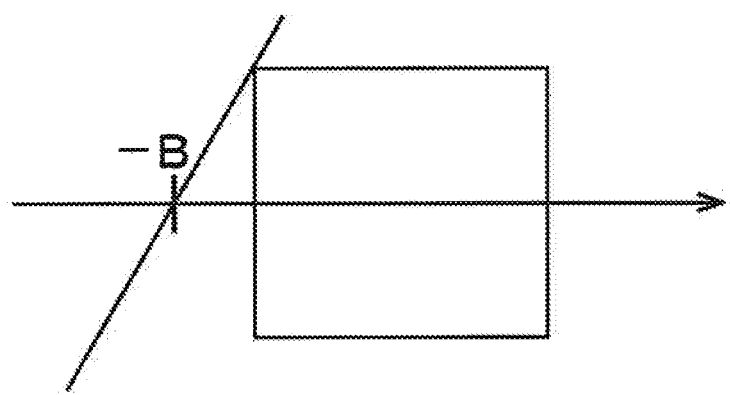

FIG. 41
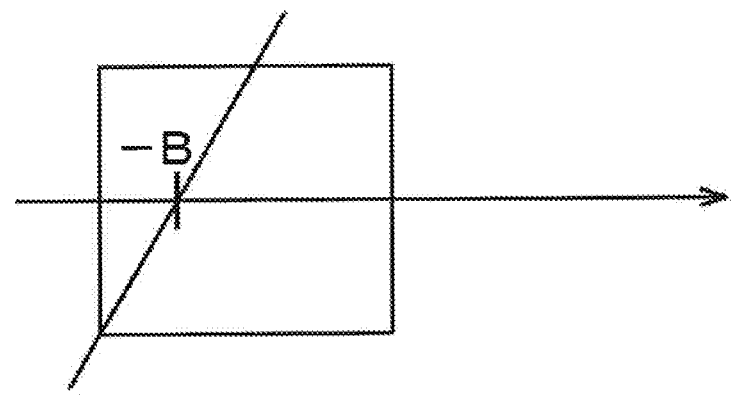
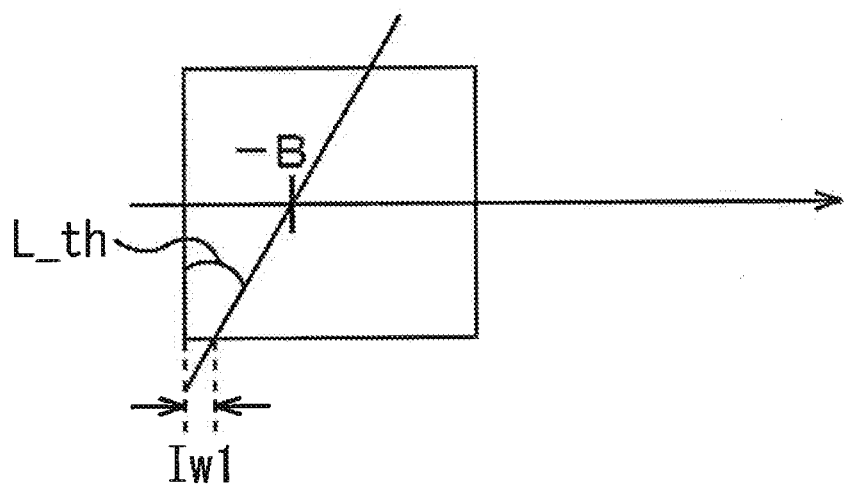
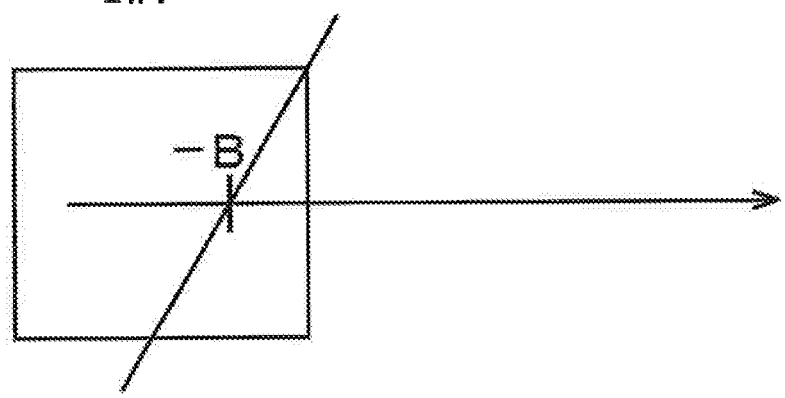

FIG. 42
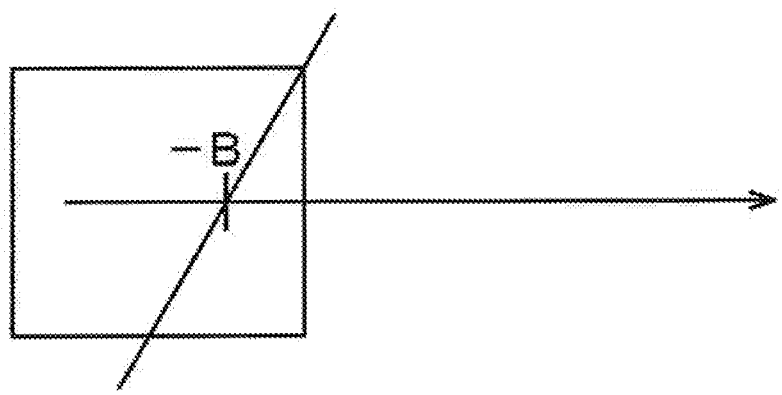
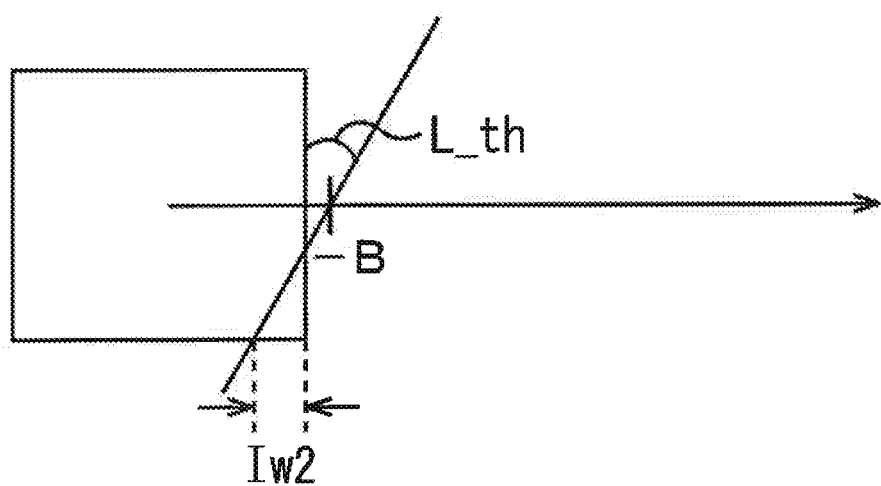
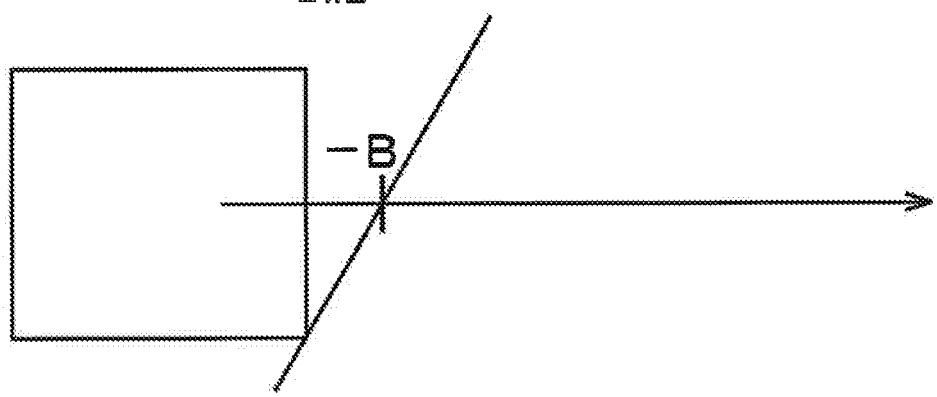

FIG.43
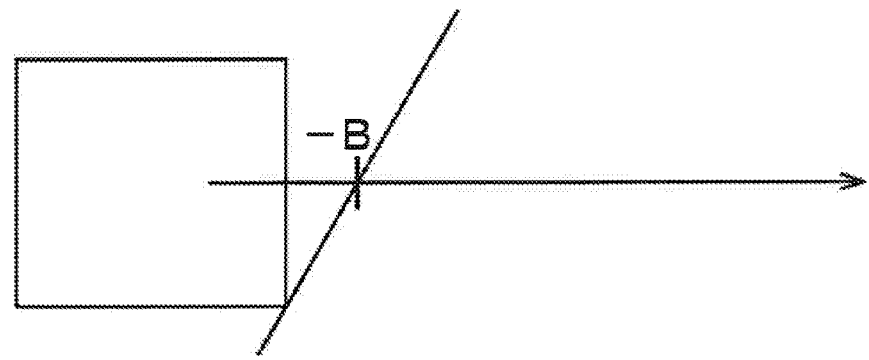
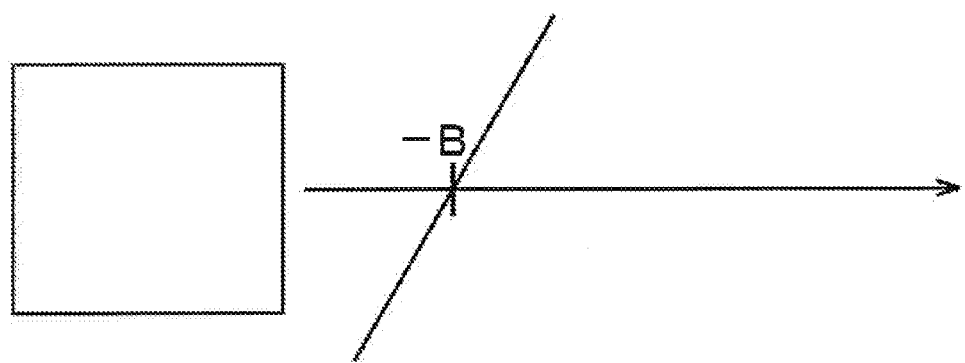
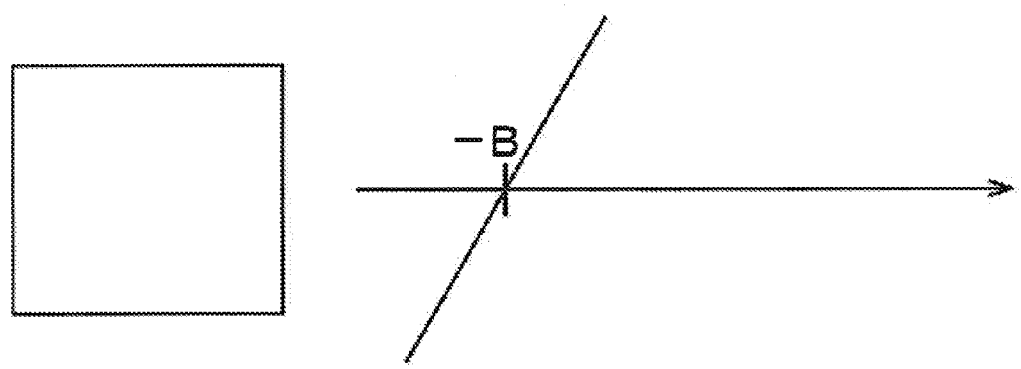

FIG. 45
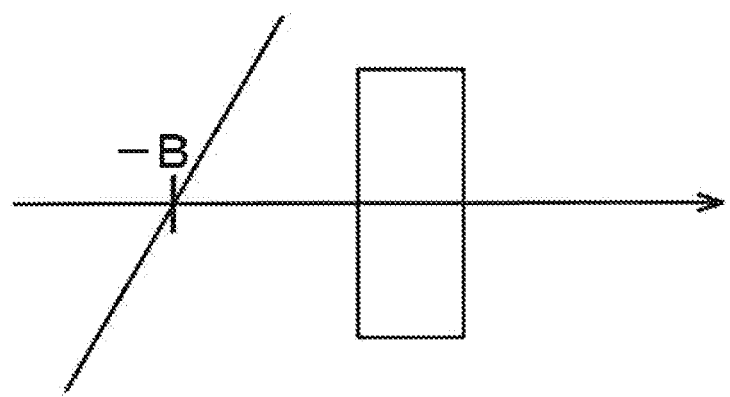
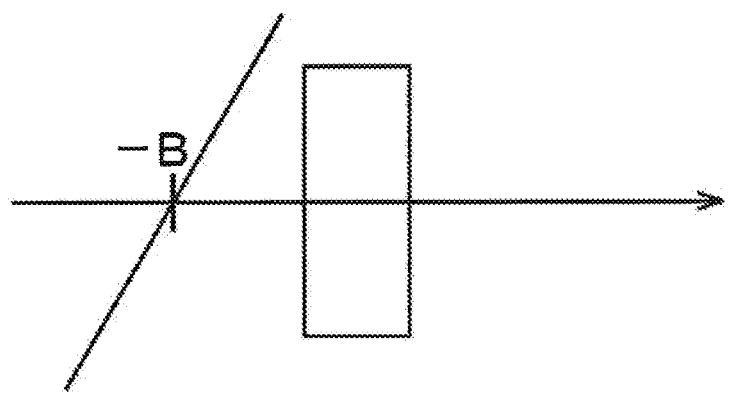
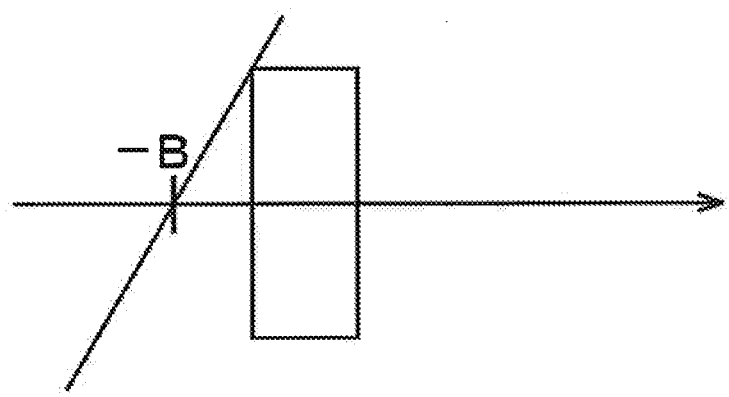

FIG. 46
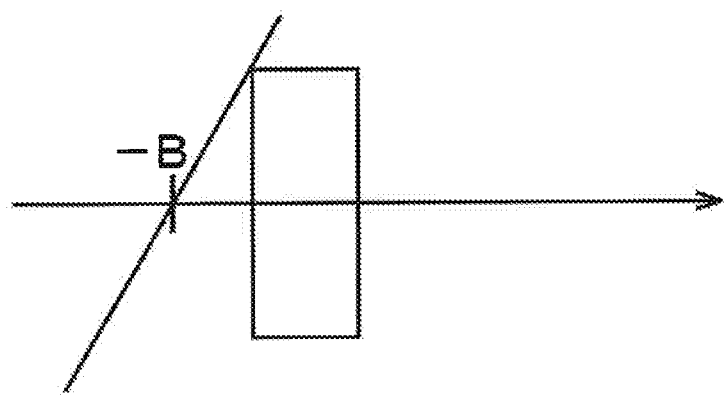
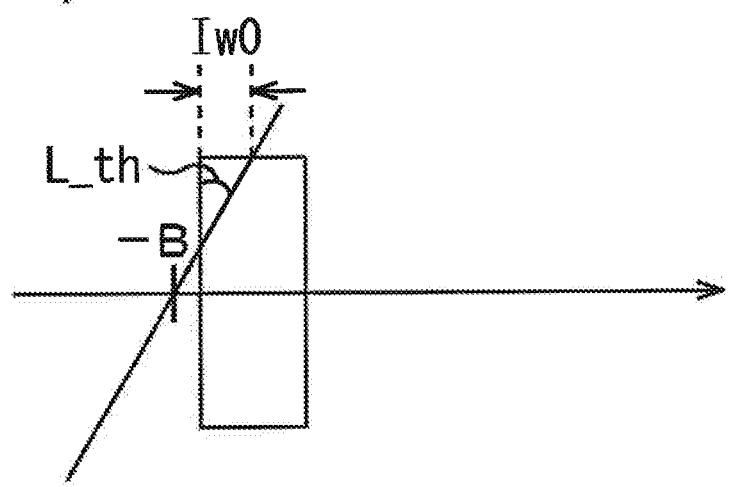
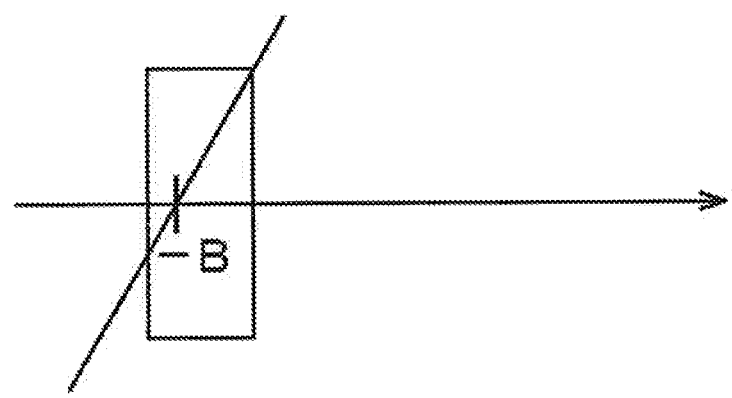

FIG. 48
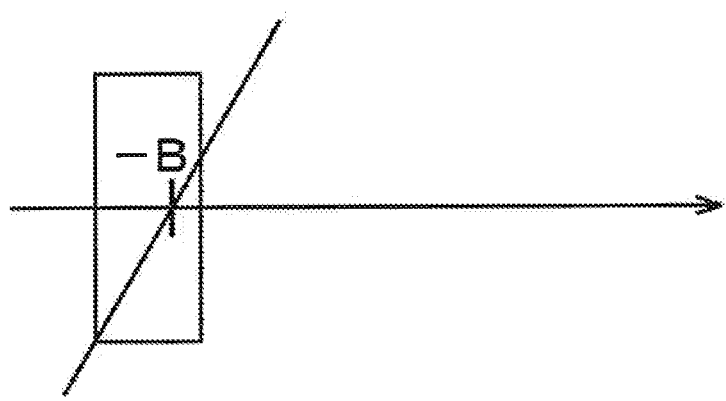
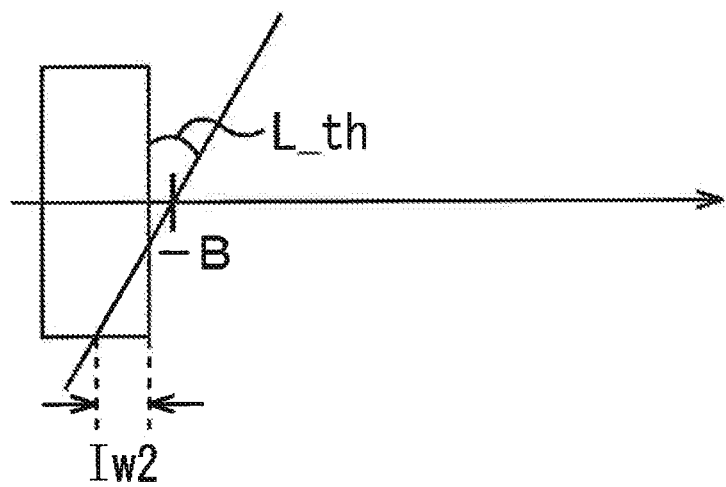
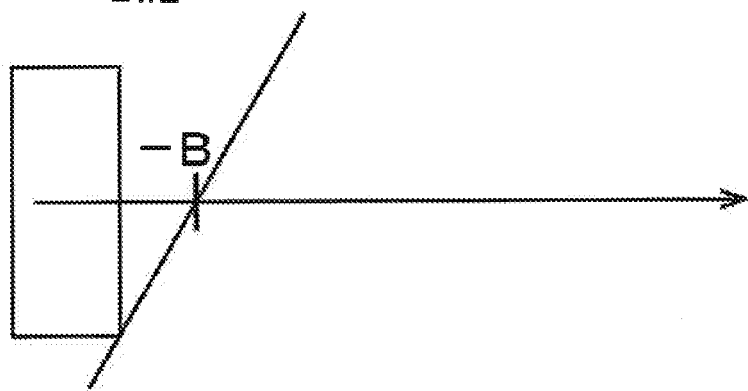

FIG. 49
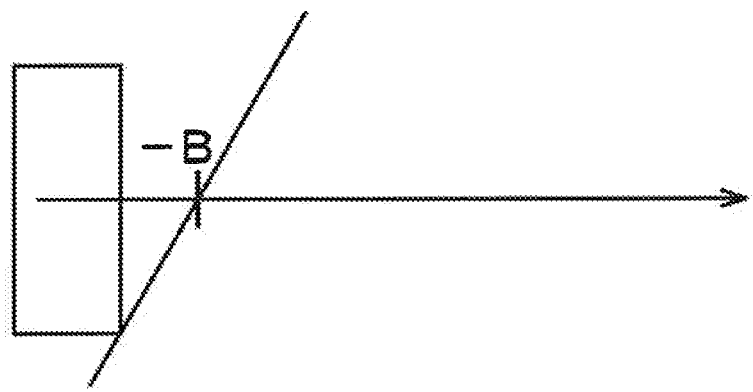
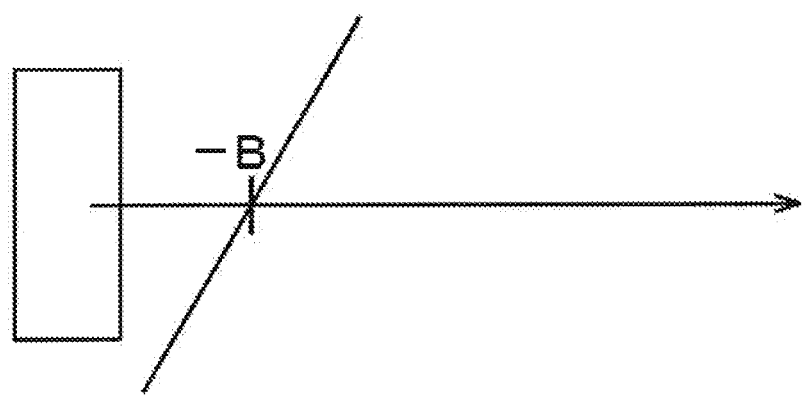
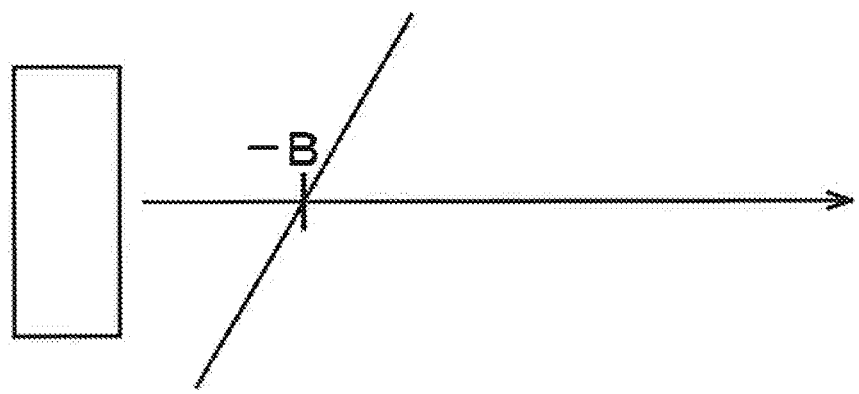

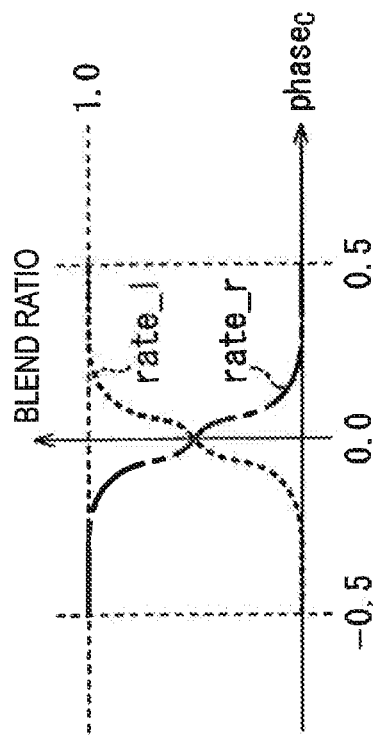
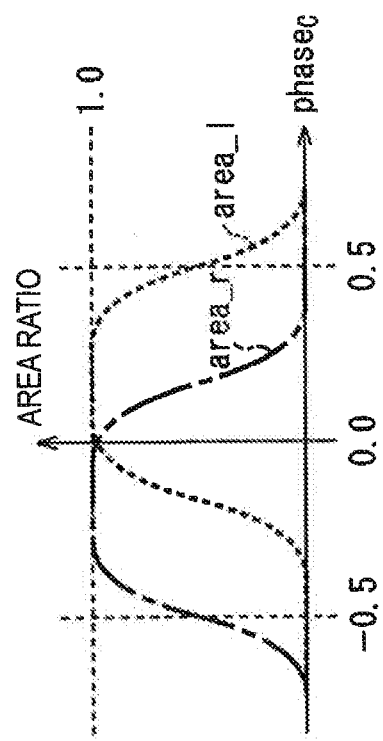

FIG. 52
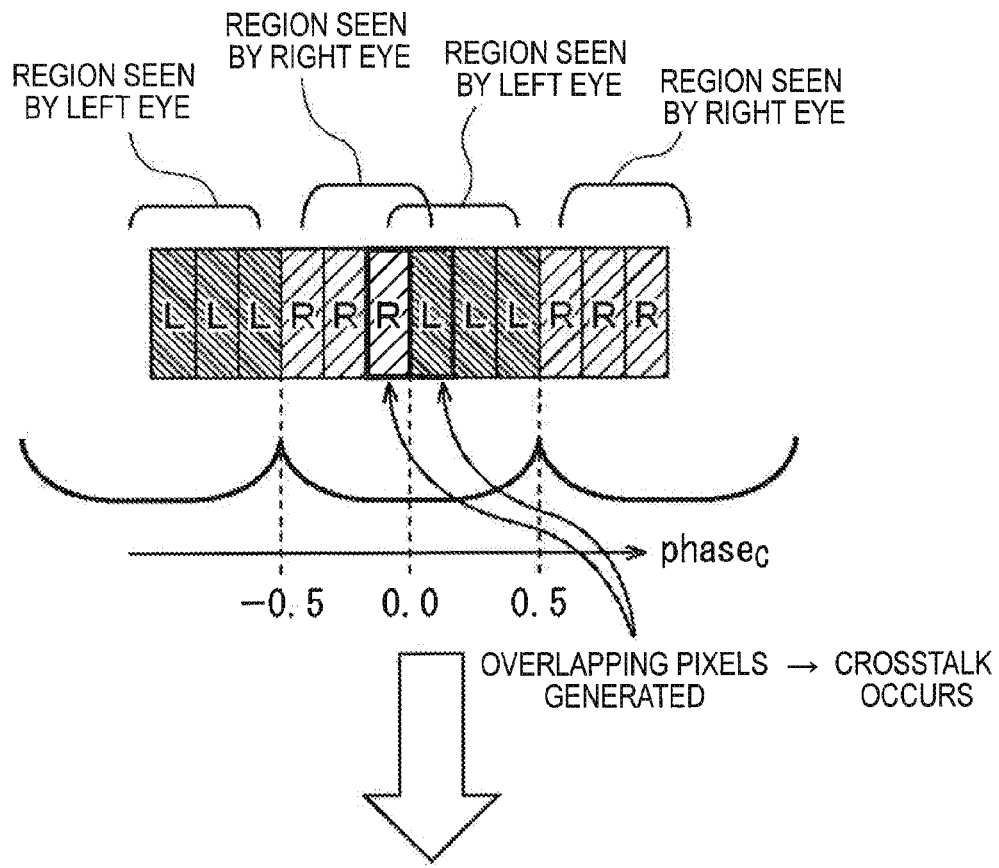
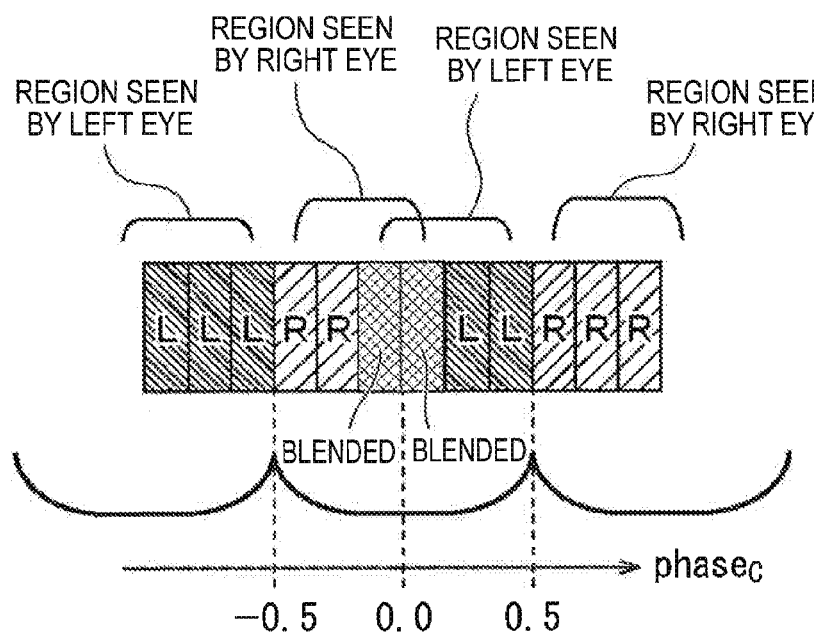

FIG. 57A BLEND AT AREA RATIO

FIG. 57B PIXELS OBSERVED WITH LEFT AND RIGHT EYES WHEN IMAGE IS ENLARGED BY FACTOR OF TWO
< RIGHT EYE >
< LEFT EYE >

FIG. 57C CONVERT INTO SUBJECTIVITY AMOUNT PER SUB PIXEL WITHOUT CONSIDERING CHARACTERISTIC OF VISION
< RIGHT EYE >
< LEFT EYE >

FIG. 57D CONVERT INTO SUBJECTIVITY AMOUNT PER SUB PIXEL CONSIDERING CHARACTERISTIC OF VISION (ACTUALLY OBSERVED LEVEL)
< RIGHT EYE >
< LEFT EYE >

FIG. 66
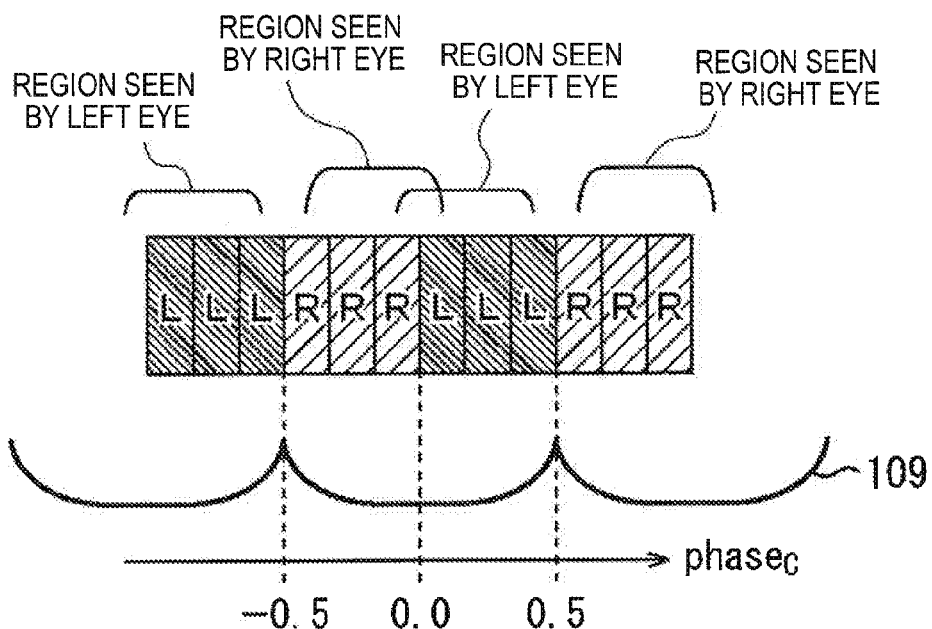
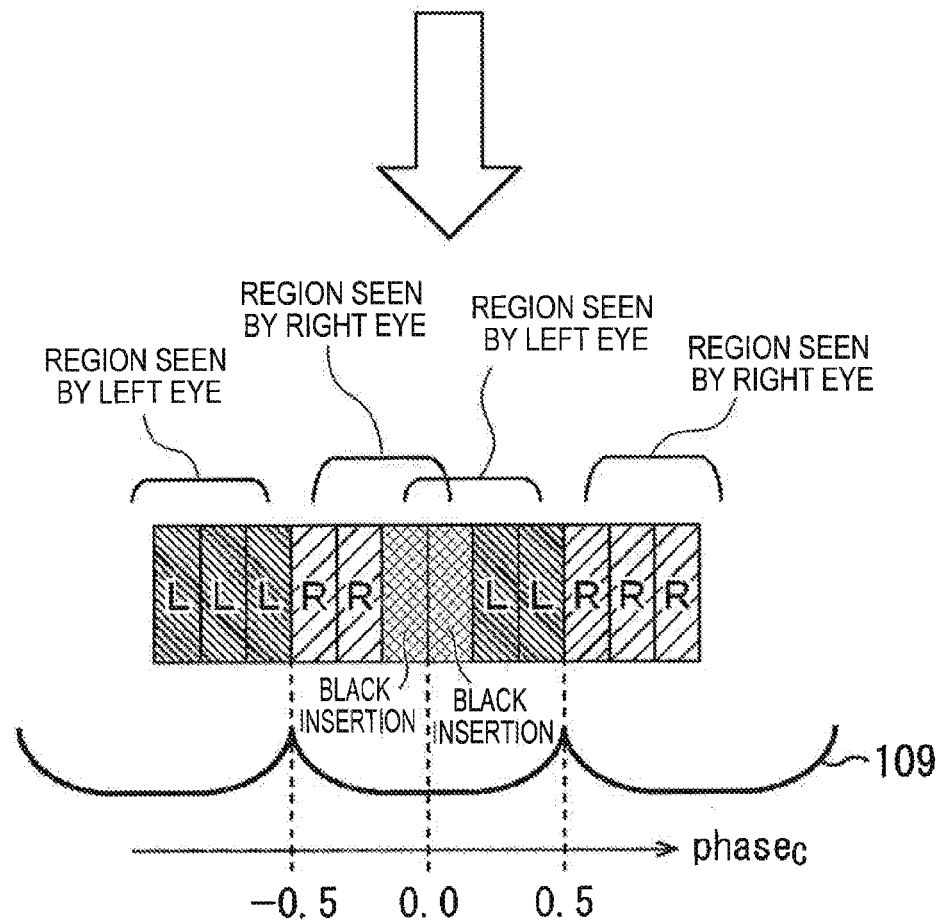

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2012-264772 filed Dec. 3, 2012, the entire contents of which are incorporated herein by reference.

BACKGROUND

The present technology relates to an image processing device, an image processing method, and a program, and particularly to an image processing device, an image processing method, and a program which enable 3D images with high image quality that do not include conspicuous crosstalk to be easily displayed.

There are display devices that provide 3D images to viewers who do not wear 3D glasses (hereinafter referred to as "glasses-free display devices") by showing, among 3D images displayed on displays, images for the left eye to the left eye of a viewer and showing images for the right eye to the right eye of the viewer. As glasses-free 3D display devices, there are lenticular type display devices, each of which includes a display to which a sheet-like lenticular lens is attached, and barrier type display devices, each of which includes a display provided with a light shielding barrier on the surface thereof.

FIG. 1 is a diagram illustrating an example of a configuration of a display of a lenticular type display device.

As illustrated in FIG. 1, in the lenticular type display device 10, a sheet-like lenticular lens 12 is attached to the surface of the display 11. In the example of FIG. 1, the lenticular lens 12 is attached to the display 11 in an oblique direction.

FIG. 2 is a diagram for describing a way of viewing an image displayed on the display 11 from a proper viewing position.

As illustrated in FIG. 2, in the lenticular type display device 10, a region on the display 11 seen by the left eye of a viewer and another region on the display 11 seen by the right eye of the viewer are limited by the lenticular lens 12. To be specific, when a viewer sees an image displayed on the display 11 from a proper viewing position, the region on the display 11 seen by the left eye and the region thereon seen by the right eye are not superimposed, but are presented in an alternating manner.

FIG. 3 is a diagram for describing a way of viewing an image displayed on a display of a barrier type display device from a proper viewing position.

As illustrated in FIG. 3, in the barrier type display device, a region seen by the left eye of a viewer and another region seen by the right eye of the viewer are limited by a light shielding barrier 21. To be specific, as in the case of the lenticular type display device 10, when a viewer sees an image displayed on the display from the proper viewing position, the region seen by the left eye and the region seen by the right eye on the display are not superimposed, but are presented in an alternating manner.

As described above, in a glasses-free 3D display device, when a viewer sees an image displayed on a display from a proper viewing position, the region seen by the left eye and the region seen by the right eye on the display are not superimposed, but are presented in an alternating manner.

Thus, as illustrated in FIG. 4, a display of a glasses-free 3D display device alternately displays images for the right eye 31 and images for the left eye 32 corresponding to the region seen by the right eye and the region seen by the left eye.

Accordingly, a viewer can only see the images for the left eye with his or her left eye and the images for the right eye with his or her right eye. As a result, a 3D image can be seen. Note that, in the example of FIG. 4, the images for the right eye 31 are white, and the images for the left eye 32 are black.

However, when a viewer sees the images from a position other than the proper viewing position, there are cases in which crosstalk or reverse view occurs.

Thus, as illustrated in FIG. 5, a method for physically controlling the position of lenticular lens or a light shielding barrier according to changes of a viewing position has been devised (for example, refer to Japanese Unexamined Patent Application Publication No. 2003-107392).

To be specific, when a viewer moves to the left side from a proper viewing position facing a screen, for example, regions seen by the left eye and regions seen by the right eye move in the positive direction of the x axis in the drawing as illustrated in FIG. 5. Thus, in such a case, a glasses-free 3D display device returns the regions seen by the left eye and the regions seen by the right eye in the negative direction of the x axis by moving a light shielding barrier 21 in the negative direction of the x axis. Note that, in the present specification, an axis having a scanning direction of a screen as the positive direction is set to be the x axis unless specified otherwise.

In addition, as illustrated in FIG. 6, a method for changing display positions of images for the left eye and images for the right eye according to changes of a viewing position has been devised (for example, refer to Japanese Unexamined Patent Application Publication No. 2003-107392 and No. H03-040692).

To be specific, when a viewer moves to the left side from a proper viewing position facing a screen, for example, regions seen by the left eye and regions seen by the right eye move to the positive direction of the x axis in the drawing as illustrated in FIG. 6. Thus, in such a case, a glasses-free 3D display device moves the display positions of images for the left eye and images for the right eye to the positive direction of the x axis.

For example, it is assumed that, when a viewer is located in the proper viewing position, an image for the left eye, an image for the right eye, an image for the left eye, and an image for the right eye are allocated to four pixels 71 to 74, each of which includes three sub pixels in that order in the positive direction of the x axis, as illustrated in FIG. 6. In this case, when the viewer moves to the left side from the proper viewing position facing the screen, the glasses-free 3D display device moves display positions of the images for the left eye and the images for the right eye to the left side by, for example, one sub pixel.

In addition, when the viewer further moves to the left side from the proper viewing position facing the screen, the glasses-free 3D display device further moves the display positions of the images for the left eye and the images for the right eye to the left side by, for example, one sub pixel. Then, when the viewer further moves to the left side from the proper viewing position facing the screen, the glasses-free 3D display device further moves the display positions of the images for the left eye and the images for the right eye to the left side by, for example, one sub pixel.

SUMMARY

However, in the method for physically controlling the position of the lenticular lens or the light shielding barrier according to changes of a viewing position, a special control device is necessary.

In addition, in the method for changing display positions of images for the left eye and images for the right eye according to changes of a viewing position, crosstalk may occur.

In other words, since the size of a sub pixel is limited, there are cases in which one sub pixel is seen by the left and right eyes depending on a viewing position. To be specific, as illustrated in FIG. 7A, when a boundary of sub pixels matches the boundary of a region seen by the left eye and a region seen by the right eye, crosstalk does not occur.

However, when the lenticular lenses 12 are attached to the display 11 in the vertical direction thereto and the boundaries of regions seen by the left eye and regions seen by the right eye are present within sub pixels as illustrated in FIG. 7B, sub pixels seen by both of the left and right eyes (hereinafter referred to as overlapping pixels) are generated, and accordingly, crosstalk occurs. In addition, when the lenticular lenses 12 are attached to the display 11 in an oblique direction as illustrated in FIG. 1, overlapping pixels are generated on the boundaries of the lenticular lenses 12, and accordingly crosstalk occurs.

In addition, when a proper viewing position and a viewing position are different from each other in the depth direction, overlapping pixels are generated. To be specific, when the viewing position is set to be further from a screen than the proper viewing position in the depth direction as illustrated in FIG. 8, ends of regions seen by the right eye in the positive direction of the x axis overlap ends of regions seen by the left eye in the negative direction of the x axis. On the other hand, when the viewing position is set to be closer to the screen than the proper viewing position in the depth direction, ends of the regions seen by the right eye in the negative direction of the x axis overlap ends of the regions seen by the left eye in the positive direction of the x axis.

Thus, when a viewer is located in the proper viewing position as illustrated in FIG. 9A, overlapping pixels are not generated, but when the viewing position is set to be further from the screen than the proper viewing position in the depth direction, for example, a sub pixel at an end of a region in the positive direction of the x axis to which an image for the right eye is allocated and a sub pixel at an end of a region in the negative direction of the x axis to which an image for the left eye is allocated become overlapping pixels as illustrated in FIG. 9B.

In addition, when the viewing position is set to be closer to the screen than the proper viewing position in the depth direction, for example, a sub pixel at an end of a region in the positive direction of the x axis to which an image for the left eye is allocated and a sub pixel at an end of a region in the negative direction of the x axis to which an image for the right eye is allocated become overlapping pixels as illustrated in FIG. 9C.

Therefore, easily displaying 3D images with high image quality that do not include conspicuous crosstalk becomes difficult.

It is desirable to enable 3D images with high image quality that do not include conspicuous crosstalk to be displayed with ease.

According to an embodiment of the present technology, there is provided an image processing device including a phase calculation unit configured to calculate a phase of pixels of a 3D image projected onto a light shielding unit that limits a region seen by a left eye and a region seen by a right eye of the 3D image displayed on a display unit, and a blend processing unit configured to combine an image for the left eye with an image for the right eye for each pixel based on the phase calculated by the phase calculation unit, the image for the left eye and the image for the right eye being included in the 3D image.

An image processing method and a program according to an embodiment of the present technology correspond to an image processing device according to an embodiment of the present technology.

According to an embodiment of the present technology, a phase of each pixel of a 3D image projected onto a light shielding unit that limits a region seen by the left eye and a region seen by the right eye of the 3D image displayed on a display unit is calculated, a blend ratio of an image for the left eye and an image for the right eye included in the 3D image is calculated for each pixel based on the phase, and the image for the left eye and the image for the right eye are combined for each pixel based on the blend ratio.

According to an embodiment of the present technology, it is possible to display 3D images with high image quality that do not include conspicuous crosstalk with ease.

BRIEF DESCRIPTION OF THE DRAWINGS

FIG. 5 is a diagram for describing an example of a method for controlling the position of a lenticular lens or a light shielding barrier;

FIG. 6 is a diagram for describing an example of a method for changing display positions of an image for the left eye and an image for the right eye;

FIG. 8 is a diagram for describing changes of regions seen by the left eye and regions seen by the right eye according to viewing positions;

FIGS. 14A and 14B are graphs on which a z coordinate $L\_z$ of the lenticular lens is plotted;

FIG. 34 is a table for describing changes of a region seen by the left eye and a region seen by the right eye according to viewing positions;

FIG. 39 is a diagram illustrating an area ratio of a region seen by the right eye in a sub pixel under a first condition of FIG. 38;

FIG. 41 is a diagram illustrating an area ratio of the region seen by the right eye in the sub pixel under a third condition of FIG. 38;

FIG. 42 is a diagram illustrating an area ratio of the region seen by the right eye in the sub pixel under a fourth condition of FIG. 38;

FIG. 43 is a diagram illustrating an area ratio of the region seen by the right eye in the sub pixel under a fifth condition of FIG. 38;

FIG. 45 is a diagram illustrating an area ratio of a region seen by the right eye in a sub pixel under a first condition of FIG. 44;

FIG. 46 is a diagram illustrating an area ratio of the region seen by the right eye in the sub pixel under a second condition of FIG. 44;

FIG. 48 is a diagram illustrating an area ratio of the region seen by the right eye in the sub pixel under a fourth condition of FIG. 44;

FIG. 49 is a diagram illustrating an area ratio of the region seen by the right eye in the sub pixel under a fifth condition of FIG. 44;

FIGS. 51A and 51B are diagrams illustrating an example of the relationship between an area ratio area_l and a blend ratio of an image for the left eye and an area ratio area_r and a blend ratio of an image for the right eye;

FIG. 52 is a diagram for describing a combined image based on the blend ratios of FIG. 51;

FIGS. 57A to 57D are diagrams illustrating an example of a subjectivity amount of a 3D image;

FIG. 66 is a diagram illustrating overlapping pixels generated only when a phase is around 0;

DETAILED DESCRIPTION OF THE EMBODIMENT(S)

Figure 1:
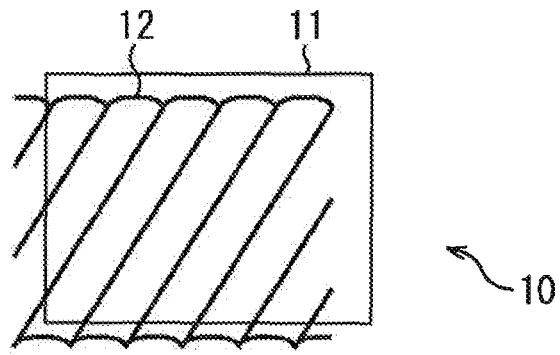
FIG. 1 is a diagram illustrating an example of a configuration of a display of a lenticular type display device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

First Embodiment

<Configuration example of a first embodiment of an image processing device>

Figure 10:
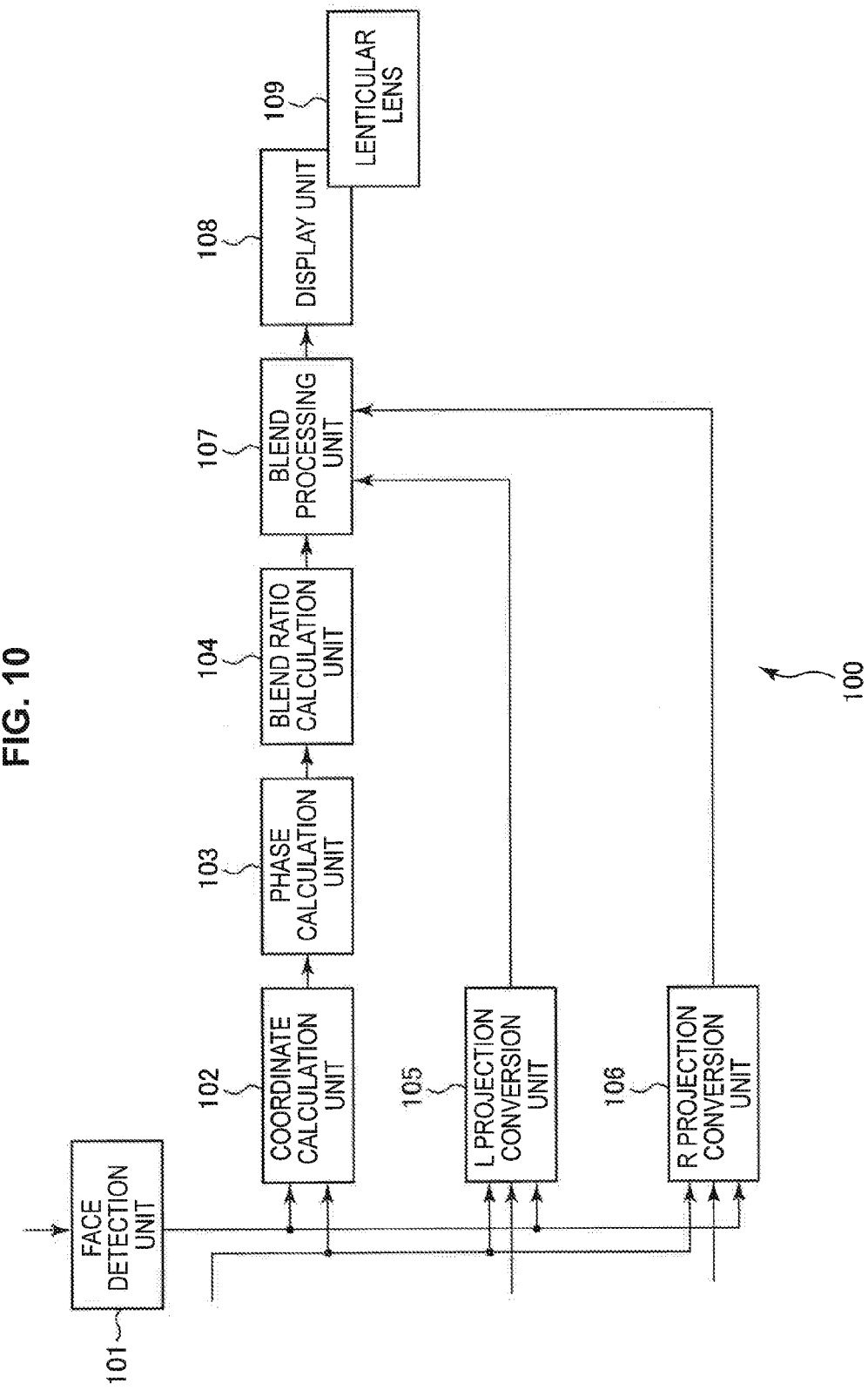
FIG. 10 is a block diagram illustrating a configuration example of a first embodiment of an image processing device to which the present technology is applied.

FIG. 10 is a block diagram illustrating a configuration example of a first embodiment of an image processing device to which the present technology is applied.

The image processing device 100 of FIG. 10 is configured to have a face detection unit 101, a coordinate calculation unit 102, a phase calculation unit 103, a blend ratio calculation unit 104, an L projection conversion unit 105, an R projection conversion unit 106, a blend processing unit 107, and a display unit 108 to which a lenticular lens 109 is attached. The image processing device 100 displays images for the left eye and images for the right eye in a mixed manner based on a viewing position of a viewer.

To be specific, the face detection unit 101 of the image processing device 100 images the viewer and thereby acquires an image of the viewer. The face detection unit 101 detects a face image from the image of the viewer, and detects the position of the middle of the eyebrows from the face image. The face detection unit 101 supplies the position of the middle of the eyebrows to the coordinate calculation unit 102, the L projection conversion unit 105, and the R projection conversion unit 106.

Note that the face detection unit 101 may obtain the position of the center of balance of the face image as the position of the middle of the eyebrows. In addition, the face detection unit 101 may detect the positions of the left eye and the right eye from the face image, and then recognize the center of the positions as the position of the middle of the eyebrows.

The coordinate calculation unit 102 calculates the coordinates of each sub pixel on the lenticular lens 109 having the position of the middle of the eyebrows as a reference based on the position of the middle of the eyebrows supplied from the face detection unit 101 and the coordinates of each sub pixel on a screen input from outside, and supplies the calculated coordinates to the phase calculation unit 103.

The phase calculation unit 103 calculates a phase of each sub pixel on the lenticular lens 109 having the position of the middle of the eyebrows as a reference based on the coordinates of each sub pixel supplied from the coordinate calculation unit 102, and then supplies the phase to the blend ratio calculation unit 104

The blend ratio calculation unit 104 decides a blend ratio of an image for the left eye and an image for the right eye of each sub pixel based on the phase of each sub pixel supplied from the phase calculation unit 103, and supplies the ratio to the blend processing unit 107.

The L projection conversion unit 105 acquires images for the left eye input from the outside. The L projection conversion unit 105 performs projection conversion on the images for the left eye based on the position of the middle of the eyebrows supplied from the face detection unit 101 and the coordinates of each sub pixel on the screen input from the outside. The L projection conversion unit 105 supplies the images for the left eye that have undergone the projection conversion to the blend processing unit 107.

The R projection conversion unit 106 acquires images for the right eye input from the outside. The R projection conversion unit 106 performs projection conversion on the images for the right eye based on the position of the middle of the eyebrows supplied from the face detection unit 101 and the coordinates of each sub pixel on the screen input from the outside. The R projection conversion unit 106 supplies the images for the right eye that have undergone the projection conversion to the blend processing unit 107.

The blend processing unit 107 combines the images for the left eye from the L projection conversion unit 105 and the images for the right eye from the R projection conversion unit 106 for each sub pixel based on the blend ratio of each sub pixel supplied from the blend ratio calculation unit 104. The blend processing unit 107 supplies the combined images of each sub pixel to the display unit 108 as 3D images, and thereby the 3D images are displayed.

The display unit 108 displays the 3D images supplied from the blend processing unit 107. In addition, the lenticular lens 109 is attached to the display unit 108 in an oblique direction with respect to the display unit 108. The lenticular lens 109 functions as a light shielding unit that limits regions of the 3D images seen by the left eye and regions thereof seen by the right eye displayed on the display unit 108. A viewer can see the 3D images displayed on the display unit 108 in a stereoscopic manner by viewing through the lenticular lens 109.

<First Example of Calculation of Coordinates of Each Sub Pixel on the Lenticular Lens Having the Position of the Middle of the Eyebrows as a Reference>

Figure 11:
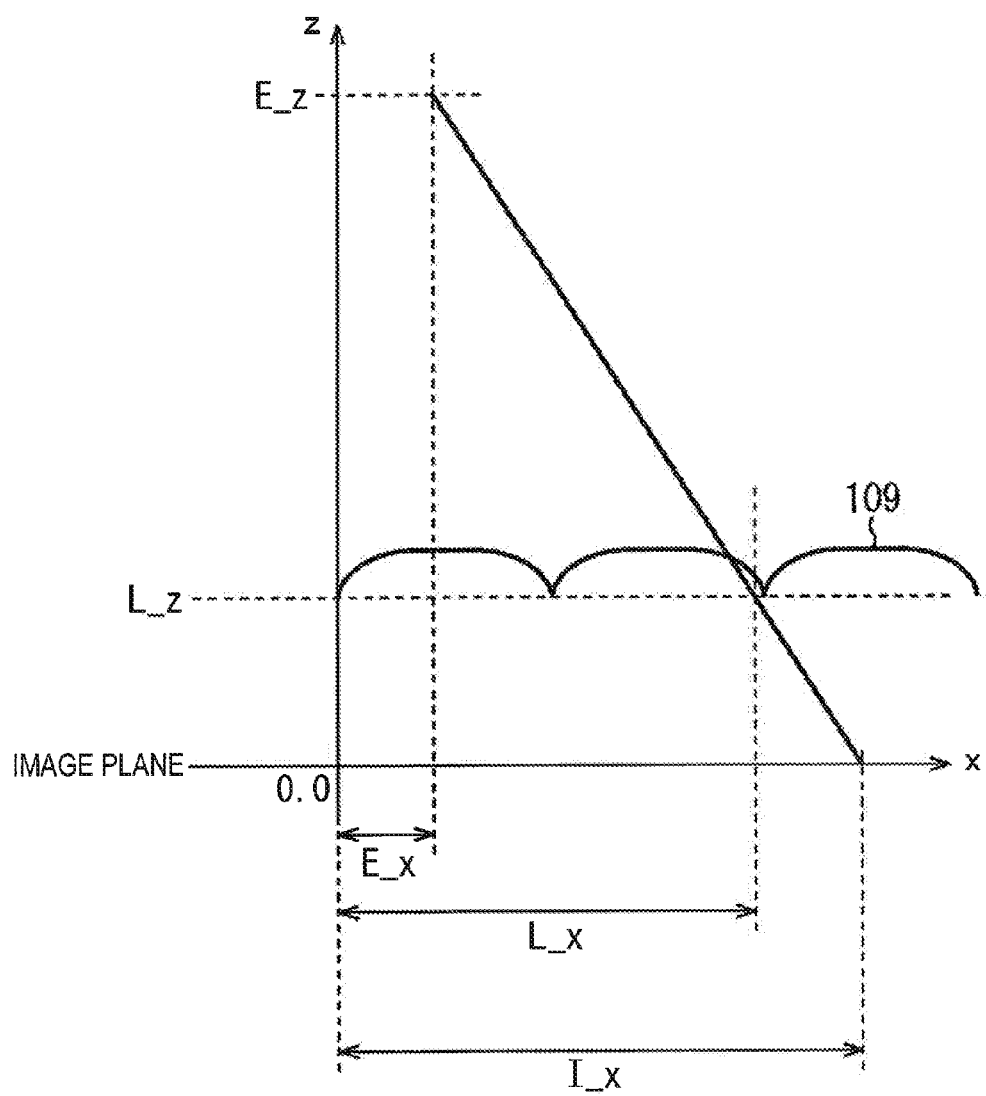
FIG. 11 is a graph on which a first example of calculating the coordinates of each sub pixel on a lenticular lens having the position of the middle of the eyebrows as a reference is plotted.

FIG. 11 is a graph on which a first example of calculating the coordinates of each sub pixel on the lenticular lens 109 having the position of the middle of the eyebrows as a reference is plotted by the coordinate calculation unit 102.

Note that, in the present specification, an axis vertical to the x axis on a screen is set to be a y axis, and an axis in the direction perpendicular to the display plane of the display unit 108 is set to be a z axis unless otherwise specified. The coordinate of the display plane (image plane) of the display unit 108 on the z axis is set to be 0.

In FIG. 11, the calculation of the coordinates of each sub pixel on the lenticular lens 109 having the position of the middle of the eyebrows as a reference is performed without considering refraction of light from the display unit 108 by the lenticular lens 109. To be specific, as illustrated in FIG. 11, when the x coordinate, the y coordinate, and the z coordinate of a viewing position are respectively set to be $E\_x$, $E\_y$, and $E\_z$, and the x coordinate and the y coordinate of each sub pixel on the lenticular lens 109 and the thickness of glass on the display plane of the display unit 108 are respectively set to be $L\_x$, $L\_y$, and $L\_z$, the x coordinate $I\_x$ and the y coordinate $I\_y$ of a sub pixel are defined by the following expression (1).

$$I\_x - E\_x = (L\_x - E\_x)*E\_z/(E\_z - L\_z)$$

$$I\_y - E\_y = (L\_y - E\_y)*E\_z/(E\_z - L\_z) \tag{1}$$

Thus, the coordinate calculation unit 102 calculates the expression (1) by applying the x coordinate $E\_x$, the y coordinate $E\_y$, and the z coordinate $E\_z$ of the viewing position for substituting the position of the middle of the eyebrows and the x coordinate $I\_x$ and the y coordinate $I\_y$ of a sub pixel for substituting the coordinates of each sub pixel on the screen into the expression (1), and applying the thickness $L\_z$ to the expression (1). Then, the coordinate calculation unit 102 sets the x coordinate $L\_x$ and the y coordinate $L\_y$ of each sub pixel on the lenticular lens 109 obtained from the result of the calculation to be the coordinates of each sub pixel on the lenticular lens 109 having the position of the middle of the eyebrows as a reference.

<Second Example of Calculation of Coordinates of Each Sub Pixel on the Lenticular Lens Having the Position of the Middle of the Eyebrows as a Reference>

Figure 12:
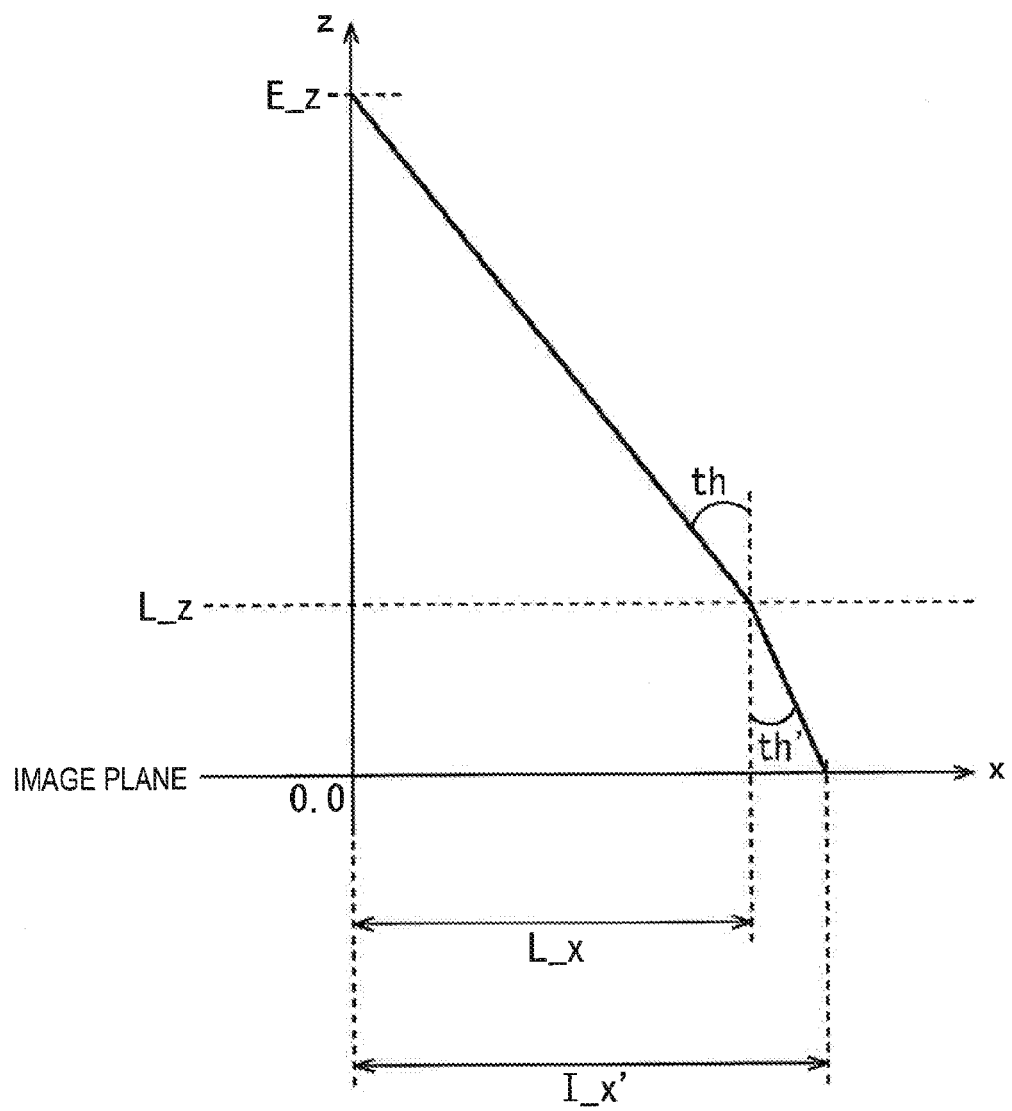
FIG. 12 is a graph on which a second example of calculating the coordinates of each sub pixel on the lenticular lens having the position of the middle of the eyebrows as a reference is plotted.

FIG. 12 a graph on which a second example of calculating the coordinates of each sub pixel on the lenticular lens 109 having the position of the middle of the eyebrows as a reference is plotted by the coordinate calculation unit 102.

In FIG. 12, the calculation of the coordinates of each sub pixel on the lenticular lens 109 having the position of the middle of the eyebrows as a reference is performed in close consideration of refraction of light from the display unit 108 by the lenticular lens 109. To be specific, as illustrated in FIG. 12, an emission angle th formed by the lenticular lens 109 and the viewing position is defined by the following expression (2) using the z coordinate $E\_z$ of the viewing position, the x coordinate $L\_x$ on the lenticular lens 109, and the thickness $L\_z$ of the glass on the display plane of the display unit 108.

$$th = \mathrm{atan}(L\_x/(E\_z - L\_z)) \tag{2}$$

In addition, when a refractive index of the glass on the display plane of the display unit 108 is set to be N, an incidence angle th' of light emitted at the emission angle th on the lenticular lens 109 is defined by the following expression (3).

$$\sin(th)/N = \sin(th') \tag{3}$$

Thus, the incident angle th' is expressed by the following expression (4).

$$th' = \mathrm{asin}(\sin(th)/N) \tag{4}$$

In addition, the x coordinate $I\_x'$ of a sub pixel is defined by the following expression (5).

$$I\_x' - L\_x = \tan(th')*L\_z$$

$$\therefore I\_x' = L\_x + \tan(th')*L\_z \tag{5}$$

Thus, the x coordinate $I\_x'$ of a sub pixel is expressed by the following expression (6) using the expressions (2), (4), and (5).

$$I\_x' = L\_x + \tan(\mathrm{asin}(\sin(\mathrm{atan}(L\_x/(E\_z - L\_z)))/N))*L\_z \tag{6}$$

In the same manner, the y coordinate $I\_y'$ of a sub pixel is expressed by the following expression (7).

$$I\_y' = L\_y + \tan(\mathrm{asin}(\sin(\mathrm{atan}\, L\_y/E\_z - L\_z)))/N))*L\_z \tag{7}$$

Thus, the coordinate calculation unit 102 applies the x coordinate $E\_x$, the y coordinate $E\_y$, and the z coordinate $E\_z$ of the viewing position for substituting the position of the middle of the eyebrows and the x coordinate $I\_x'$ and the y coordinate $I\_y'$ of a sub pixel for substituting the coordinates of each sub pixel on the screen into the expressions (6) and (7), and applies the thickness $L\_z$ and the refractive index N to the expressions (6) and (7). Then, the coordinate calculation unit 102 calculates the x coordinate $L\_x$ and the y coordinate $L\_y$ of each sub pixel on the lenticular lens 109 using the applied expressions (6) and (7) based on a table or iteration. Then, the coordinate calculation unit 102 sets the x coordinate $L\_x$ and the y coordinate $L\_y$ of each sub pixel on the lenticular lens 109 obtained from the result of the calculation as coordinates of each sub pixel on the lenticular lens 109 having the position of the middle of the eyebrows as a reference.

<Third Example of Calculation of Coordinates of Each Sub Pixel on the Lenticular Lens Having the Position of the Middle of the Eyebrows as a Reference>

Figure 13:
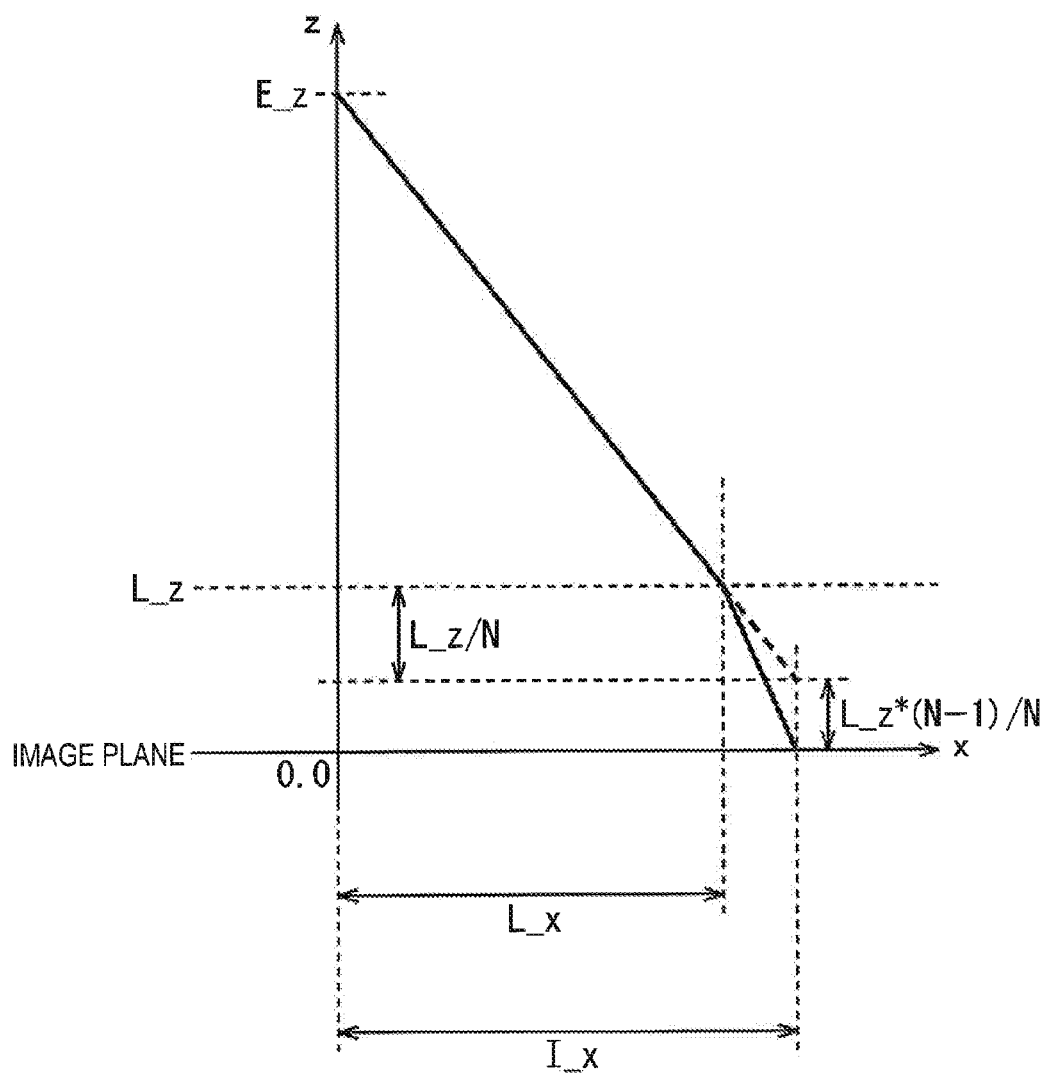
FIG. 13 is a graph a third example of calculating the coordinates of each sub pixel on the lenticular lens having the position of the middle of the eyebrows as a reference is plotted.

FIG. 13 a graph on which a third example of calculating the coordinates of each sub pixel on the lenticular lens 109 having the position of the middle of the eyebrows as a reference is plotted by the coordinate calculation unit 102.

In FIG. 13, the calculation of the coordinates of each sub pixel on the lenticular lens 109 having the position of the middle of the eyebrows as a reference is performed by approximating refraction of light from the display unit 108 by the lenticular lens 109. To be specific, as illustrated in FIG. 13, the approximation is made when there is no refraction and the value $L\_z/N$ obtained by dividing the actual thickness $L\_z$ of the glass on the display plane of the display unit 108 by the refractive index N is assumed to be the thickness of the glass on the display plane of the display unit 108, and light in the same position as the position of light emitted to the viewing position on the screen is refracted and emitted to the viewing position.

In this case, using the z coordinate $E\_z$ of the viewing position and the x coordinate $L\_x$ and the y coordinate $L\_y$ of each sub pixel on the lenticular lens 109, the x coordinate $I\_x''$ and the y coordinate $I\_y''$ of a sub pixel are each defined by the following expression (8).

$$I\_x'' = L\_x*(E\_z - L\_z*(N-1)/N)/(E\_z - L\_z)$$

$$I\_y'' = L\_y*(E\_z - L\_z*(N-1)/N)/(E\_z - L\_z) \tag{8}$$

Thus, the coordinate calculation unit 102 calculates the expression (8) by applying the x coordinate $E\_x$, the y coordinate $E\_y$, and the z coordinate $E\_z$ of the viewing position for substituting the position of the middle of the eyebrows and the x coordinate $I\_x''$ and the y coordinate $I\_y''$ of a sub pixel for substituting the coordinates of each sub pixel on the screen into the expression (8), and applying the thickness $L\_z$ and the refractive index N to the expression (8). Then, the coordinate calculation unit 102 sets the x coordinate $L\_x$ and the y coordinate $L\_y$ of each sub pixel on the lenticular lens 109 obtained from the result of the calculation to be the coordinates of each sub pixel on the lenticular lens 109 having the position of the middle of the eyebrows as a reference.

Note that, when the emission angle th is set to be sufficiently small in the expressions (6) and (7) described above, the following expression (9) is established.

$$\sin(th)=\tan(th)=\mathrm{asin}(th)=\mathrm{atan}(th)=th \quad (9)$$

Thus, in this case, the x coordinate I_x' of a sub pixel calculated with the expression (6) coincides with the x coordinate I_x" of a sub pixel calculated with the expression (8) as shown in the following expression (10).

$$\begin{aligned} \mathrm{I\_x'} &\approx \mathrm{L\_x} + \tan(a\sin(\sin(a\tan(\mathrm{L\_x}/(\mathrm{E\_z}-\mathrm{L\_z})))/N))*\mathrm{L\_z} \quad (10) \\ &\approx \mathrm{L\_x} + (1/N)*\mathrm{L\_z}*\mathrm{L\_x}/(\mathrm{E\_z}-\mathrm{L\_z}) \\ &\approx (\mathrm{E\_z}-\mathrm{L\_z}+(1/N)*\mathrm{L\_z})*\mathrm{L\_x}/(\mathrm{E\_z}-\mathrm{L\_z}) \\ &\approx (\mathrm{E\_z}-(1-1/N)*\mathrm{L\_z})*\mathrm{L\_x}/(\mathrm{E\_z}-\mathrm{L\_z}) \\ &\approx \mathrm{L\_x}*(\mathrm{E\_z}-\mathrm{L\_z}*(N-1)/N)(\mathrm{E\_z}-\mathrm{L\_z}) \\ &\approx \mathrm{I\_x''} \end{aligned}$$

In the same manner, the y coordinate I_y of a sub pixel calculated with the expression (7) coincides with the y coordinate I_y" of a sub pixel calculated with the expression (8).

Thus, the approximation of FIG. 13 can be said to be approximation made when the emission angle th is sufficiently small.

As shown in FIGS. 12 and 13, when the calculation is performed considering refraction of light, and even when the viewing position is close to the display unit 108 and the influence of the refraction of light is significant, the correct coordinates of each sub pixel on the lenticular lens 109 having the position of the middle of the eyebrows as a reference can be calculated.

In addition, in the calculation of FIGS. 11 to 13, the z coordinate L_z on the lenticular lens 109 is set to be constant as shown in FIG. 14A, but since the lenticular lens 109 is formed to be a sheet shape, the z coordinate L_z is actually not constant as shown in FIG. 14B. In other words, the z coordinate L_z on the lenticular lens 109 differs according to the x coordinate L_x and the y coordinate L_on the lenticular lens 109.

Thus, the coordinate calculation unit 102 can set L_x[x] and L_y[y] defined by the following expression (11) to be the coordinates of each sub pixel on the lenticular lens 109 having the position of the middle of the eyebrows as a reference, considering changes of the z coordinate L_z on the lenticular lens 109.

$$L\_x[x]=x*(E\_z-L\_z[x])/E\_z+L\_z[x]*E\_x/E\_z$$

$$L\_y[y]=y*(E\_z-L\_z[y])/E\_z+L\_z[y]*E\_y/E\_z \quad (11)$$

Note that, in the expression (11), x indicates the x coordinate I_x (I_x' and I_x") of a sub pixel and y indicates the y coordinate I_y (I_y' and I_y") of a sub pixel.

As described above, when the calculation is performed considering changes 26 of the z coordinate L_z on the lenticular lens 109, and even when the display unit 108 is formed of a large-sized liquid crystal panel, and the lenticular lens 109 is much lifted from the display unit 108, the accurate coordinates of each sub pixel on the lenticular lens 109 having the position of the middle of the eyebrows a reference can be calculated.

<Example of Calculation of a Phase>

Figure 15:
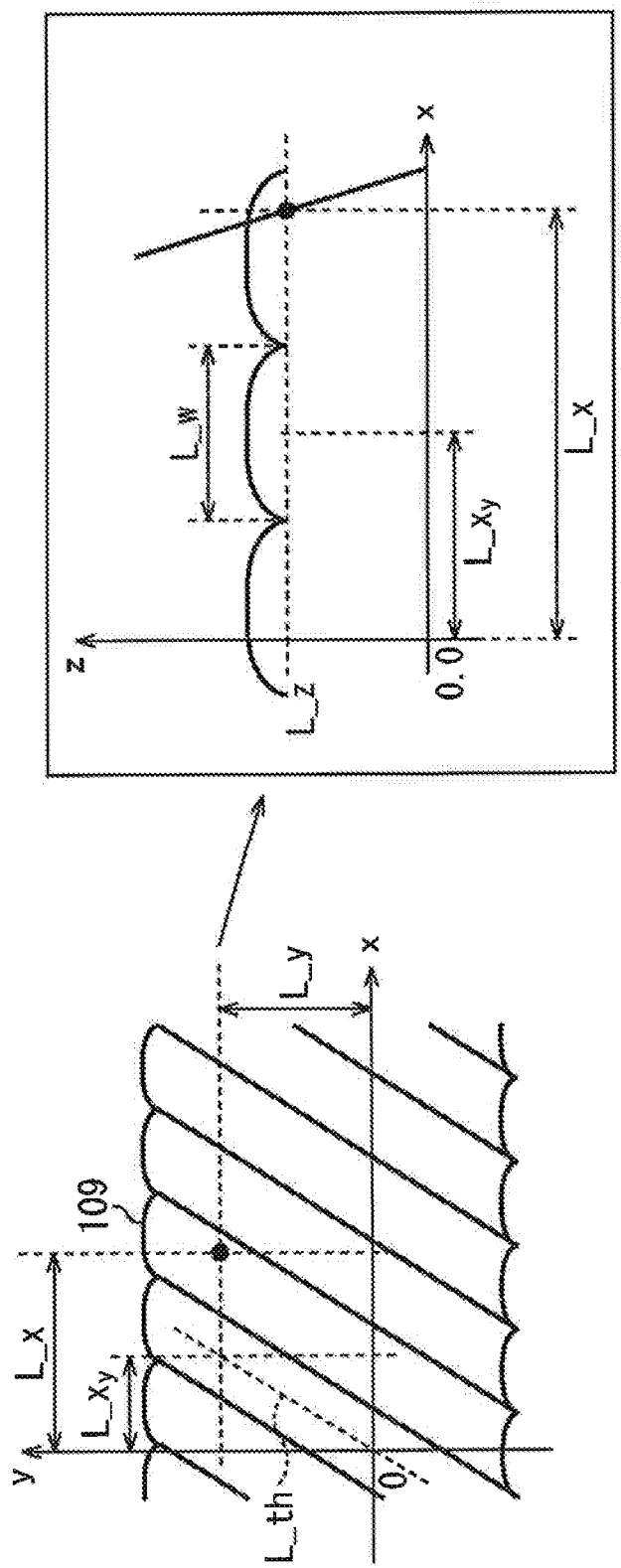
FIG. 15 is a diagram for describing an example of calculating a phase by a phase calculation unit of FIG. 10.

FIG. 15 is a diagram for describing an example of calculating a phase by the phase calculation unit 103 of FIG. 10.

As shown in FIG. 15, when the inclination of the lenticular lens 109 with respect to the display unit 108 is set to be L_th, an offset L_x_y of the x coordinate L_x based on the y coordinate L_y on the lenticular lens 109 is expressed by the following expression (12).

$$L\_x_y=L\_y*\tan(L\_th) \quad (12)$$

The phase calculation unit 103 obtains a phase $\mathrm{phase}_C$ on the lenticular lens 109 with the following expression (13) using the offset L_x_y.

$$\mathrm{phase}_C=\mathrm{mod}(L\_x-L\_x_y+L\_w/2,L\_w)/L\_w-0.5[-0.5\leq\mathrm{phase}_C<0.5] \quad (13)$$

Note that, in the expression (13), L_w indicates the width of a cell of the lenticular lens 109 as shown in FIG. 15. According to the expression (13), when the x coordinate L_x of each sub pixel on the lenticular lens 109 has a minimum value, the phase $\mathrm{phase}_C$ is −0.5, when the x coordinate L_x has an intermediate value, the phase $\mathrm{phase}_C$ is 0, and when the x coordinate L_x has a maximum value, the phase $\mathrm{phase}_C$ is 0.5.

<Example of a Blend Ratio>

Figure 16:
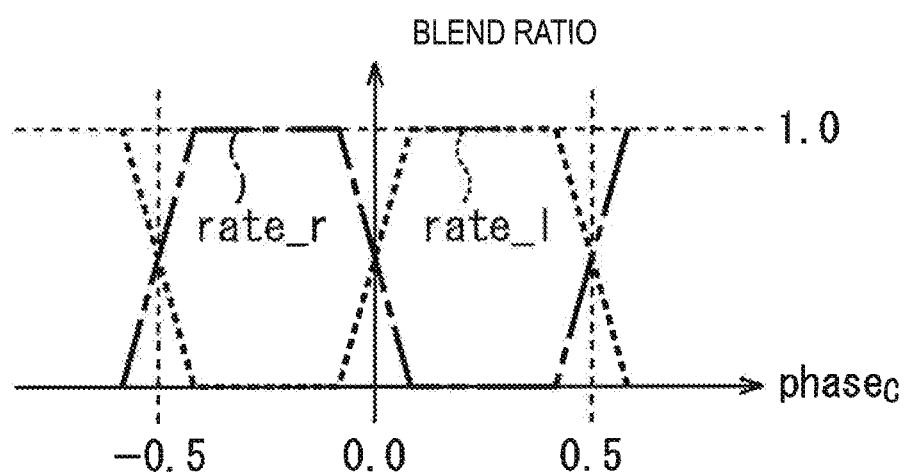
FIG. 16 is a diagram illustrating an example of the relationship between a phase $phase_C$ and a blend ratio of an image for the left eye and an image for the right eye.

FIG. 16 is a diagram illustrating an example of the relationship between the phase $\mathrm{phase}_C$ and a blend ratio of an image for the left eye and an image for the right eye.

Figure 2:
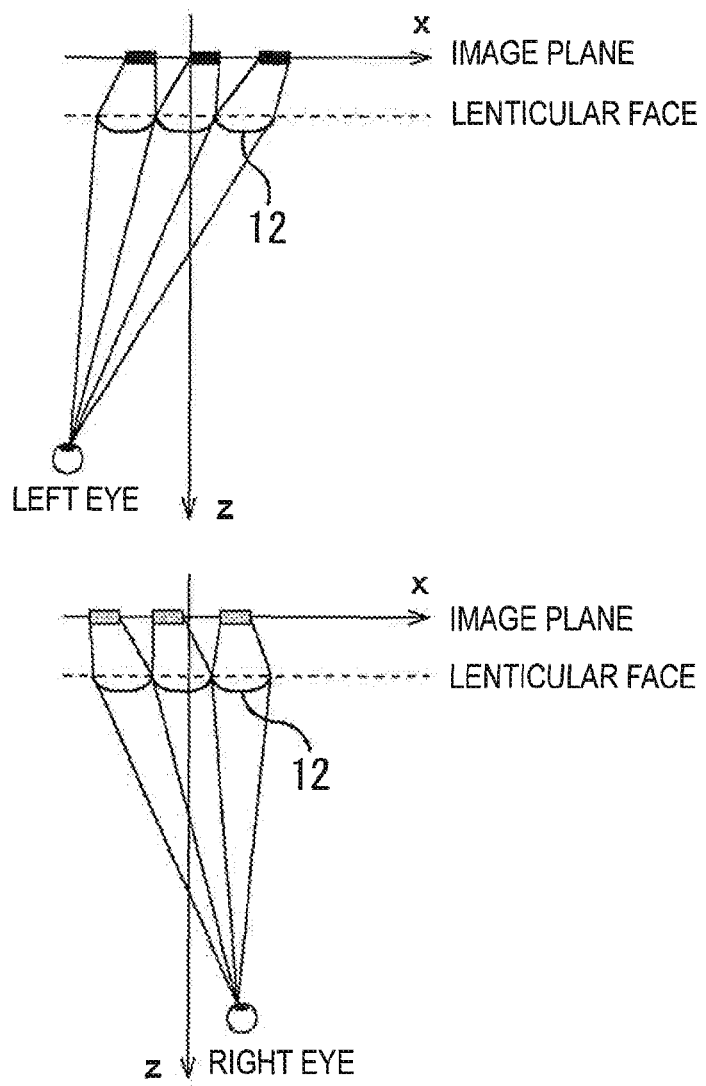
FIG. 2 is a diagram for describing a way of viewing from a proper viewing position of the lenticular type display device.
Figure 3:
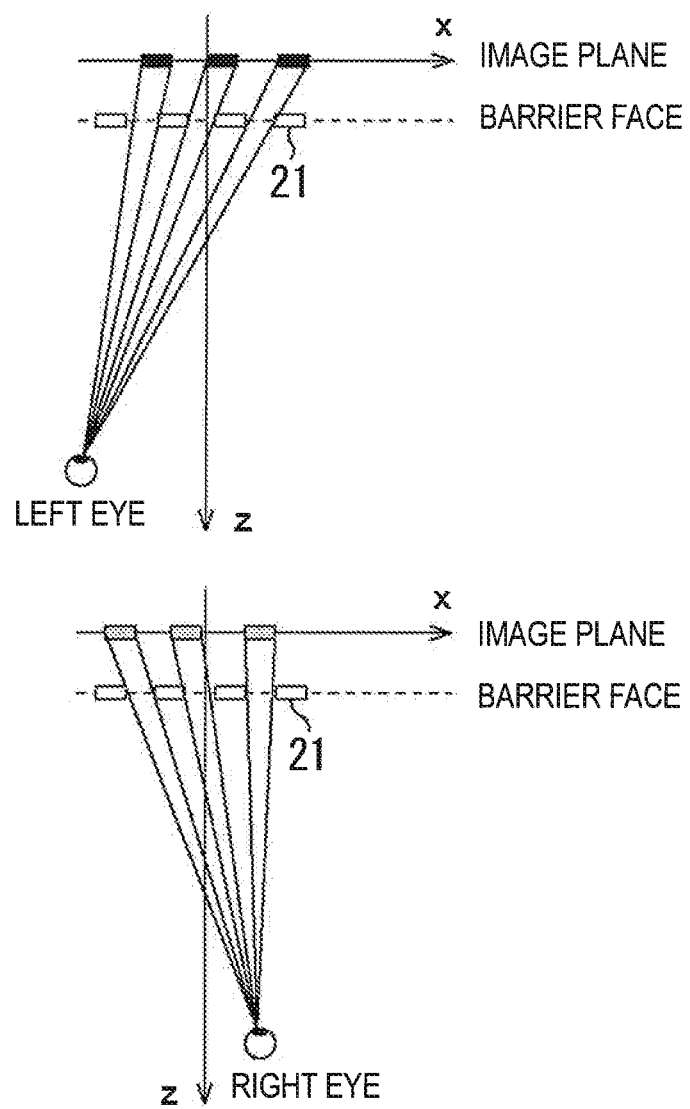
FIG. 3 is a diagram for describing a way of viewing from a proper viewing position of a barrier type display device.
Figure 4:
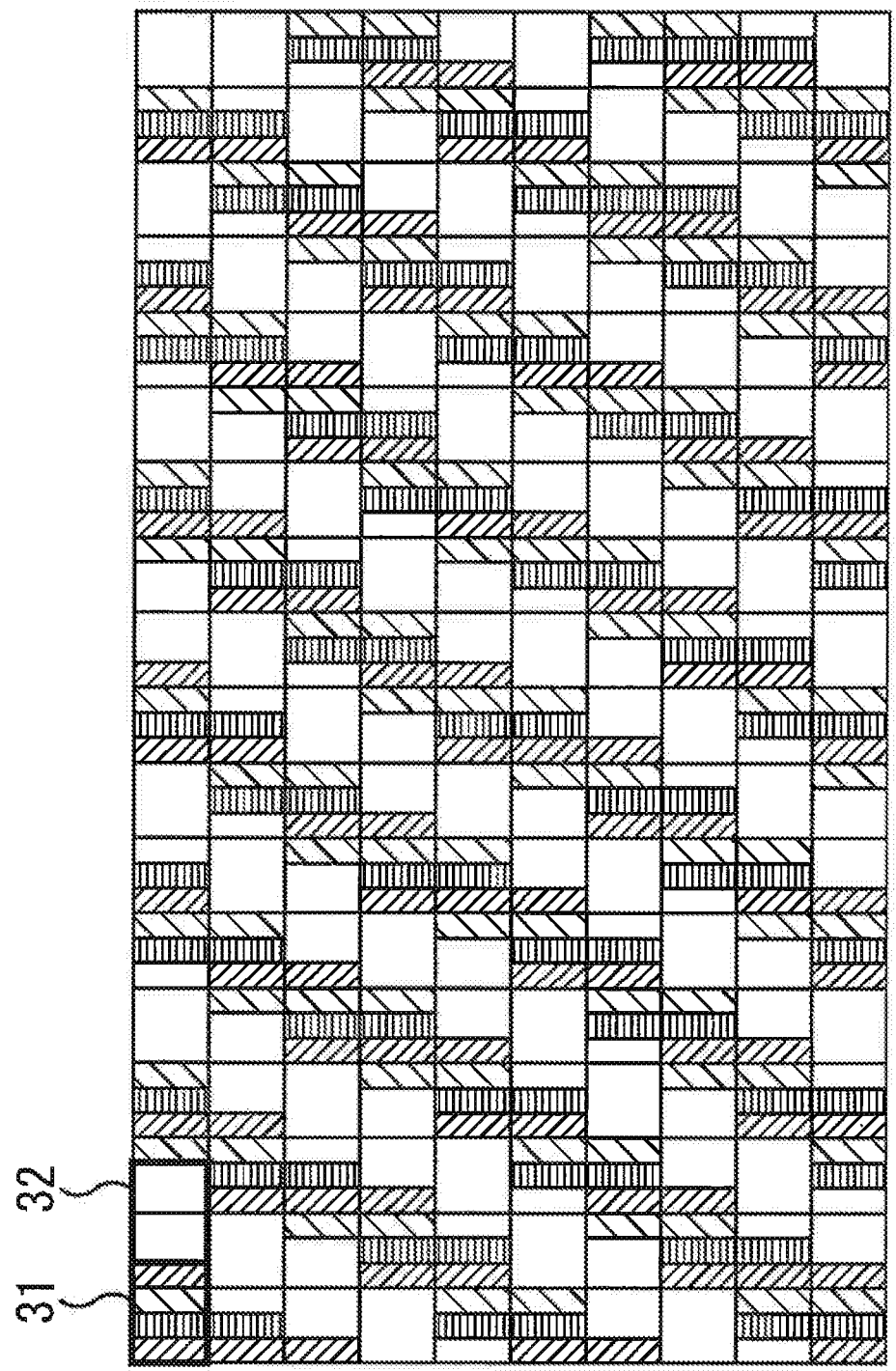
FIG. 4 is a diagram illustrating a display example of a 3D image.
Figure 7A:
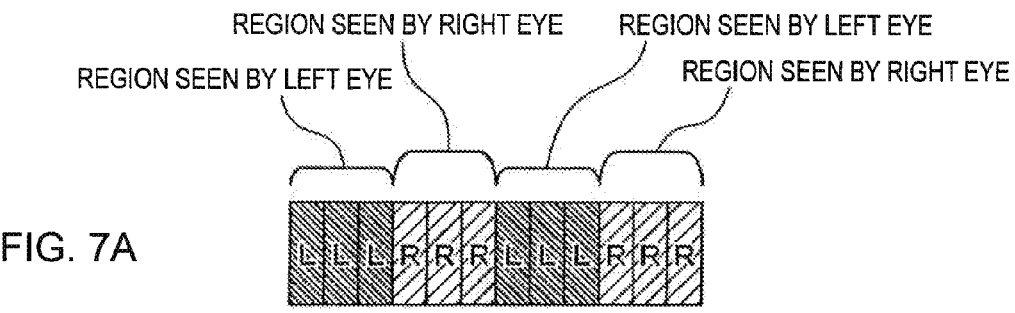
FIGS. 7A to 7C are diagrams for describing crosstalk.
Figure 7B:
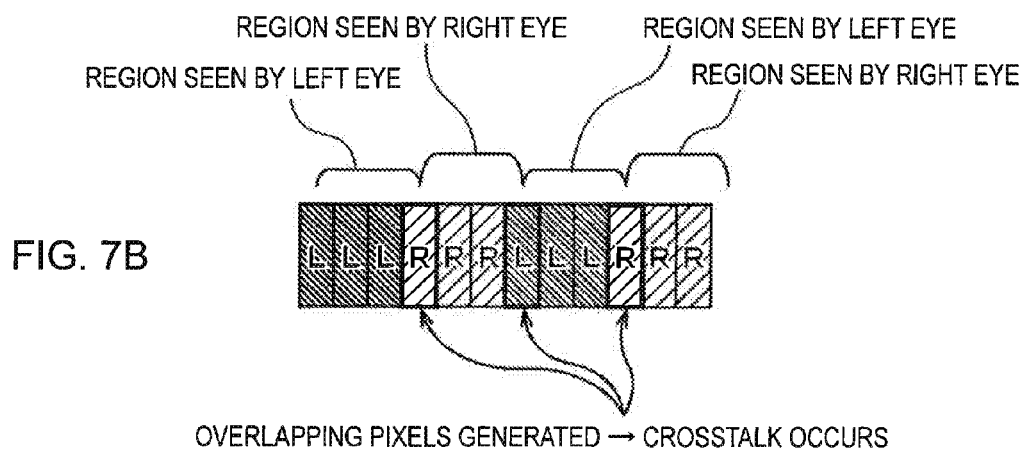
Figure 7C:
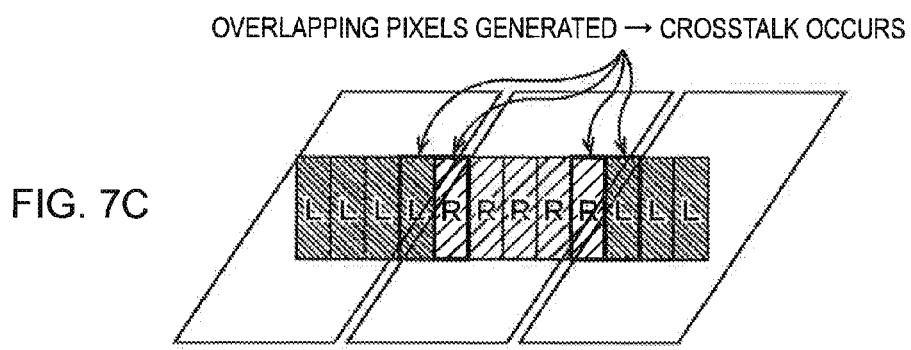
Figure 9A:
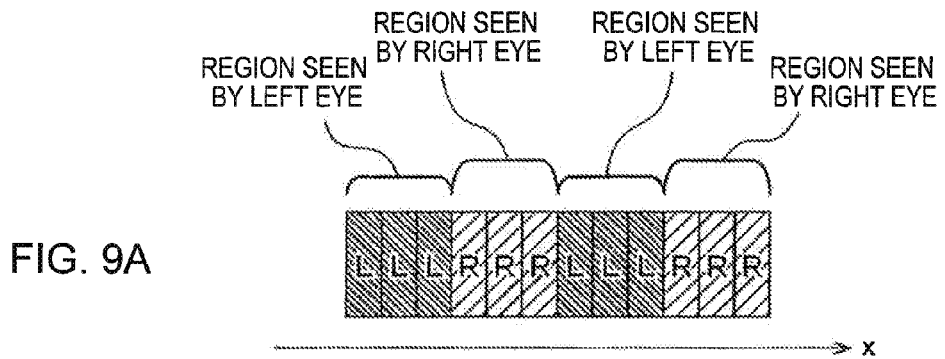
FIGS. 9A to 9C are diagrams for describing crosstalk occurring according to viewing positions.
Figure 9B:
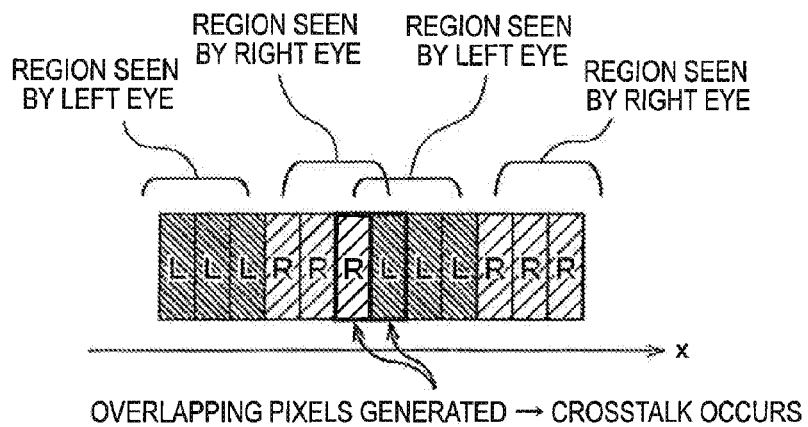
Figure 9C:
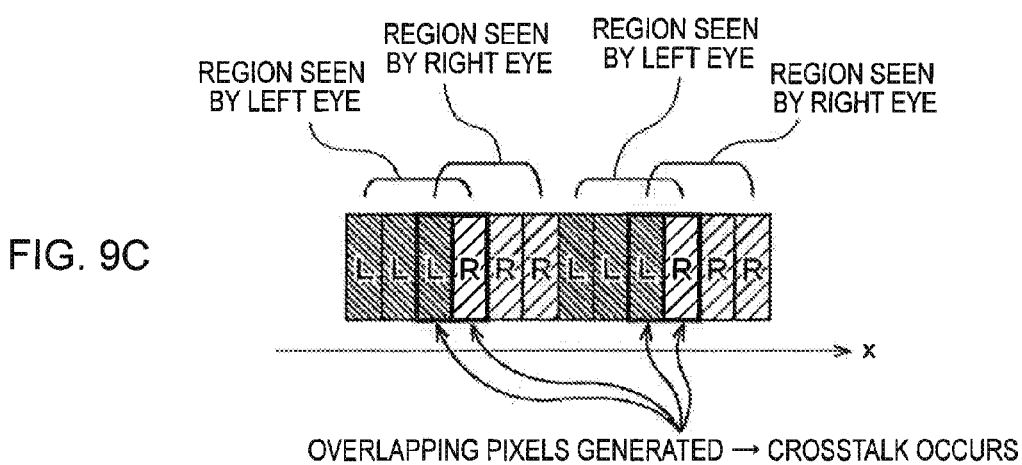

Here, regions seen by the left eye are in the positive direction of the x axis with respect to regions seen by the right eye, and the regions seen by the right eye are in the negative direction of the x axis with respect to the regions seen by the left eye as shown in FIG. 2. Thus, images for the right eye are allocated to sub pixels having the phase $\mathrm{phase}_C$ equal to or smaller than 0, and images for the left eye are allocated to sub pixels having the phase $\mathrm{phase}_C$ greater than 0.

Figure 17:
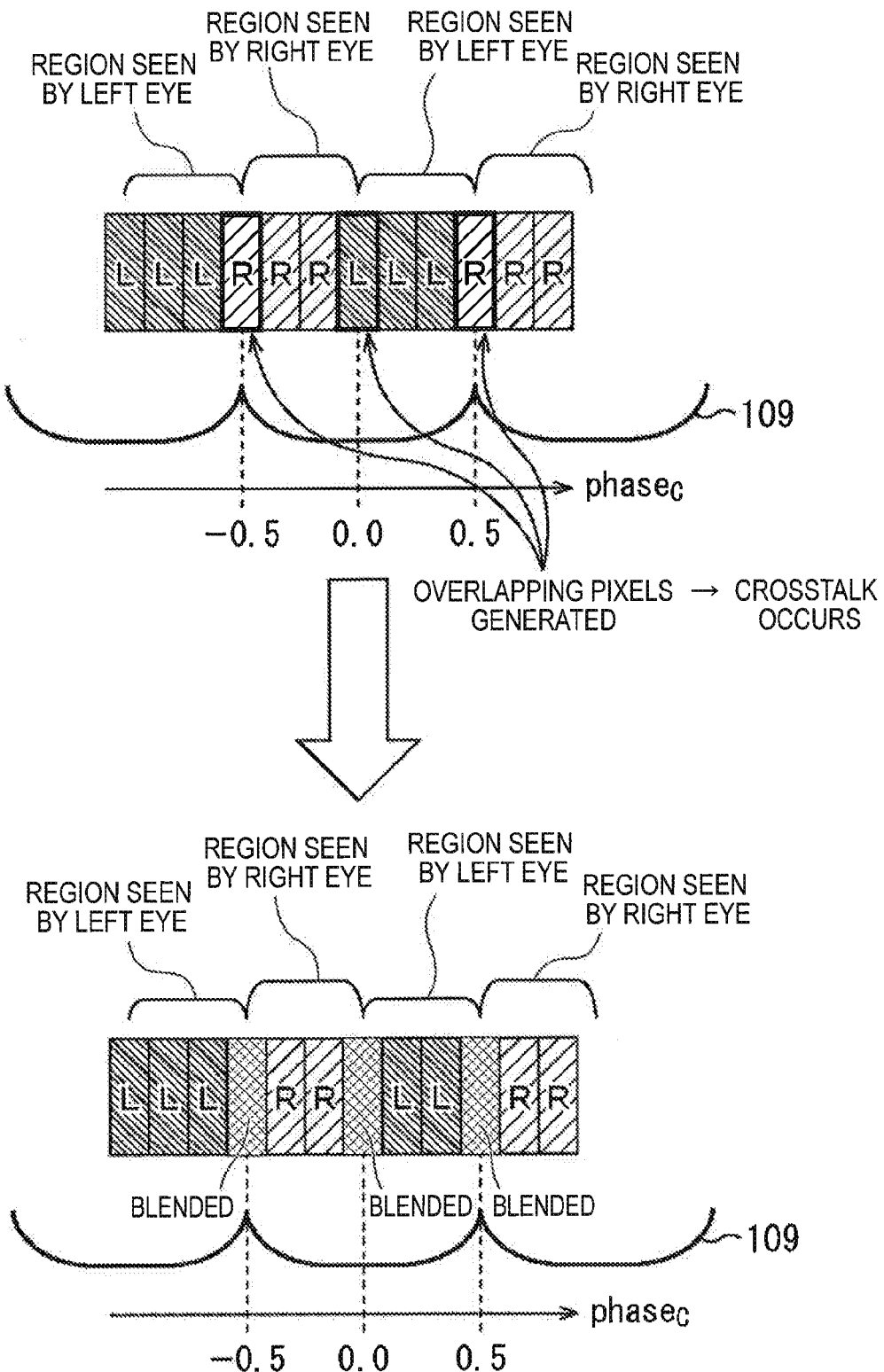
FIG. 17 is a diagram for describing a combined image based on the blend ratio of FIG. 16.

Thus, in the example of FIG. 16, when the phase $\mathrm{phase}_C$ of a sub pixel is greater than a value around −0.5 and smaller than a negative value around 0, a blend ratio rate_r of an image for the right eye of the sub pixel is 1 and a blend ratio rate_l of an image for the left eye is 0. Accordingly, as shown in FIG. 17, a sub pixel having the phase $\mathrm{phase}_C$ greater than a value around −0.5 and smaller than a negative value around 0 is for the image for the right eye.

In addition, when the phase $\mathrm{phase}_C$ of a sub pixel is greater than a positive value around 0 and smaller than a value around 0.5, a blend ratio rate_l of an image for the left eye of the sub pixel is 1, and a blend ratio rate_r of an image for the right eye is 0. Accordingly, as shown in FIG. 17, a sub pixel having the phase $\mathrm{phase}_C$ greater than a positive value around 0 and smaller than a value around 0.5 is for the image for the left eye.

In addition, when the phase $\mathrm{phase}_C$ of a sub pixel is a value around ±0.5 and around 0, a blend ratio rate_l of an image for the left eye of the sub pixel and a blend ratio rate_r of an image for the right eye are greater than 0. To be specific, the blend ratio rate_l approaches 0 and the blend ratio rate_r approaches 1 as the phase $\mathrm{phase}_C$ becomes greater than −0.5, in other words, approaches the center of the regions seen by the right eye.

In addition, the blend ratio rate_l approaches 1 and the blend ratio rate_r approaches 0 as the phase $\mathrm{phase}_C$ approaches a positive value around 0 from a negative value around 0, in other words, approaches the center of the regions seen by the left eye. In addition, the blend ratio rate_l approaches 0 and the blend ratio rate_r approaches 1 as the phase $\mathrm{phase}_C$ approaches 0.5, in other words, approaches the center of the regions seen by the right eye.

As described above, when the phase $\mathrm{phase}_C$ of a sub pixel is around ±0.5 and around 0 in the example of FIG. 16, the blend ratio rate_l of the image for the left eye and the blend ratio rate_r of the image for the right eye of the sub pixel become greater than 0, and thus the sub pixel is for an image obtained by combining the image for the left eye and the image for the right eye.

Here, the overlapping pixels shown in the FIGS. 7B, 7C, 9B, and 9C are generated on the boundary lines of the regions to which the image for the left eye is allocated and the regions to which the image for the right eye is allocated. In other words, the overlapping pixels are sub pixels having the phase $phase_C$ of around ±0.5 or around 0. Thus, when the blend ratios are decided as shown in FIG. 16 and the sub pixels having the phase $phase_C$ of around ±0.5 and around 0 are for an image obtained by combining the image for the left eye and the image for the right eye, crosstalk is not conspicuous.

<Description of Projection Conversion>

Figure 18:
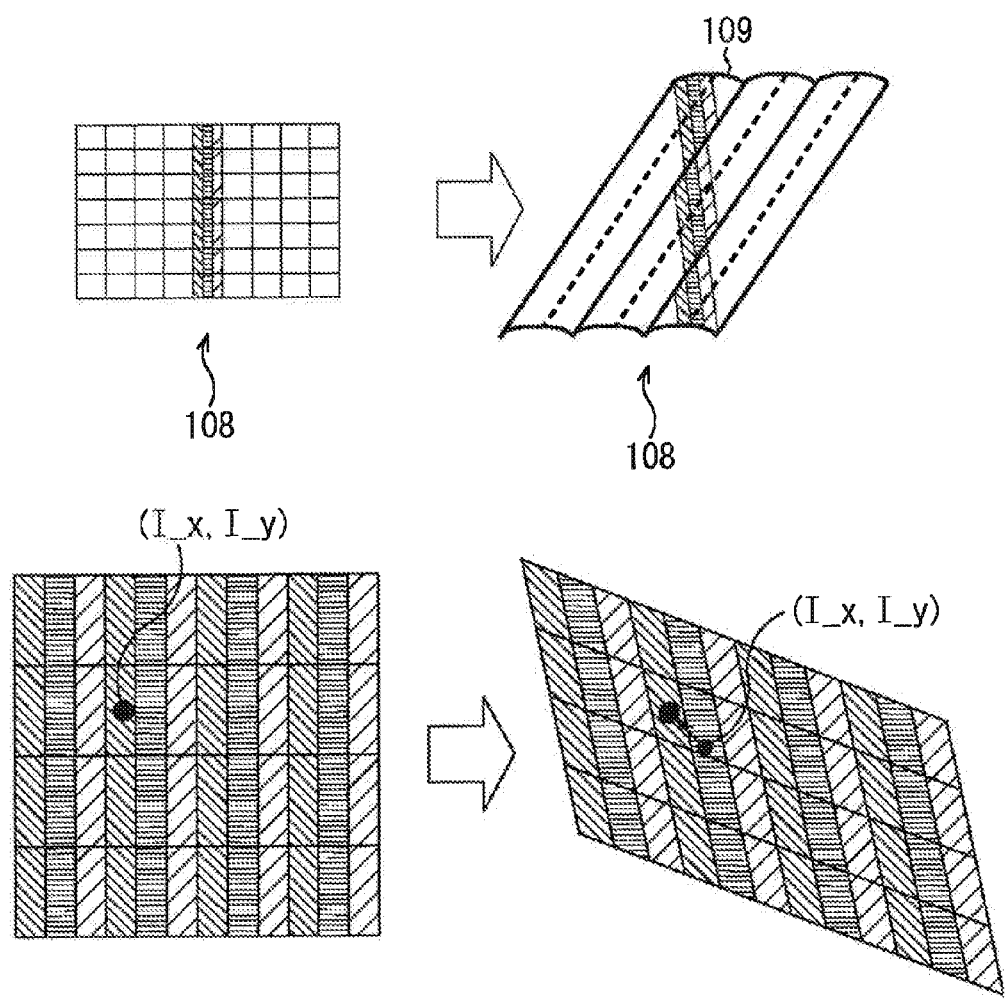
FIG. 18 is a diagram for describing a way of viewing an image displayed on a display unit.

FIG. 18 is a diagram for describing a way of viewing an image displayed on the display unit 108.

As shown in FIG. 18, the lenticular lenses 109 are attached to the display unit 108 in an oblique direction with respect to the display unit 108. Thus, an image displayed on the display unit 108 is enlarged in an oblique direction.

Thus, when a 3D image is displayed on the display unit 108 as it is without considering enlargement in the oblique direction, text appears blurry, or roughness appears in straight lines. Thus, the L projection conversion unit 105 and the R projection conversion unit 106 perform projection conversion on the coordinates (I_x, I_y) of each sub pixel on a screen of the display unit 108 to convert into coordinates on the screen actually seen by a viewer (hereinafter referred to as coordinate conversion).

In addition, the L projection conversion unit 105 performs projection conversion on an image for the left eye by generating the image for the left eye corresponding to coordinates after projection conversion from the image for the left eye input from the outside. In addition, the R projection conversion unit 106 performs projection conversion on an image for the right eye by generating the image for the right eye corresponding to coordinates after projection conversion from the image for the right eye input from the outside.

Hereinafter, the coordinate conversion will be described.

Figure 19:
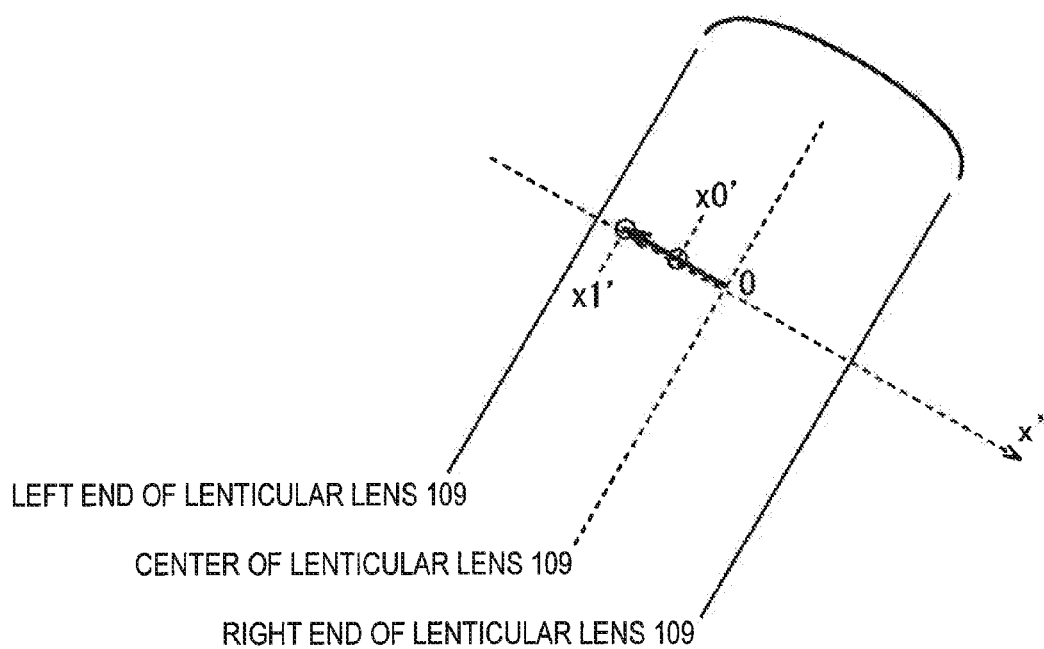
FIG. 19 is a diagram for describing an x' axis.

Here, first, an axis in the direction perpendicular to the borders of the lenticular lens 109 is set to be an x' axis as shown in FIG. 19. In addition, the x' coordinate of the position of an image emitted to the viewing position passing through the center of the lenticular lens 109 on the screen (which is enlarged in an oblique direction) is set to be 0.

In addition, the x' coordinate of the coordinates (I_x, I_y) of each sub pixel of the display unit 108 on the screen is set to be x0' and the x' coordinate of the coordinates of the viewing position in which the image of the sub pixel is seen on the screen (which is enlarged in an oblique direction) is set to be x1'.

Figure 20:
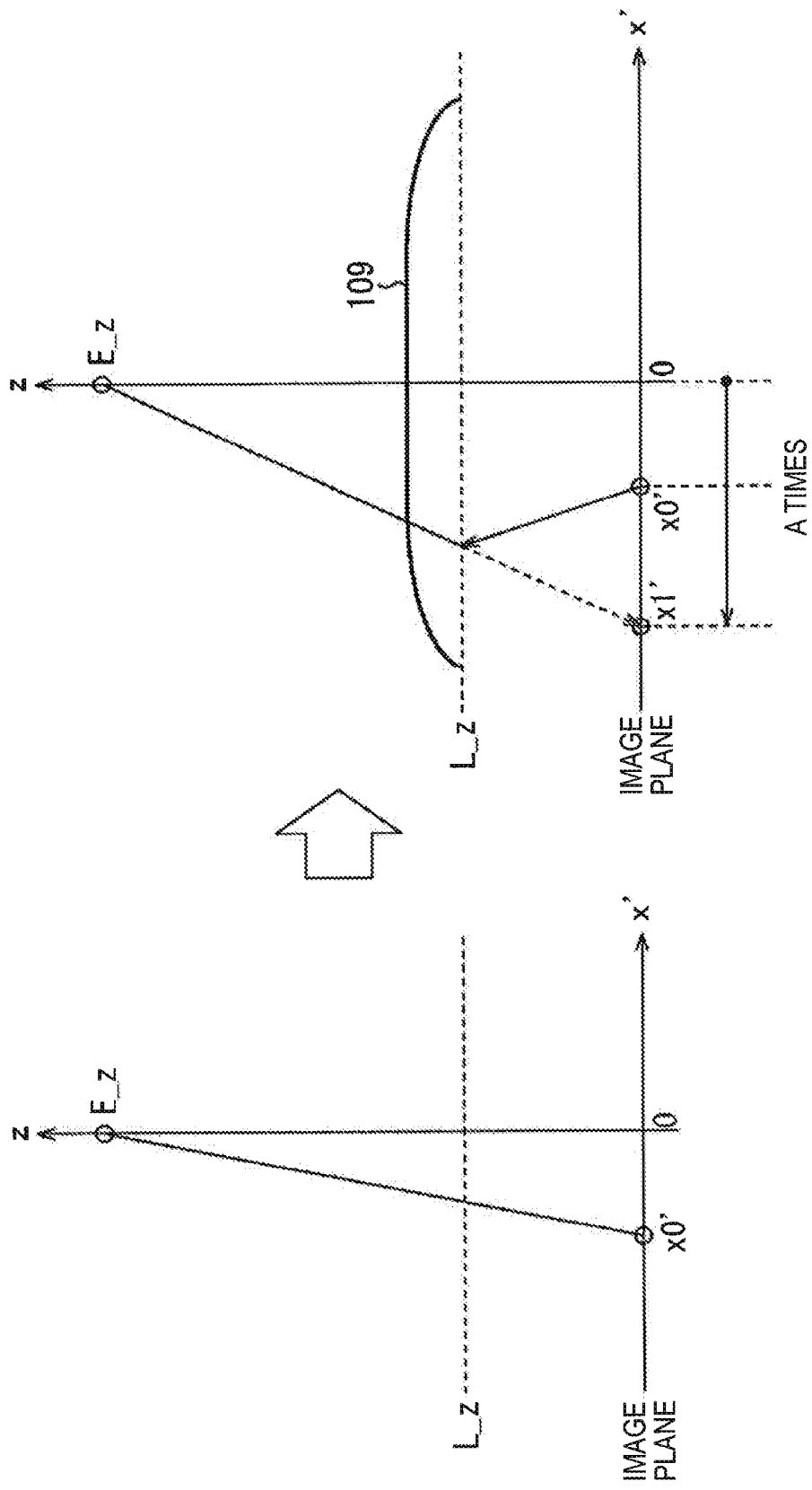
FIG. 20 is a diagram illustrating the relationship between a coordinate x0' and a coordinate x1' when an x' coordinate of a viewing position is the same as the x' coordinate of the center of a lenticular lens.

FIG. 20 is a diagram illustrating the relationship between the coordinate x0' and the coordinate x1' when the x' coordinate of the viewing position is the same as the x' coordinate of the center of the lenticular lens 109.

An image in the position of the coordinate x0' seen from the viewing position when there is no lenticular lens 109 as shown on the left side of FIG. 20 is seen in the position of the coordinate x1' from the viewing position when the lenticular lens 109 is provided and the x' coordinate of the viewing position is the same as the x' coordinate of the center of the lenticular lens 109 as shown on the right side of FIG. 20.

Here, an image passing through the lenticular lens 109 is enlarged from the center of the lenticular lens 109. Thus, the magnification ratio of the coordinate x1' is A times that of the coordinate x0' of the lenticular lens 109.

Figure 21:
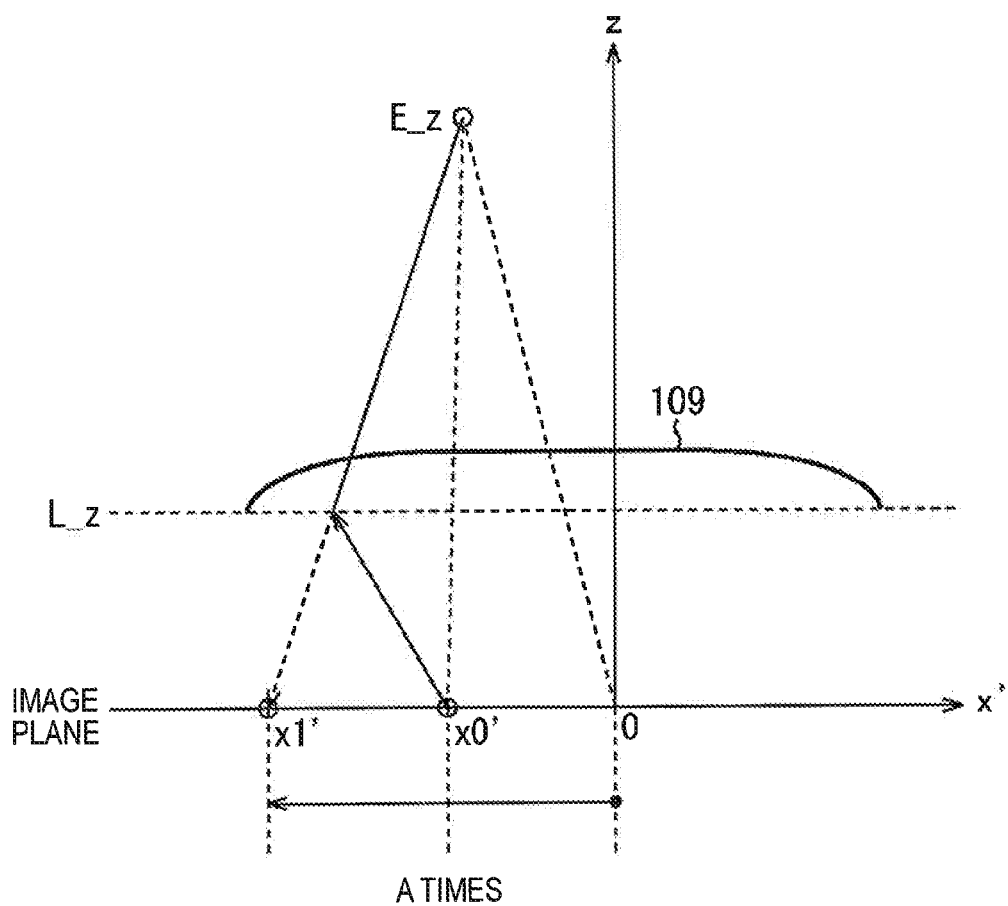
FIG. 21 is a diagram illustrating the relationship between the coordinate x0' and the coordinate x1' when the x' coordinate of the viewing position is smaller than the x' coordinate of the center of the lenticular lens.

FIG. 21 is a diagram illustrating the relationship between the coordinate x0' and the coordinate x1' when the x' coordinate of the viewing position is smaller than the x' coordinate of the center of the lenticular lens 109.

Since an image passing through the lenticular lens 109 is enlarged from the center of the lenticular lens 109, the magnification ratio of the coordinate x1' is A times that of coordinate x0' as shown in FIG. 21.

As shown in FIG. 21, when the x' coordinate of the viewing position is smaller than the x' coordinate of the center of the lenticular lens 109, the x' coordinate 0 moves in the positive direction of the x' axis in comparison to the example of FIG. 20, and thus the coordinate x1' and the coordinate x0' become greater.

Figure 22:
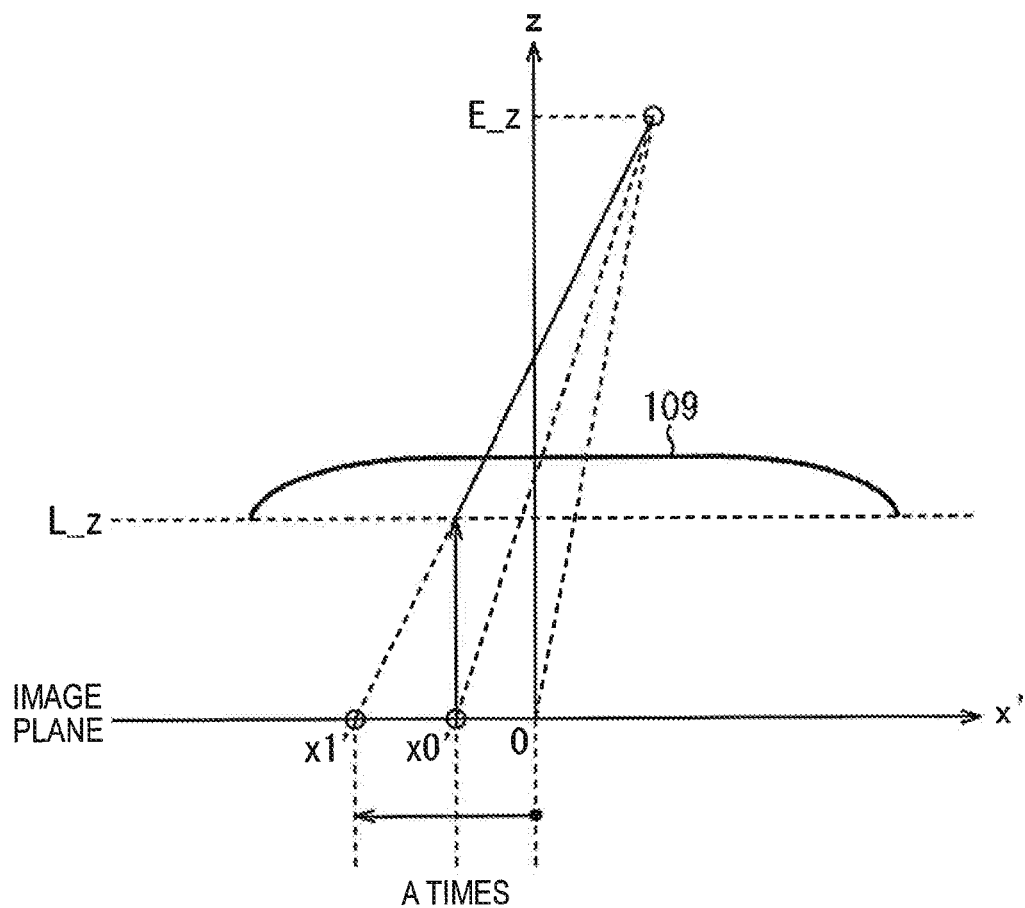
FIG. 22 is a diagram illustrating the relationship between the coordinate x0' and the coordinate x1' when the x' coordinate of the viewing position is greater than the x' coordinate of the center of the lenticular lens.
Figure 23:
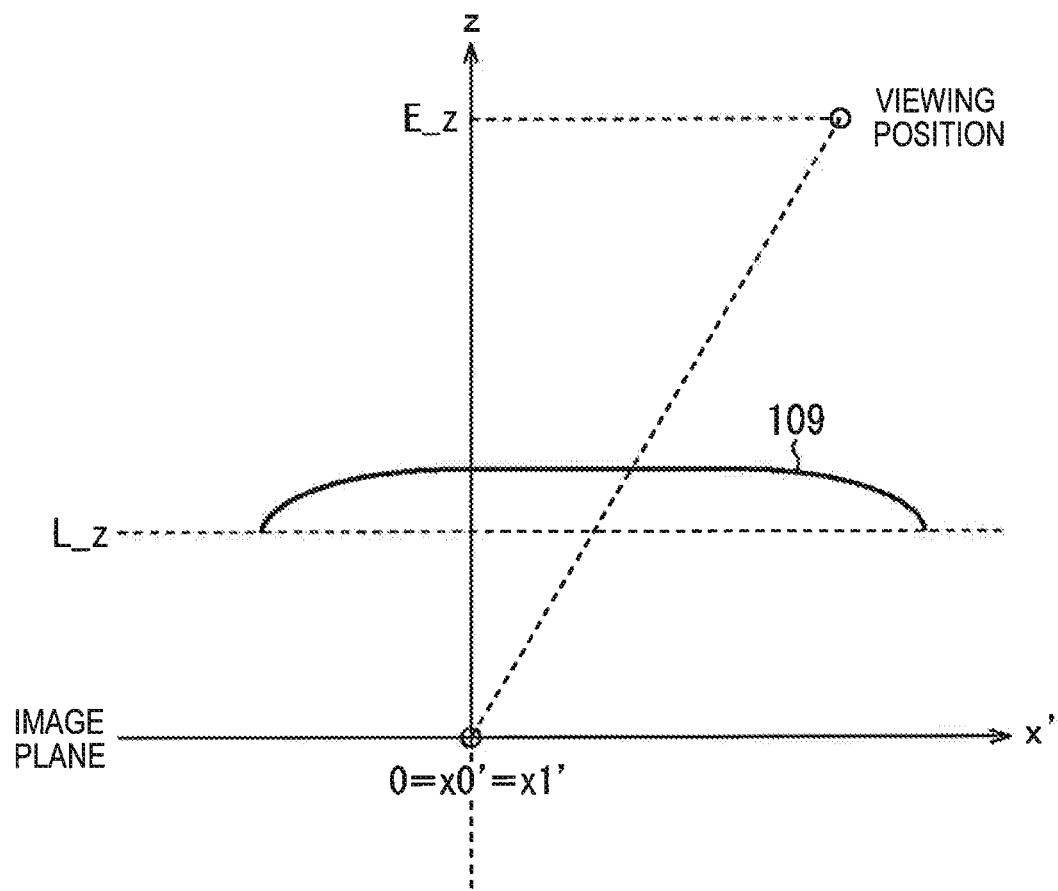
FIG. 23 is a diagram illustrating the relationship between the coordinate x0' and the coordinate x1' when the x' coordinate of the viewing position is greater than the x' coordinate of the center of the lenticular lens.
Figure 24:
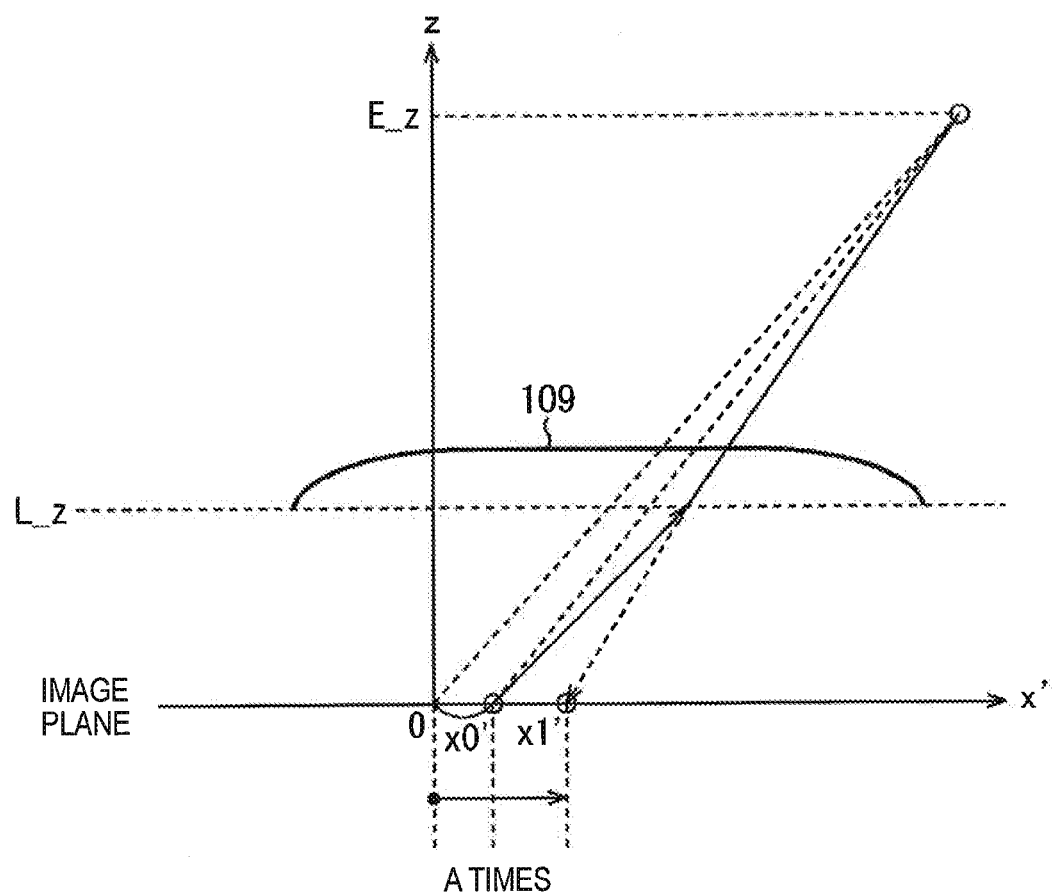
FIG. 24 is a diagram illustrating the relationship between the coordinate x0' and the coordinate x1' when the x' coordinate of the viewing position is greater than the x' coordinate of the center of the lenticular lens.

FIGS. 22 to 24 are diagrams illustrating the relationship between the coordinate x0' and the coordinate x1' when the x' coordinate of the viewing position is greater than the x' coordinate of the center of the lenticular lens 109.

Since an image passing through the lenticular lens 109 is enlarged from the center of the lenticular lens 109, the magnification ratio of the coordinate x1' is A times that of the coordinate x0' as shown in FIGS. 22 to 24.

In addition, when the x' coordinate of the viewing position is slightly greater than the x' coordinate of the center of the lenticular lens 109 as shown in FIG. 22, the x' coordinate 0 moves in the negative direction of the x' axis in comparison to the example of FIG. 20, and thus the coordinate x1' and the coordinate x0' become smaller.

In addition, when the x' coordinate of the viewing position is more slightly greater than the x' coordinate of the center of the lenticular lens 109 as shown in FIG. 23, both of the coordinate x0' and the coordinate x1' become 0.

Further, when the x' coordinate of the viewing position is far greater than the x' coordinate of the center of the lenticular lens 109 as shown in FIG. 24, the coordinate x0' has a positive value, and thus the movement direction of the coordinate x1' from the coordinate x0' is reversed from the examples of FIGS. 20 to 23.

As described above, the coordinate x1' is converted from the coordinate x0' based on the magnification ratio A and the x' coordinate of the viewing position.

Figure 25:
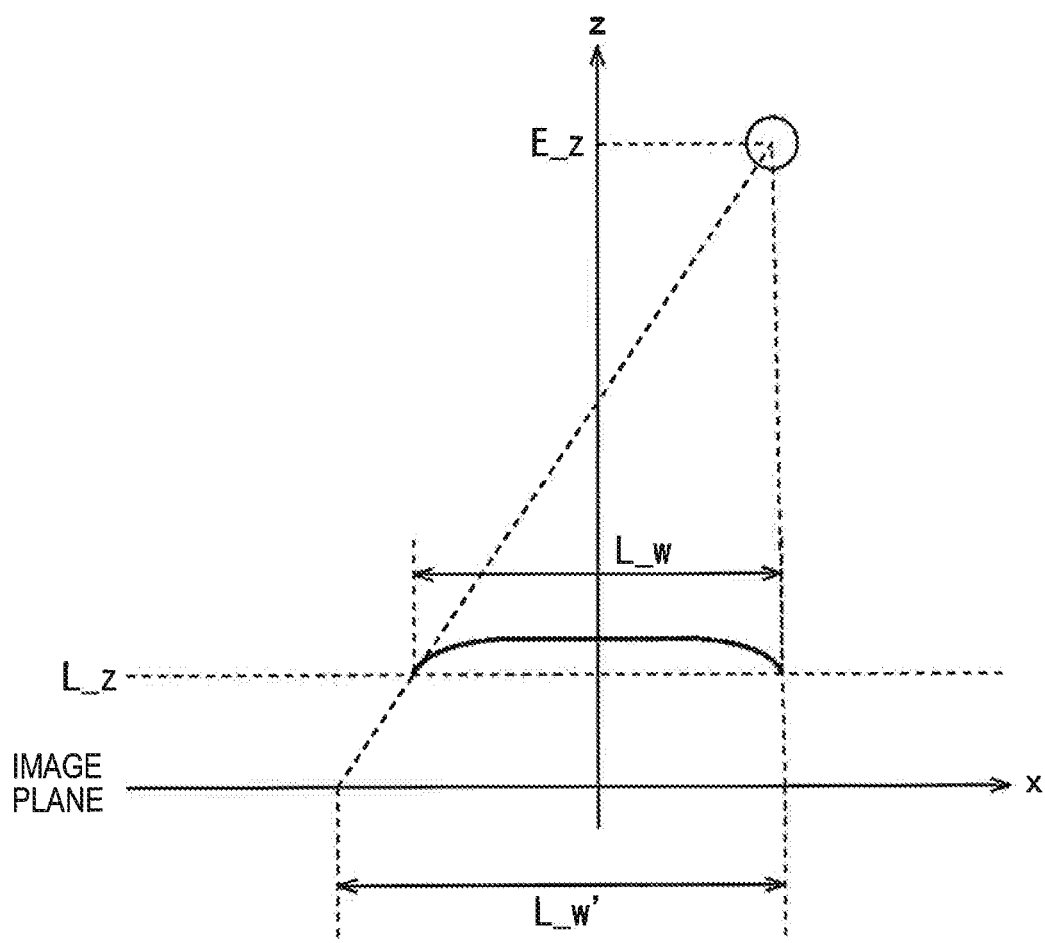
FIG. 25 is a diagram for describing calculation of a lenticular cell width L_w'.

To be specific, the coordinate x0' is first obtained. The coordinate x0' is a relative distance from the center of the lenticular lens 109. Thus, first, using the lenticular cell width L_w, the z coordinate of the viewing position E_z, and the thickness of glass on the display plane of the display unit 108 L_z as shown in FIG. 25, a lenticular cell width L_w' on the screen in the x axis direction is obtained from the following expression (14).

$$L\_w' = L\_w * E\_z / (E\_z - L\_z) \tag{14}$$

Figure 26:
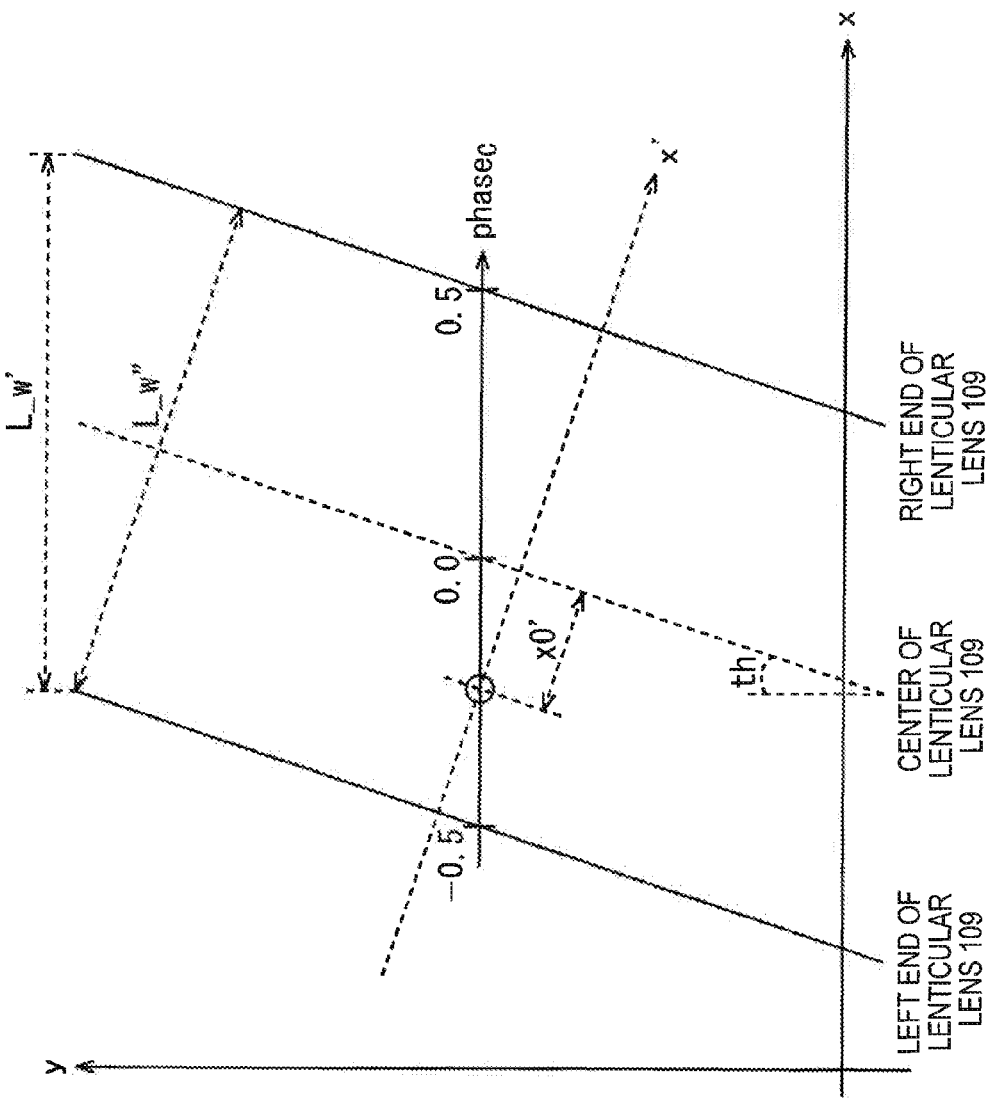
FIG. 26 is a diagram for describing calculation of another lenticular cell width L_w"

Next, from the following expression (15), a lenticular cell width L_w" on the screen in the x' axis direction is obtained using the inclination th and the lenticular cell width L_w' of the lenticular lens 109 as shown in FIG. 26.

$$L\_w'' = L\_w' * \cos(th) \tag{15}$$

Then, from the following expression (16), the coordinate x0' of each sub pixel is obtained using the lenticular cell width L_w" and the phase $phase_C$ of each sub pixel.

$$x0' = phase_C * L\_w \tag{16}$$

Figure 27:
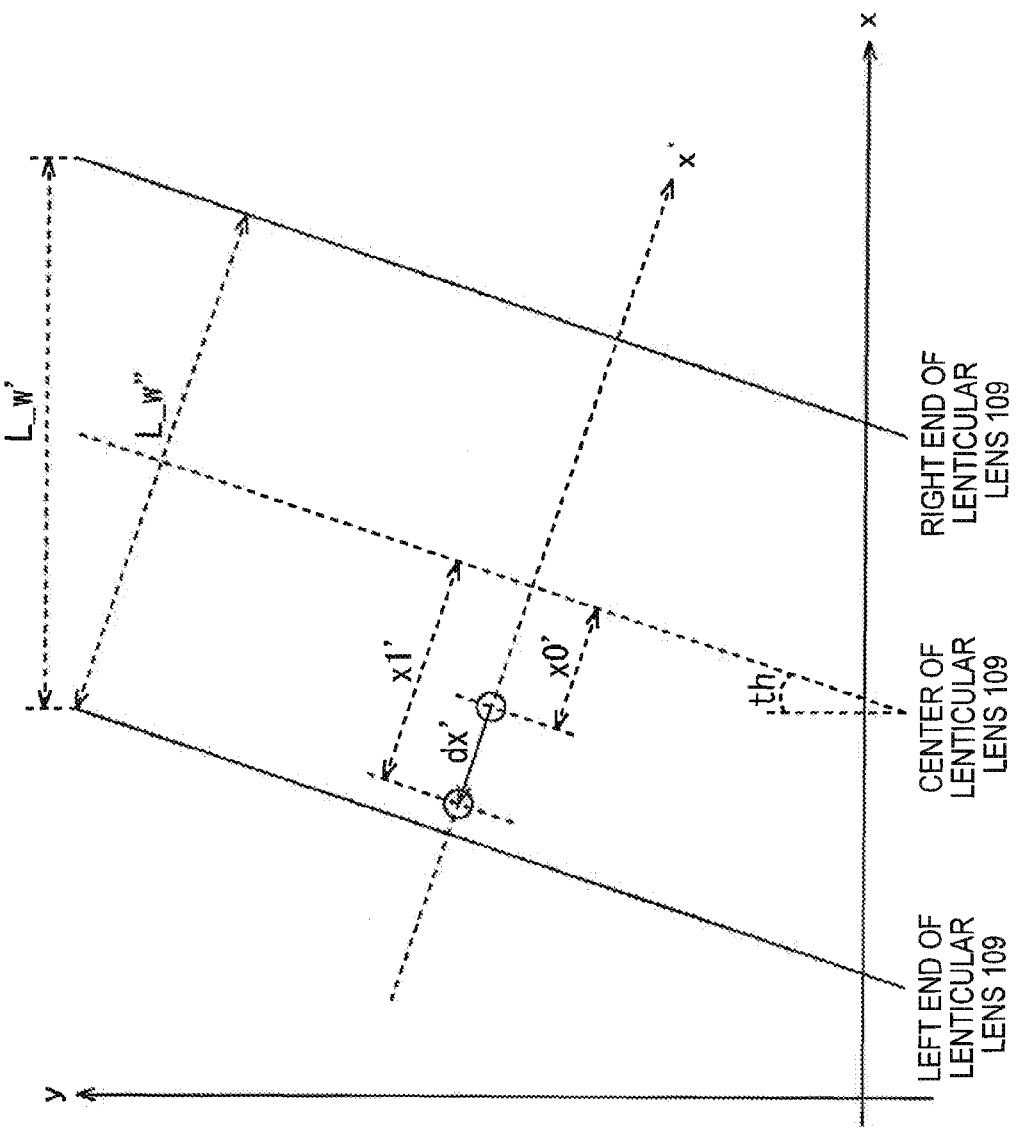
FIG. 27 is a diagram for describing calculation of the coordinate x1'.

Next, the coordinate x1' is obtained using the coordinate x0' and the magnification ratio A as shown in FIG. 27 from the following expression (17).

$$x1'=x0'^{*}A \qquad (17)$$

In addition, the difference dx' between the coordinate x1' and the coordinate x0' is expressed by the following expression (18).

$$dx'=x1'-x0' \qquad (18)$$

Figure 28:
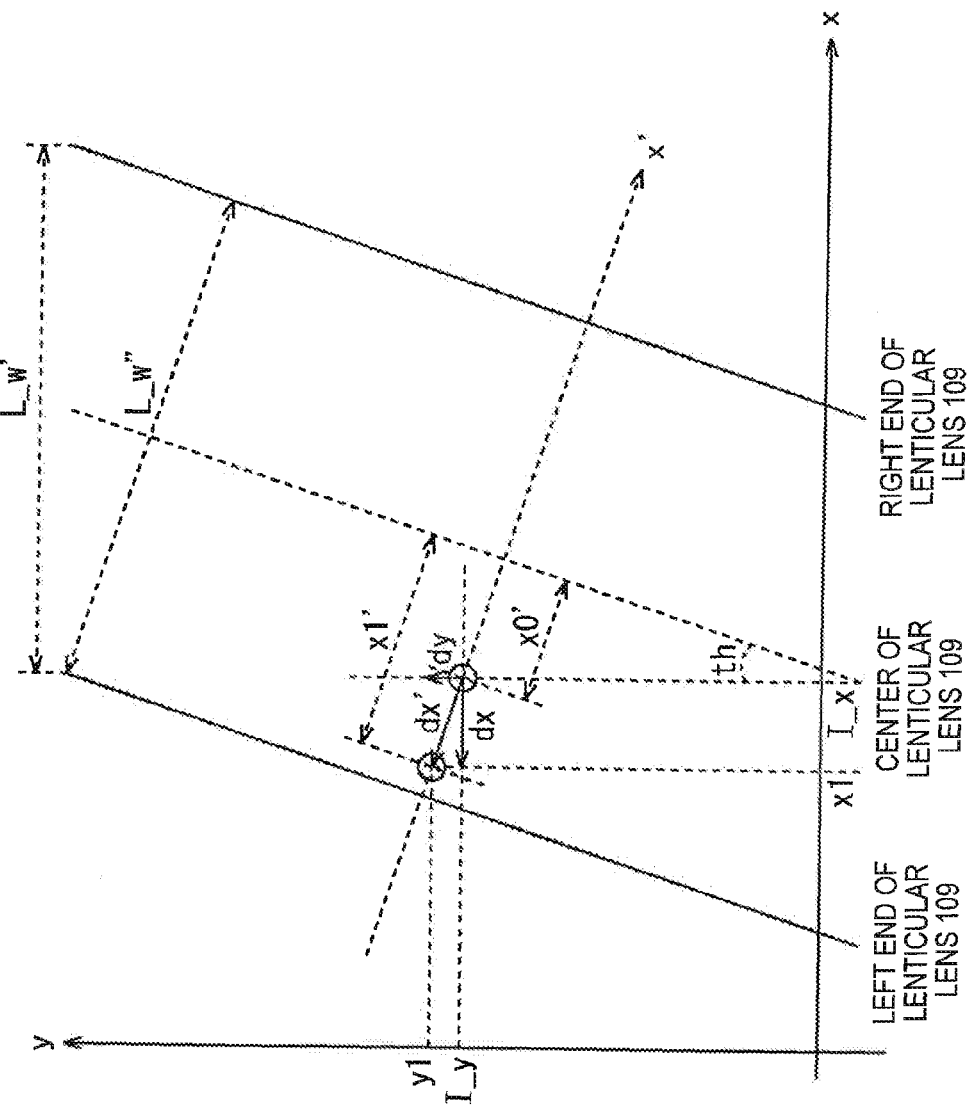
FIG. 28 is a diagram for describing calculation of a difference dx on an x axis and a difference dy on a y axis.

Next, using the difference dx', the x coordinate I_x, and the y coordinate I_y of a sub pixel, the x coordinate x1 and the y coordinate y1 of the position on the screen (which is enlarged in the oblique direction) in which the sub pixel is actually seen by a viewer are obtained. To be specific, first, the difference dx on the x axis and the difference dy on the y axis as shown in FIG. 28 are obtained from the difference dx' using the following expression (19).

$$dx=dx'^{*}\cos(th)$$

$$dy=dx'^{*}\sin(th) \qquad (19)$$

Next, a coordinate x1 and a coordinate y1 are obtained from the movement amount dx and the movement amount dy using the following expression (20).

$$x1=I\_x+dx$$

$$y1=I\_y+dy \qquad (20)$$

The L projection conversion unit 105 and the R projection conversion unit 106 each perform the calculations as described above so as to convert the coordinates (I_x, I_y) of each sub pixel on the screen of the display unit 108 into the coordinates (x1, y1) on the screen in which the image is actually seen by a viewer.

Then, the L projection conversion unit 105 and the R projection conversion unit 106 each generate an image of the coordinates (x1, y1) of each sub pixel from the image for the left eye and the image for the right eye. To be specific, when the coordinates (x1, y1) are the coordinates (I_x, I_y) of a sub pixel of the image for the left eye (or the image for the right eye), the L projection conversion unit 105 (or the R projection conversion unit 106) generates a pixel value of the sub pixel.

Figure 29:
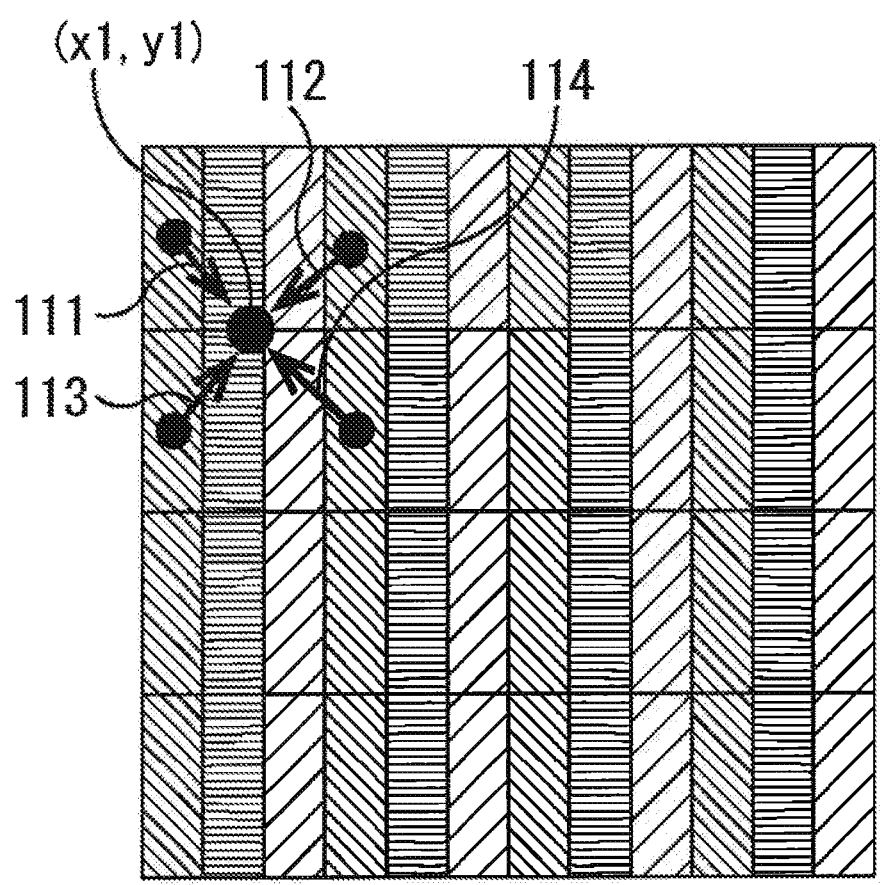
FIG. 29 is a diagram for describing a method for generating an image after projection conversion.

On the other hand, when the coordinates (x1, y1) are not the coordinates (I_x, I_y) of a sub pixel of the image for the left eye (or the image for the right eye), the L projection conversion unit 105 (or the R projection conversion unit 106) generates a pixel value of the coordinates (x1, y1) using, for example, the pixel values of sub pixels on the upper left, upper right, lower left, and lower right side of the coordinates (x1, y1) having the same color as shown in FIG. 29. Then, the L projection conversion unit 105 and the R projection conversion unit 106 set a generated image with the coordinates (x1, y1) of each sub pixel to be an image of the sub pixel after projection conversion.

<Configuration Example of the L Projection Conversion Unit and the R Projection Conversion Unit>

Figure 30:
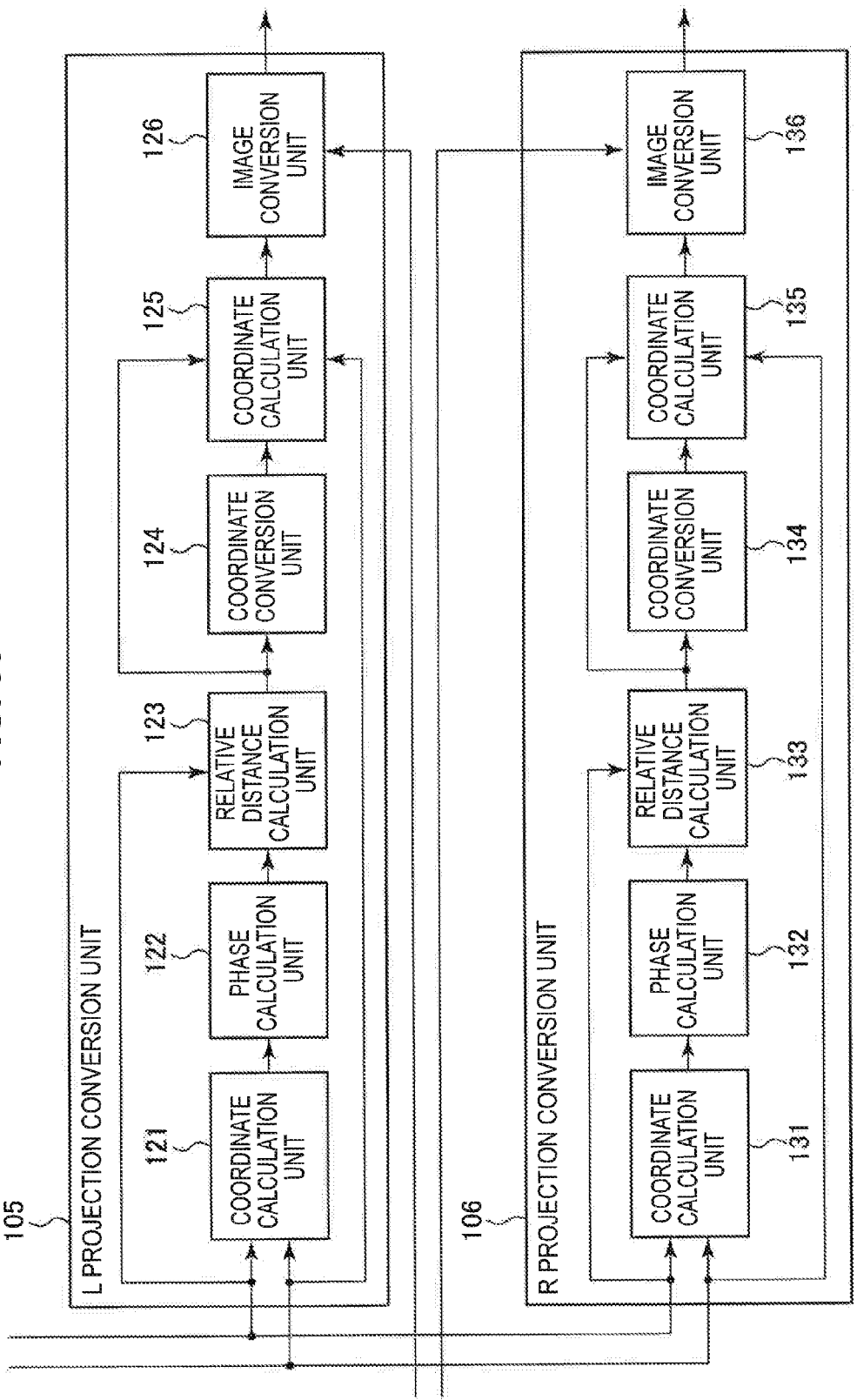
FIG. 30 is a block diagram illustrating a configuration example of an L projection conversion unit and an R projection conversion unit of FIG. 10.

FIG. 30 is a block diagram illustrating a configuration example of the L projection conversion unit 105 and the R projection conversion unit 106 of FIG. 10.

As shown in FIG. 30, the L projection conversion unit 105 is configured to have a coordinate calculation part 121, a phase calculation part 122, a relative distance calculation part 123, a coordinate conversion part 124, a coordinate calculation part 125, and an image conversion part 126.

Like the coordinate calculation unit 102 of FIG. 10, the coordinate calculation part 121 of the L projection conversion unit 105 calculates the coordinates (L_x, L_y) of each sub pixel on the lenticular lens 109 having the position of the middle of the eyebrows as a reference using the expressions (1), (6), and (7), or the expression (8) based on the position of the middle of the eyebrows supplied from the face detection unit 101 and the coordinates of each sub pixel on the screen input from the outside. The coordinate calculation part 121 supplies the coordinates (L_x, L_y) of each sub pixel to the phase calculation part 122.

Like the phase calculation unit 103, the phase calculation part 122 calculates the phase $phase_C$ of each sub pixel on the lenticular lens 109 having the position of the middle of the eyebrows as a reference using the above-described expression (13) based on the coordinates (L_x, L_y) of each sub pixel supplied from the coordinate calculation part 121. The phase calculation part 122 supplies the phase $phase_C$ to the relative distance calculation part 123.

The relative distance calculation part 123 obtains the coordinate x0' of each sub pixel using the expressions (14) to (16) described above based on the phase $phase_C$ of each sub pixel supplied from the phase calculation part 122 and the position of the middle of the eyebrows supplied from the face detection unit 101. The relative distance calculation part 123 supplies the coordinate x0' to the coordinate conversion part 124 and the coordinate calculation part 125.

The coordinate conversion part 124 obtains the coordinate x1' of each sub pixel using the expression (17) described above based on the coordinate x0' of each sub pixel supplied from the relative distance calculation part 123, and then supplies the coordinate to the coordinate calculation part 125.

The coordinate calculation part 125 obtains the coordinates (x1, y1) of each sub pixel using the expressions (18) to (20) described above based on the coordinate x0' of each sub pixel from the relative distance calculation part 123, the coordinate x1' of each sub pixel from the coordinate conversion part 124, and the coordinates of each sub pixel on the screen input from the outside. Then, the coordinate calculation part 125 supplies the coordinates (x1, y1) w of each sub pixel to the image conversion part 126.

The image conversion part 126 performs projection conversion on images for the left eye by generating images for the left eye with the coordinates (x1, y1) from the images for the left eye input from the outside for each sub pixel based on the coordinates (x1, y1) of each sub pixel supplied from the coordinate conversion part 124. The image conversion part 126 supplies the images for the left eye that have undergone the projection conversion to the blend processing unit 107 of FIG. 10.

The R projection conversion unit 106 is configured to have a coordinate calculation part 131, a phase calculation part 132, a relative distance calculation part 133, a coordinate conversion part 134, a coordinate calculation part 135, and an image conversion part 136. Since processes of each part of the R projection conversion unit 106 are the same as those of the corresponding parts of the L projection conversion unit 105 except for using the image for the right eye instead of the image for the left eye, description thereof will be omitted.

<Description of a Process by the Image Processing Device>

Figure 31:
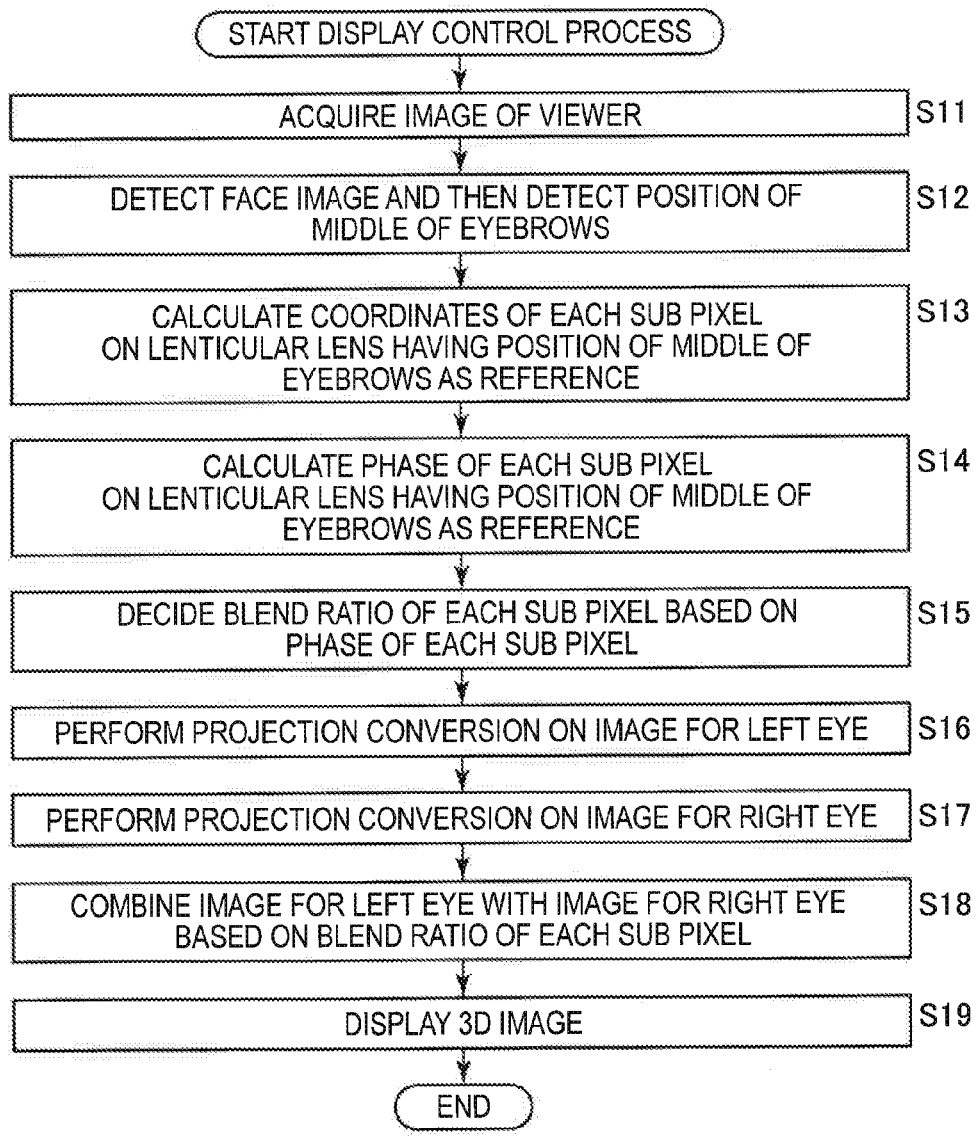
FIG. 31 is a flowchart for describing a display control process of the image processing device of FIG. 10.

FIG. 31 is a flowchart for describing a display control process of the image processing device 100 of FIG. 10. The display control process is started when, for example, an image for the left eye and an image for the right eye are input to the image processing device 100.

In Step S11 of FIG. 31, the face detection unit 101 of the image processing device 100 images a viewer, and thereby acquires an image of the viewer. In Step S12, the face detection unit 101 detects a face image from the image of the viewer, and detects the position of the middle of the eyebrows from the face image. The face detection unit 101 supplies the position of the middle of the eyebrows to the coordinate calculation unit 102, the L projection conversion unit 105, and the R projection conversion unit 106.

In Step S13, the coordinate calculation unit 102 calculates the coordinates (L_x, L_y) of each sub pixel on the lenticular lens 109 having the position of the middle of the eyebrows as a reference using the expressions (1), (6), and (7), or the expression (8) based on the position of the middle of the eyebrows supplied from the face detection unit 101 and the coordinates of each sub pixel on the screen. The coordinate calculation unit 102 supplies the calculated coordinates (L_x, L_y) of each sub pixel to the phase calculation unit 103.

In Step S14, the phase calculation unit 103 calculates the phase $phase_C$ of each sub pixel on the lenticular lens 109 having the position of the middle of the eyebrows as a reference using the expression (13) described above based on the coordinates (L_x, L_y) of each sub pixel supplied from the coordinate calculation unit 102. The phase calculation unit 103 supplies the calculated phase $phase_C$ of each sub pixel to the blend ratio calculation unit 104.

In Step S15, the blend ratio calculation unit 104 determines the blend ratio rate_l of the image for the left eye and the blend ratio rate_r of the image for the right eye of each sub pixel based on the phase $phase_C$ of each sub pixel supplied from the phase calculation unit 103, and supplies the ratios to the blend processing unit 107.

In Step S16, the L projection conversion unit 105 performs a projection conversion process on the image for the left eye based on the position of the middle of the eyebrows supplied from the face detection unit 101 and the coordinates of each sub pixel on the screen. Details of the projection conversion process will be described later with reference to FIG. 32. The L projection conversion unit 105 supplies the image for the left eye of each sub pixel that has undergone the projection conversion process to the blend processing unit 107.

In Step S17, the R projection conversion unit 106 performs a projection conversion process on the image for the right eye based on the position of the middle of the eyebrows supplied from the face detection unit 101 and the coordinates of each sub pixel on the screen in the same manner as the L projection conversion unit 105. The R projection conversion unit 106 supplies the image for the right eye of each sub pixel that has undergone the projection conversion process to the blend processing unit 107.

In Step S18, the blend processing unit 107 combines the image for the left eye from the L projection conversion unit 105 and the image for the right eye from the R projection conversion unit 106 for each sub pixel based on the blend ratio rate_l and the blend ratio rate_r of each sub pixel supplied from the blend ratio calculation unit 104.

In Step S19, the blend processing unit 107 supplies the combined image of each sub pixel to the display unit 108 as a 3D image, and thereby the 3D image is displayed on the display unit 108. Then, the process ends.

Figure 32:
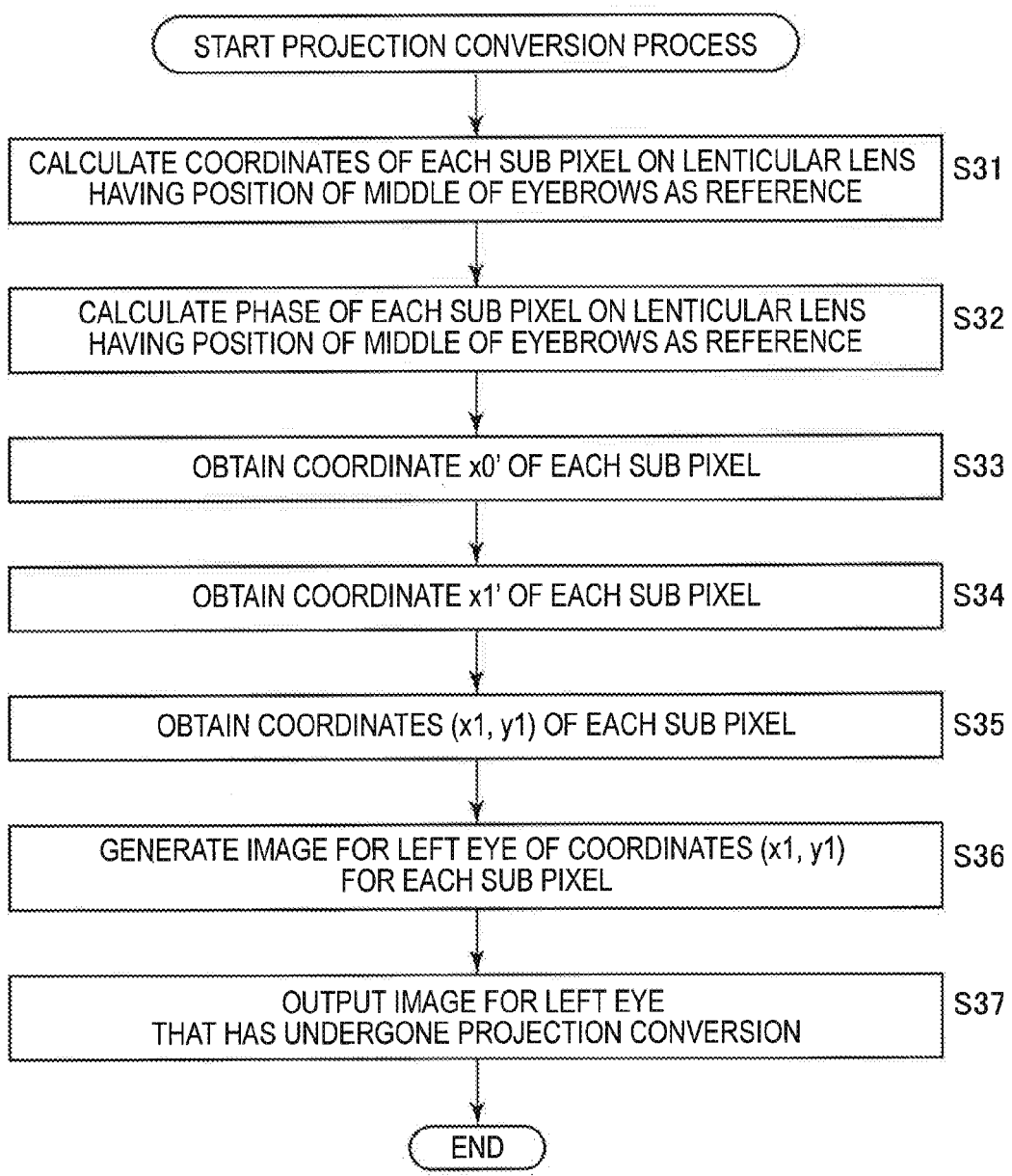
FIG. 32 is a flowchart for describing details of a projection conversion process of FIG. 31.

FIG. 32 is a flowchart for describing details of the projection conversion process of Step S16 of FIG. 31.

In Step S31 of FIG. 32, the coordinate calculation part 121 of the L projection conversion unit 105 calculates the coordinates (L_x, L_y) of each sub pixel on the lenticular lens 109 having the position of the middle of the eyebrows as a reference using the expressions (1), (6), and (7), or the expression (8) based on the position of the middle of the eyebrows supplied from the face detection unit 101 and the coordinates of each sub pixel on the screen input from the outside in the same manner as the coordinate calculation unit 102 of FIG. 10. The coordinate calculation part 121 supplies the coordinates (L_x, L_y) of each sub pixel to the phase calculation part 122.

In Step S32, the phase calculation part 122 calculates the phase $phase_C$ of each sub pixel on the lenticular lens 109 having the position of the middle of the eyebrows as a reference using the expression (13) described above based on the coordinates (L_x, L_y) of each sub pixel supplied from the coordinate calculation part 121 in the same manner as the phase calculation unit 103. The phase calculation part 122 supplies the phase $phase_C$ to the relative distance calculation part 123.

In Step S33, the relative distance calculation part 123 obtains the coordinate x0' of each sub pixel using the expressions (14) to (16) described above based on the phase $phase_C$ of each sub pixel supplied from the phase calculation part 122 and the position of the middle of the eyebrows supplied from the face detection unit 101. The relative distance calculation part 123 supplies the coordinate x0' to the coordinate conversion part 124 and the coordinate calculation part 125.

In Step S34, the coordinate conversion part 124 obtains the coordinate x1' of each sub pixel using the expression (17) described above based on the coordinate x0' of each sub pixel supplied from the relative distance calculation part 123, and then supplies the coordinate to the coordinate calculation part 125.

In Step S35, the coordinate calculation part 125 obtains the coordinates (x1, y1) of each sub pixel using the expressions (18) to (20) described above based on the coordinate x0' of each sub pixel from the relative distance calculation part 123, the coordinate x1' of each sub pixel from the coordinate conversion part 124, and the coordinates of each sub pixel on the screen input from the outside. Then, the coordinate calculation part 125 supplies the coordinates (x1, y1) w of each sub pixel to the image conversion part 126.

In Step S36, the image conversion part 126 performs projection conversion on the image for the left eye by generating an image for the left eye with the coordinates (x1, y1) from the image for the left eye input from the outside for each sub pixel based on the coordinates (x1, y1) of each sub pixel supplied from the coordinate conversion part 124.

In Step S37, the image conversion part 126 outputs the image for the left eye that has undergone the projection conversion to the blend processing unit 107 of FIG. 10, and then the process ends.

As described above, the image processing device 100 calculates the phase $phase_C$ of each sub pixel on the lenticular lens 109, and combines the image for the left eye and the image for the right eye for each sub pixel based on the phase $phase_C$. Accordingly, the image processing device 100 can combine the image for the left eye and the image for the right eye in sub pixels on the boundary of a region to which the image for the left eye is allocated and a region to which the image for the right eye is allocated. As a result, a 3D image with high image quality without conspicuous crosstalk that would otherwise occur on the boundary of an image for the left eye and an image for the right eye can be easily generated and displayed.

In addition, since the image processing device 100 obtains the phase $phase_C$ using the position of the middle of the eyebrows, the image processing device can precisely combine an image for the left eye and an image for the right eye on the boundary of the image for the left eye and the image for the right eye even when a viewing position is changed.

Second Embodiment

<Configuration Example of a Second Embodiment of the Image Processing Device>

Figure 33:
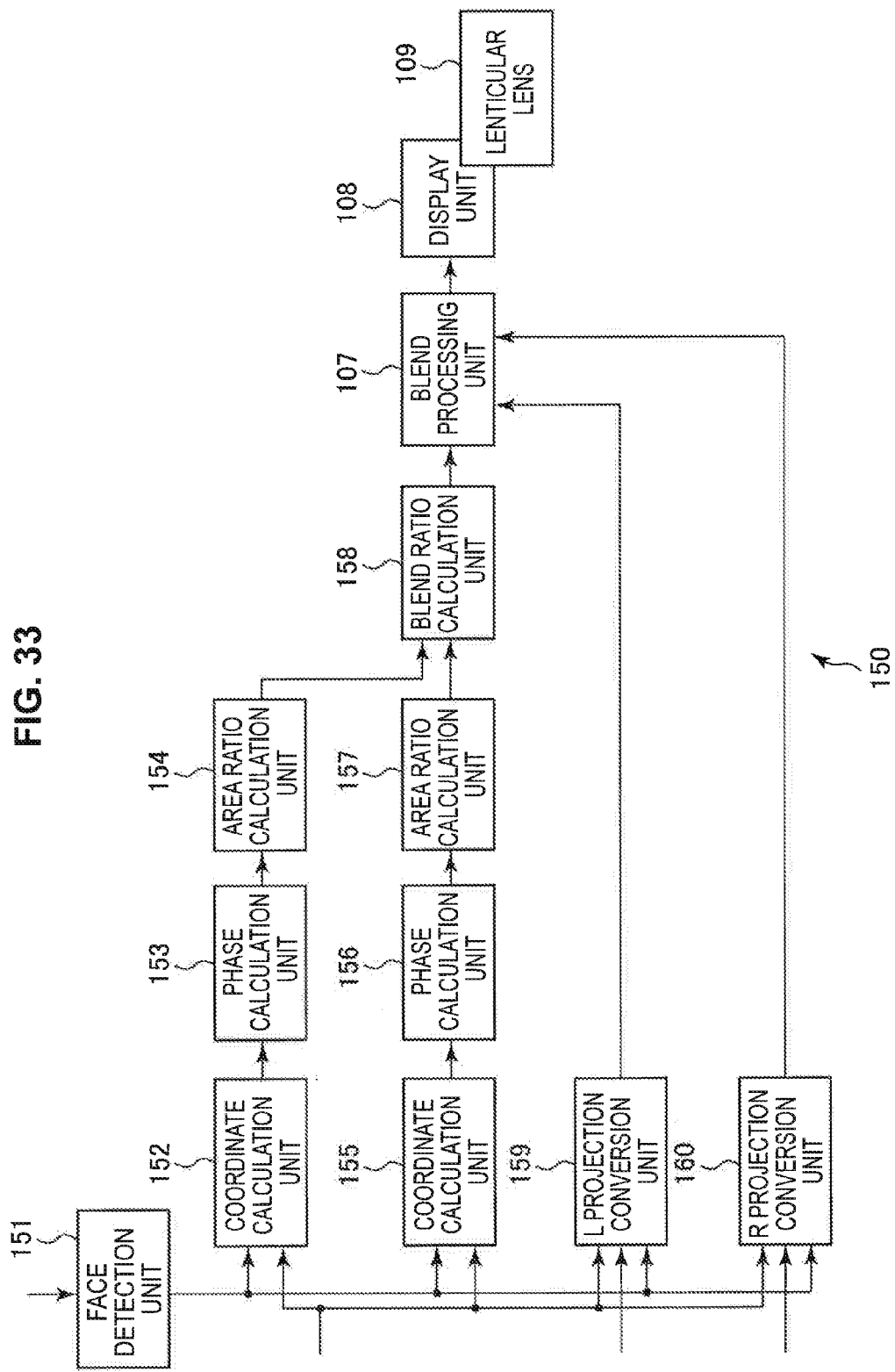
FIG. 33 is a block diagram illustrating a configuration example of a second embodiment of the image processing device to which the present technology is applied.

FIG. 33 is a block diagram illustrating a configuration example of a second embodiment of the image processing device to which the present technology is applied.

The same reference numerals are given to the constituent elements shown in FIG. 33 which are the same as those of FIG. 10. Overlapping description will be appropriately omitted.

The configuration of an image processing device 150 of FIG. 33 is different from the configuration of the image processing device 100 of FIG. 10 in that a face detection unit 151, a blend ratio calculation unit 158, an L projection conversion unit 159, and an R projection conversion unit 160 are provided instead of the face detection unit 101, the blend ratio calculation unit 104, the L projection conversion unit 105, and the R projection conversion unit 106, a coordinate calculation unit 152 and a coordinate calculation unit 155 are provided instead of the coordinate calculation unit 102, a phase calculation unit 153 and a phase calculation unit 156 are provided instead of the phase calculation unit 103, and an area ratio calculation unit 154 and an area ratio calculation unit 157 are newly provided.

The image processing device 150 of FIG. 33 combines an image for the left eye and an image for the right eye based on an area ratio of a region seen by the left eye and an area ratio of a region seen by the right eye in each sub pixel.

To be specific, the face detection unit 151 images a viewer, and thereby acquires an image of the viewer in the same manner as the face detection unit 101 of FIG. 10. The face detection unit 151 detects a face image from the image of the viewer, and detects the position of the left eye and the position of the right eye from the face image. The face detection unit 151 supplies the position of the left eye to the coordinate calculation unit 152 and the L projection conversion unit 159, and supplies the position of the right eye to the coordinate calculation unit 155 and the R projection conversion unit 160.

The coordinate calculation unit 152 calculates the coordinates of each sub pixel on the lenticular lens 109 having the position of the left eye as a reference based on the position of the left eye supplied from the face detection unit 151 and the coordinates of each sub pixel on the screen input from the outside. To be specific, the coordinate calculation unit 152 calculates the expressions (1), (6), and (7), or the expression (8) by applying the position of the left eye thereto as a viewing position ($E\_x$, $E\_y$, and $E\_z$). Then, the coordinate calculation unit 152 sets the coordinates ($L\_x$, $L\_y$) of each sub pixel on the lenticular lens 109 obtained as a result of the calculation to be the coordinates of each sub pixel on the lenticular lens 109 having the position of the left eye as a reference. The coordinate calculation unit 152 supplies the calculated coordinates of each sub pixel to the phase calculation unit 153.

The phase calculation unit 153 calculates the phase of each sub pixel on the lenticular lens 109 having the position of the left eye as a reference using the expression (13) described above based on the coordinates of each sub pixel supplied from the coordinate calculation unit 152, and then supplies the calculated phase to the area ratio calculation unit 154.

The area ratio calculation unit 154 calculates the area ratio of a region in each sub pixel seen by the left eye based on the phase of each sub pixel supplied from the phase calculation unit 153, and supplies the calculated area ratio to the blend ratio calculation unit 158.

Since description with regard to the coordinate calculation unit 155, the phase calculation unit 156, and the area ratio calculation unit 157 is the same as that of the coordinate calculation unit 152, the phase calculation unit 153, and the area ratio calculation unit 154 except for replacing the left eye with the right eye, the description is omitted.

The blend ratio calculation unit 158 calculates blend ratios of an image for the left eye and an image for the right eye based on the area ratio of the region in each sub pixel seen by the left eye supplied from the area ratio calculation unit 154 and the area ratio of a region in each sub pixel seen by the right eye supplied from the area ratio calculation unit 157. The blend ratio calculation unit 158 supplies the blend ratios of the image for the left eye and the image for the right eye to the blend processing unit 107.

The L projection conversion unit 159 acquires an image for the left eye input from the outside in the same manner as the L projection conversion unit 105 of FIG. 10. The L projection conversion unit 159 performs projection conversion on the image for the left eye based on the position of the left eye supplied from the face detection unit 151 and the coordinates of each sub pixel on the screen input from the outside. The L projection conversion unit 159 supplies the image for the left eye that has undergone the projection conversion to the blend processing unit 107.

The R projection conversion unit 160 acquires an image for the right eye input from the outside in the same manner as the R projection conversion unit 106 of FIG. 10. The R projection conversion unit 160 performs projection conversion on the image for the right eye based on the position of the right eye supplied from the face detection unit 151 and the coordinates of each sub pixel on the screen input from the outside. The R projection conversion unit 160 supplies the image for the right eye of each sub pixel that has undergone the projection conversion to the blend processing unit 107.

<Description of Changes of a Region Seen by the Left Eye and a Region Seen by the Right Eye According to Viewing Positions>

FIG. 34 is a table for describing changes of a region seen by the left eye and a region seen by the right eye according to viewing positions Note that, in FIG. 34, regions shaded with lines inclined upward to the left indicate regions on a screen seen by the right eye, and regions shaded with lines inclined upward to the right indicate regions on the screen seen by the left eye. In addition, oblique solid lines indicate boundaries of the lenticular lens 109, and oblique dotted lines indicate the center positions of the lenticular lens 109.

As shown in the second row of FIG. 34, when a viewing position is an optimum viewing position of a proper viewing position, the region seen by the right eye does not overlap but is adjacent to the region seen by the left eye. On the other hand, when the viewing position is a proper viewing position other than the optimum viewing position, the region seen by the right eye does not overlap the region seen by the left eye as shown in the third to the fifth rows, but a margin is generated on at least one of the boundaries of the regions seen by the right eye and the regions seen by the left eye.

Meanwhile, when the viewing position is not a proper viewing position, at least one of the boundaries of the regions seen by the right eye and the regions seen by the left eye overlap, and thereby overlapping pixels are generated as shown in the sixth to tenth rows. The area ratios of the regions seen by the left eye and the regions seen by the right eye in the overlapping pixels change according to viewing positions.

<Description of Calculation of an Area Ratio>

Figure 35:
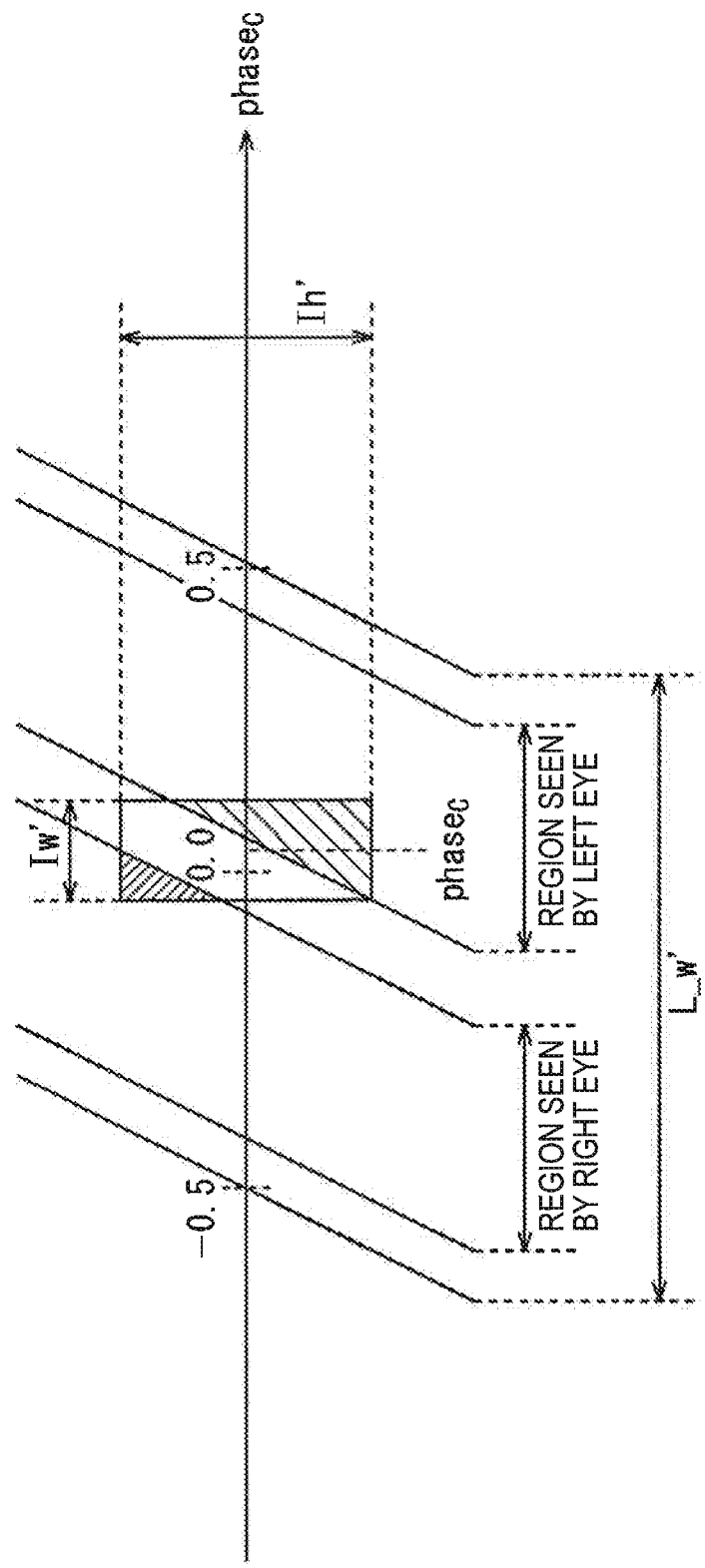
FIG. 35 is a diagram illustrating the relationship between the phase $phase_C$ and a cell width L_w' of the lenticular lens on a screen.

FIG. 35 is a diagram illustrating the relationship between the phase $phase_C$ with reference to the position of the middle of the eyebrows and a cell width $L\_w'$ of the lenticular lens 109 on a screen.

As shown in FIG. 35, when the position of the middle of the eyebrows is set to be a viewing position, the range of the phase $phase_C$ equal to or greater than −0.5 and equal to or smaller than 0.5 with reference to the position of the middle of the eyebrows corresponds to the cell width $L\_w'$ of the lenticular lens 109 on the screen. Thus, the horizontal width Iw and the vertical width Ih of a sub pixel can be normalized based on the phase $phase_C$ using the following expression (21).

$$Iw'=Iw/L\_w'$$

$$Ih'=Ih/L\_w' \quad (21)$$

Note that, in the expression (21), Iw' is the horizontal width Iw of a sub pixel after normalization, and Ih' is the vertical width Th of the sub pixel after normalization.

As shown in FIG. 35, sub pixels having a phase $phase_C$ around 0 become overlapping pixels.

Figure 36:
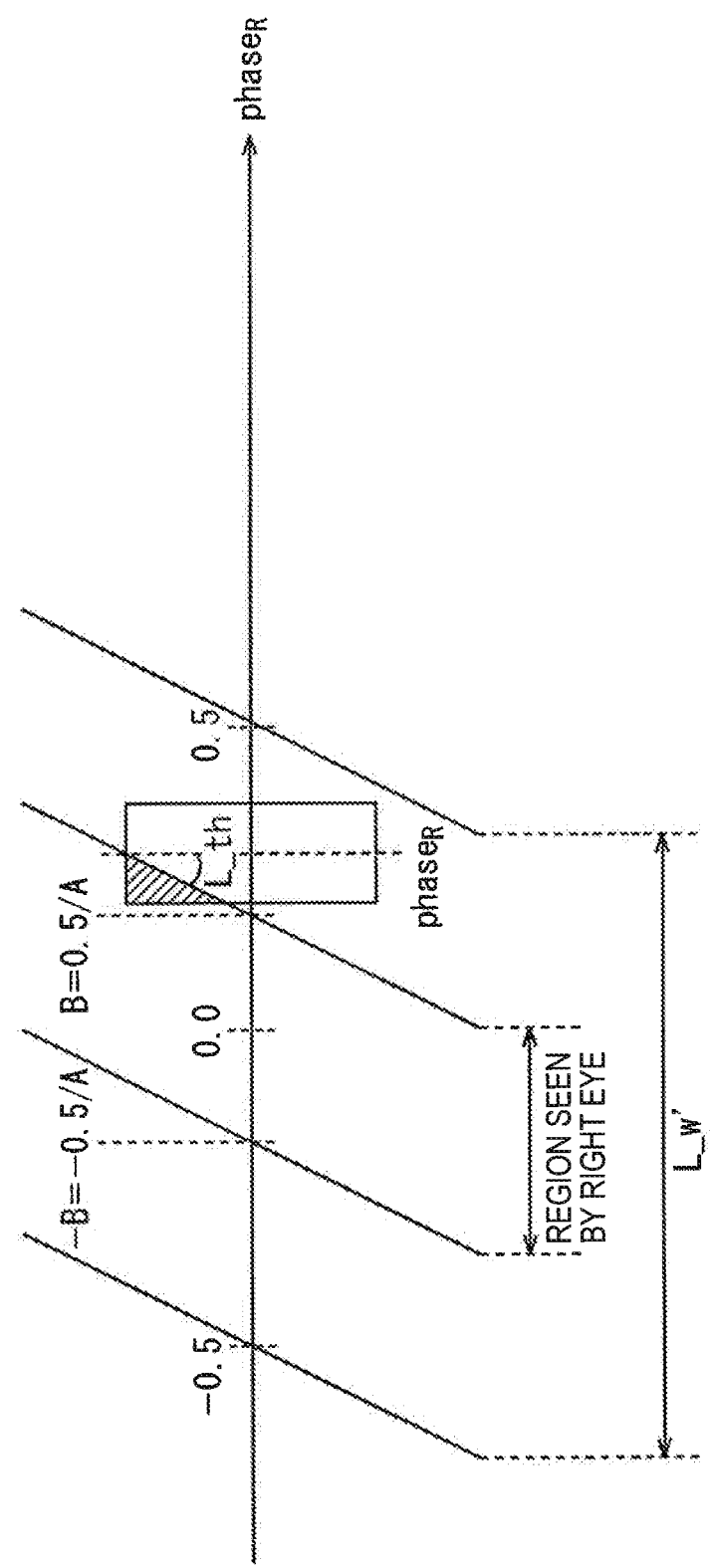
FIG. 36 is a diagram illustrating a region seen by the right eye when the position of the right eye is set to be a viewing position.

FIG. 36 is a diagram illustrating a region seen by the right eye when the position of the right eye is set to be a viewing position.

As shown in FIG. 36, when the position of the right eye is set to be a viewing position, if the magnification ratio A is set to be 1, the range of a phase $phase_R$ equal to or greater than −0.5 and equal to or smaller than 0.5 with reference to the position of the right eye becomes the region seen by the right eye. Thus, the maximum value B of absolute values in the range of the phase $phase_R$ of the region seen by the right eye is 0.5/A. In other words, the range of the phase $phase_R$ of the region seen by the right eye is equal to or greater than −0.5/A and equal to or smaller than 0.5/A.

Figure 37:
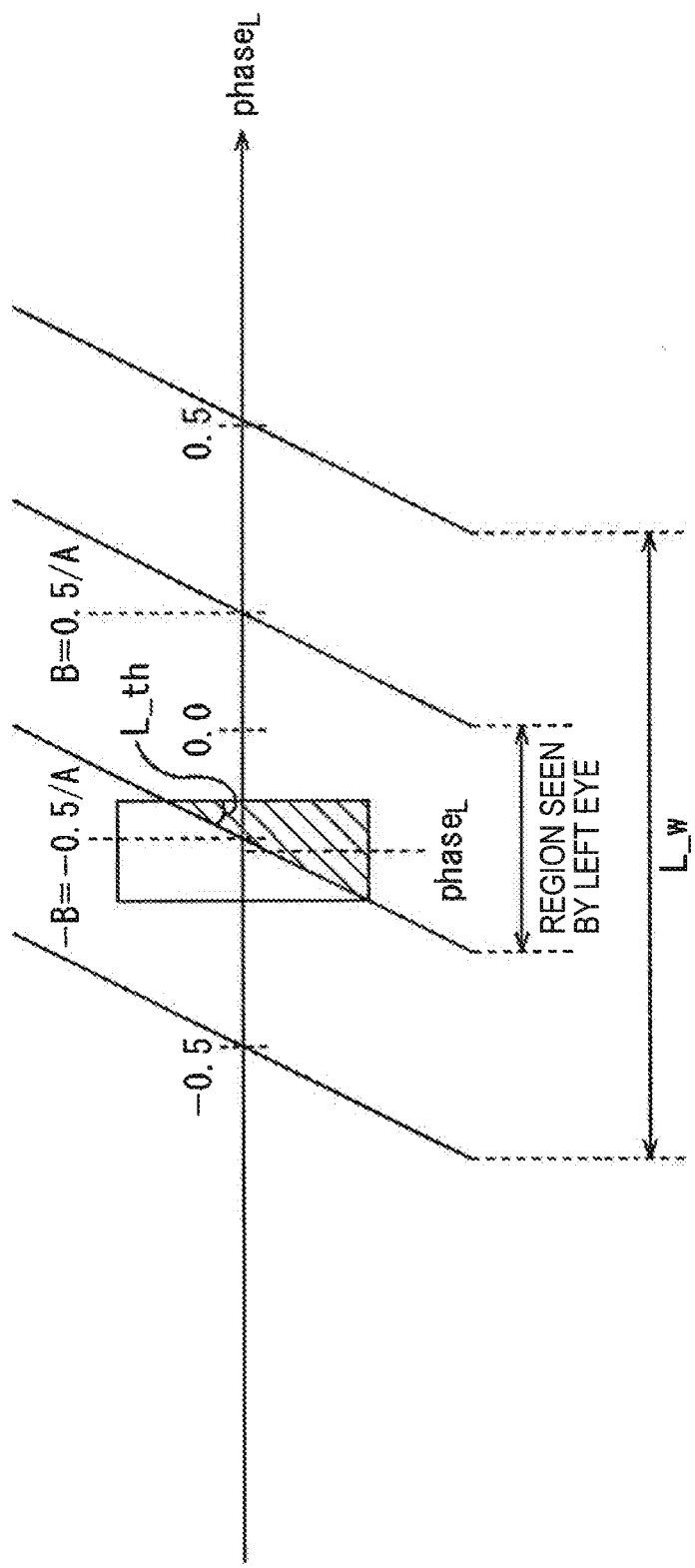
FIG. 37 is a diagram illustrating a region seen by the left eye when the position of the left eye is set to be a viewing position.

FIG. 37 is a diagram illustrating a region seen by the left eye when the position of the left eye is set to be a viewing position.

As shown in FIG. 37, when the position of the left eye is set to be a viewing position, if the magnification ratio A is set to be 1, the range equal to or greater than −0.5 and equal to or smaller than 0.5 of a phase $phase_L$ having the position of the left eye as a reference becomes the region seen by the left eye. Thus, the maximum value B of absolute values in the range of the phase $phase_L$ of the region seen by the left eye is 0.5/A. In other words, the range of the phase $phase_L$ of the region seen by the left eye is equal to or greater than −0.5/A and equal to or smaller than 0.5/A.

The area ratio calculation unit 154 of FIG. 33 obtains the area ratio of the region seen by the left eye in each sub pixel based on the phase $phase_L$ and the maximum value B of the phase $phase_L$ described above. In addition, the area ratio calculation unit 157 obtains the area ratio of the region seen by the left eye in each sub pixel based on the phase $phase_L$ and the maximum value B of the phase $phase_L$. Using FIGS. 38A to 49, a method for obtaining an area ratio of the region seen by the right eye in each sub pixel based on phase $phase_R$ and the maximum value B of the phase $phase_R$ will be described.

FIGS. 38A to 38E are diagrams for describing divided conditions for defining the relationship between the phase $phase_R$ and an area ratio when $\tan(L\_th) \times Ih'/2 \leq Iw'/2$ is satisfied.

Figure 38A:
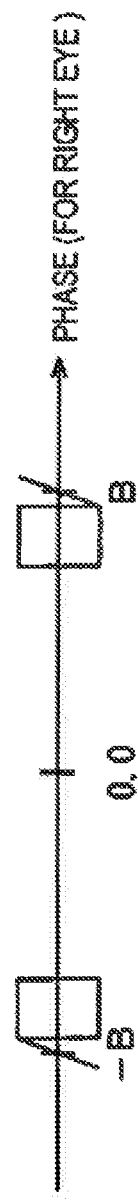
FIGS. 38A to 38E are diagrams for describing divided conditions for defining the relationship between a phase $phase_R$ and an area ratio when $\tan(L\_th) \times Ih'/2 \leq Iw'/2$ is satisfied.
Figure 38B:
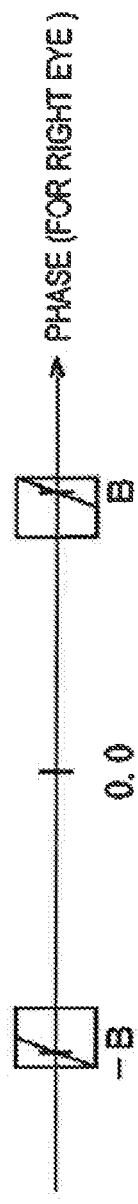

As shown in FIG. 38A, when $\tan(L\_th) \times Ih'/2 \leq Iw'/2$ is satisfied, a first condition is:

$$-B+\tan(L\_th)*Ih'/2+Iw'/2 \leq phase_R \leq B-\tan(L\_th)*Ih'/2-Iw'/2$$

and as shown in FIG. 38B, a second condition is:

$$-B-\tan(L\_th)*Ih'/2+Iw'/2 \leq phase_R \leq -B+\tan(L\_th)*Ih'/2+Iw'/2$$

$$B-\tan(L\_th)*Ih'/2-Iw'/2 < phase_R \leq B+\tan(L\_th)*Ih'/2-Iw'/2$$

Figure 38C:
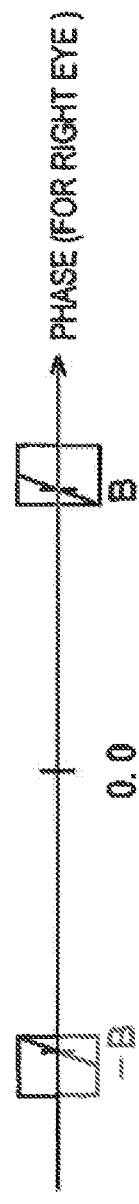
Figure 38D:
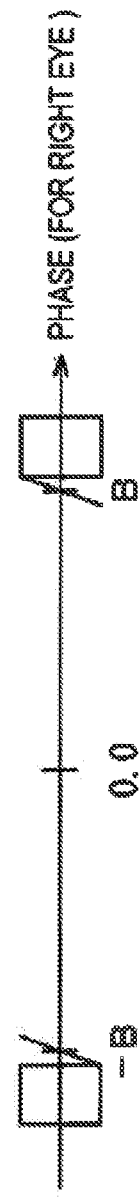

In addition, as shown in FIG. 38C, a third condition is:

$$-B+\tan(L\_th)*Ih'/2-Iw'/2 \leq phase_R < -B-\tan(L\_th)*Ih'/2+Iw'/2$$

$$B+\tan(L\_th)*Ih'/2-Iw'/2 < phase_R \leq B-\tan(L\_th)*Ih'/2-Iw'/2$$

and as shown in FIG. 38D, a fourth condition is:

$$-B+\tan(L\_th)*Ih'/2-Iw'/2 \leq phase_R < -B+\tan(L\_th)*Ih'/2+Iw'/2$$

$$B-\tan(L\_th)*Ih'/2+Iw'/2 < phase_R \leq B+\tan(L\_th)*Ih'/2+Iw'/2$$

Figure 38E:
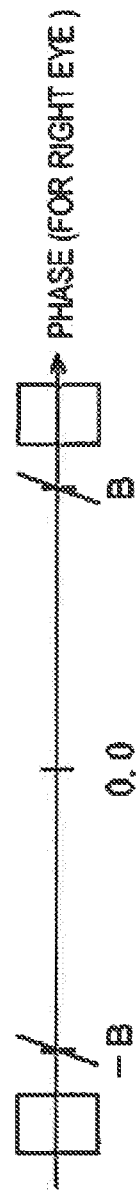

Furthermore, as shown in FIG. 38E, a fifth condition is:

$$phase_R < -B-\tan(L\_th)*Ih'/2-Iw'/2$$

$$phase_R > B+\tan(L\_th)*Ih'/2+Iw'/2$$

FIG. 39 is a diagram illustrating an area ratio of the region seen by the right eye in a sub pixel under the first condition of FIG. 38.

As shown in FIG. 39, under the first condition, since the whole region of the sub pixel is included in the region seen by the right eye, an area ratio area_r of the region seen by the right eye is decided to be 1.

Figure 40:
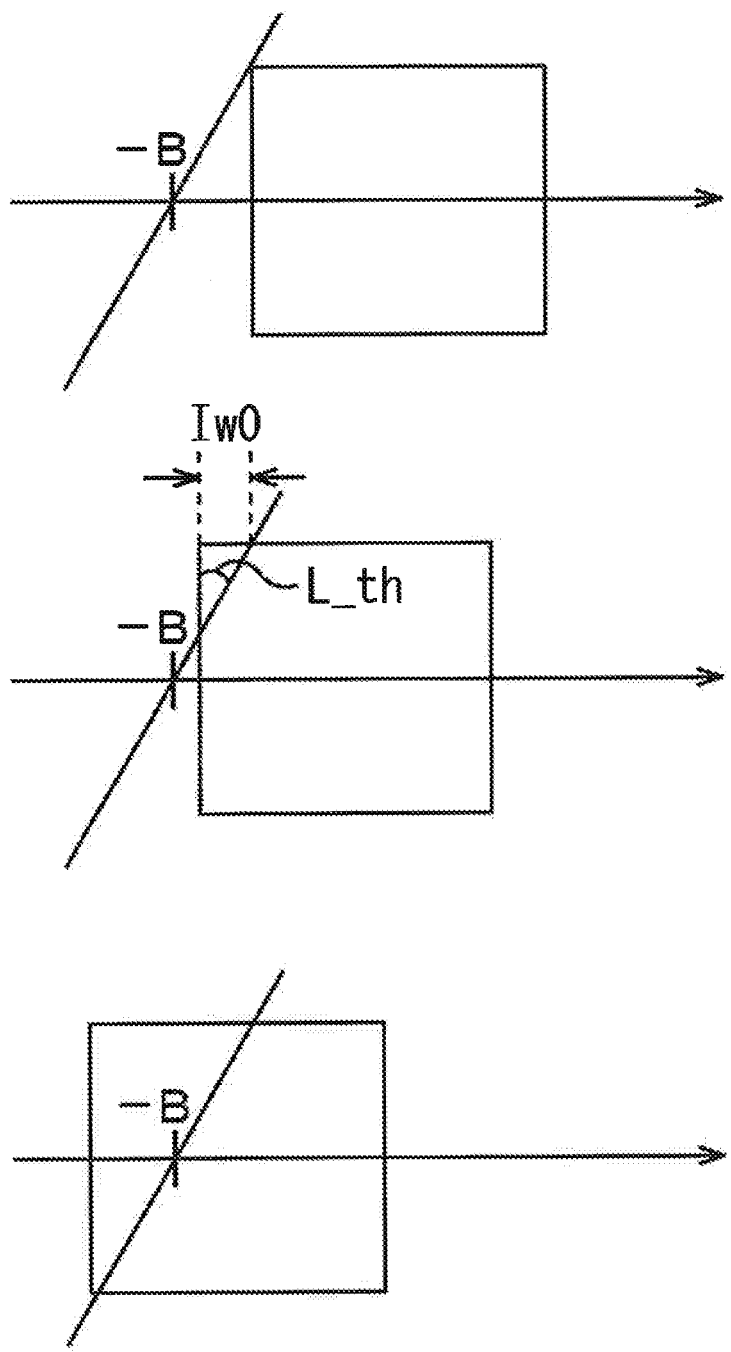
FIG. 40 is a diagram illustrating an area ratio of the region seen by the right eye in the sub pixel under a second condition of FIG. 38.

FIG. 40 is a diagram illustrating an area ratio of the region seen by the right eye in the sub pixel under the second condition of FIG. 38.

As shown in FIG. 40, under the second condition, a boundary of the region seen by the right eye is present in the sub pixel, and the region outside the boundary of the region seen by the right eye has a triangular shape. Thus, using the following expression (27), the area ratio of the region of the sub pixel inside the boundary of the region seen by the right eye to the area of the sub pixel is obtained as an area ratio area_r of the region seen by the right eye.

$$area\_r=(Ih'*Iw'-Iw0*Iw0/[2*\tan(L\_th)])/(Ih'*Iw')$$

$$\text{wherein, } Iw0=B+\tan(L\_th)*Ih'/2+Iw'/2-phase_R \quad (27)$$

FIG. 41 is a diagram illustrating an area ratio of the region seen by the right eye in the sub pixel under the third condition of FIG. 38.

As shown in FIG. 41, under the third condition, a boundary of the region seen by the right eye is present in the sub pixel, and the region outside the boundary of the region seen by the right eye has a square shape. Thus, using the following expression (28), the area ratio of the region of the sub pixel inside the boundary of the region seen by the right eye to the area of the sub pixel is obtained as an area ratio area_r of the region seen by the right eye.

$$area\_r=(Ih'*Iw'-Ih'*Ih'*\tan(L\_th)/2-Ih'*Iw1)/(Ih'*Iw')$$

$$\text{Wherein, } Iw1=-B-\tan(L\_th)*Ih'/2+Iw'/2-phase_R \quad (28)$$

FIG. 42 is a diagram illustrating an area ratio of the region seen by the right eye in the sub pixel under the fourth condition of FIG. 38.

As shown in FIG. 42, under the fourth condition, a boundary of the region seen by the right eye is present in the sub pixel, and the region outside the boundary of the region seen by the right eye has a triangular shape. Thus, using the following expression (29), the area ratio of the region of the sub pixel inside the boundary of the region seen by the right eye to the area of the sub pixel is obtained as an area ratio area_r of the region seen by the right eye.

$$area\_r=(Iw2*Iw2/[2*\tan(L\_th)])/(Ih'*Iw')$$

$$\text{Wherein, } Iw2=phase_R-(-B-\tan(L\_th)*Ih'/2-Iw'/2) \quad (29)$$

FIG. 43 is a diagram illustrating an area ratio of the region seen by the right eye in the sub pixel under the fifth condition of FIG. 38.

As shown in FIG. 43, under the fifth condition, the whole region of the sub pixel is outside the region seen by the right eye, and thus the area ratio area_r of the region seen by the right eye is decided to be 0.

FIGS. 44A to 44E are diagrams for describing divided conditions for defining the relationship between the phase $phase_R$ and an area ratio when $\tan(L\_th) \times Ih'/2 > Iw'/2$ is satisfied.

Figure 44A:
FIGS. 44A to 44E are diagrams for describing divided conditions for defining the relationship between a phase $phase_R$ and an area ratio when $\tan(L\_th) \times Ih'/2 > Iw'/2$ is satisfied.
Figure 44B:
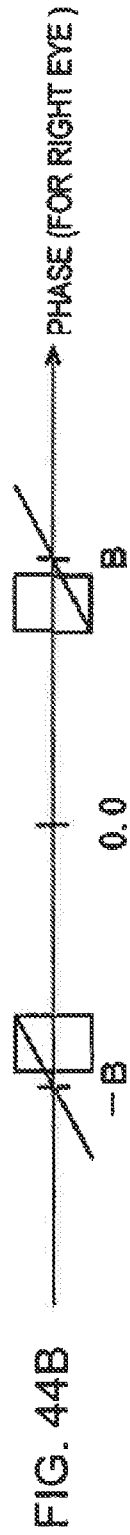

As shown in FIG. 44A, when $\tan(L\_th) \times Ih'/2 > Iw'/2$ is satisfied, a first condition is:

$$-B+\tan(L\_th)*Ih'/2+Iw'/2 \leq phase_R \leq B-\tan(L\_th)*Ih'/2-Iw'/2,$$

and as shown in FIG. 44B, a second condition is:

$$-B+\tan(L\_th)*Ih'/2-Iw'/2 \leq phase_R < -B+\tan(L\_th)*Ih'/2+Iw'/2$$

$$B-\tan(L\_th)*Ih'/2-Iw'/2 < phase_R \leq B-\tan(L\_th)*Ih'/2+Iw'/2.$$

Figure 44C:
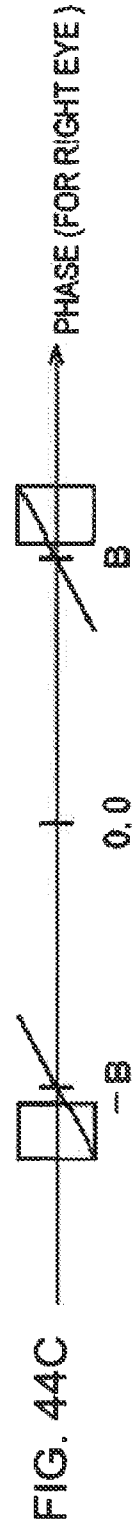
Figure 44D:
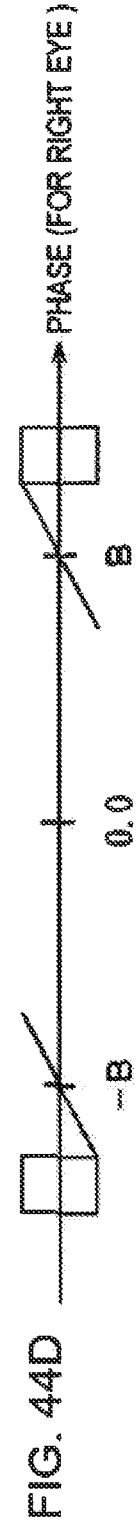

In addition, as shown in FIG. 44C, a third condition is:

$$-B-\tan(L\_th)*Ih'/2+Iw'/2 \leq phase_R < -B+\tan(L\_th)*Ih'/2-Iw'/2,$$

$$B-\tan(L\_th)*Ih'/2+Iw'/2 < phase_R \leq B+\tan(L\_th)*Ih'/2-Iw'/2$$

and as shown in FIG. 44D, a fourth condition is:

$$-B-\tan(L\_th)*Ih'/2-Iw'/2 \leq phase_R < -B-\tan(L\_th)*Ih'/2+Iw'/2$$

$$B+\tan(L\_th)*Ih'/2-Iw'/2 < phase_R \leq B+\tan(L\_th)*Ih'/2+Iw'/2.$$

Figure 44E:
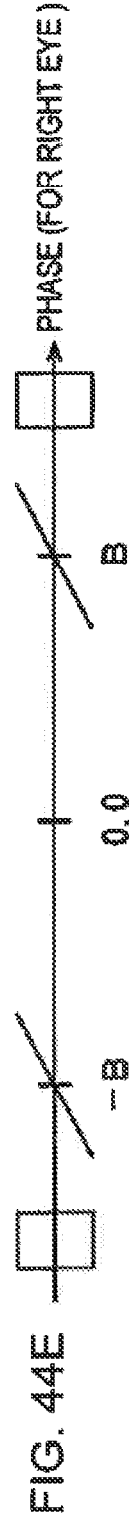

Further, as shown in FIG. 44E, a fifth condition is:

$$phase_R < -B-\tan(L\_th)*Ih'/2-Iw'/2$$

$$phase_R > B+\tan(L\_th)*Ih'/2+Iw'/2.$$

FIG. 45 is a diagram illustrating an area ratio of a region seen by the right eye in a sub pixel under the first condition of FIG. 44.

As shown in FIG. 45, under the first condition, the whole region of the sub pixel is included in the region seen by the right eye, and thus the area ratio area_r of the region seen by the right eye is decided to be 1.

FIG. 46 is a diagram illustrating an area ratio of the region seen by the right eye in the sub pixel under the second condition of FIG. 44.

As shown in FIG. 46, under the second condition, a boundary of the region seen by the right eye is present in the sub pixel, and the region outside the boundary of the region seen by the right eye has a triangular shape. Thus, using the following expression (35), the area ratio of the region of the sub pixel inside the boundary of the region seen by the right eye to the area of the sub pixel is obtained as an area ratio area_r of the region seen by the right eye.

$$area\_r = (Ih'*Iw' - Iw0*Iw0*/[2*\tan(L\_th)])/(Ih'*Iw')$$

$$\text{Wherein,} Iw0 = -B + \tan(L\_th)*Ih'/2 + Iw'/2 - phase_R \quad (35)$$

Figure 47:
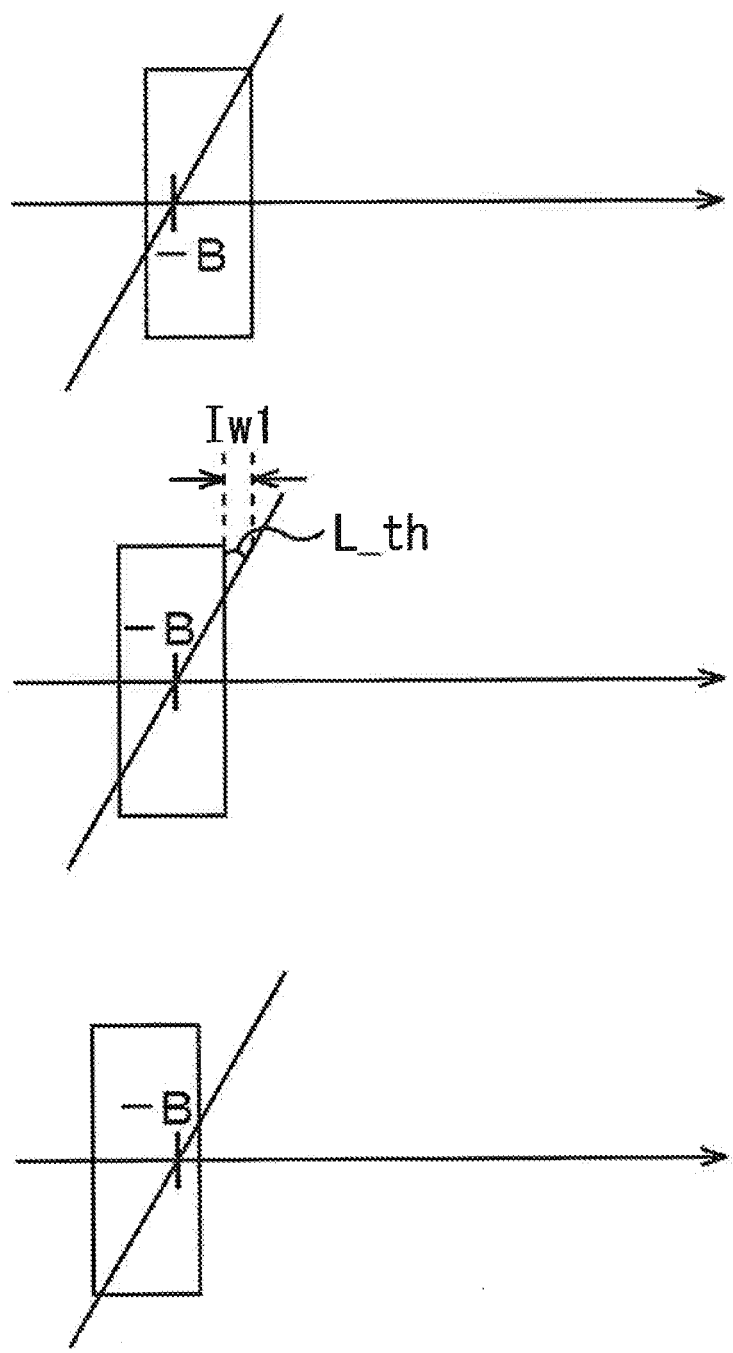
FIG. 47 is a diagram illustrating an area ratio of the region seen by the right eye in the sub pixel under a third condition of FIG. 44.

FIG. 47 is a diagram illustrating an area ratio of the region seen by the right eye in the sub pixel under the third condition of FIG. 44.

As shown in FIG. 47, under the third condition, a boundary of the region seen by the right eye is present in the sub pixel, and the region outside the boundary of the region seen by the right eye has a square shape. Thus, using the following expression (36), the area ratio of the region of the sub pixel inside the boundary of the region seen by the right eye to the area of the sub pixel is obtained as an area ratio area_r of the region seen by the right eye.

$$area\_r = (Ih'*Iw' - Iw'*Iw'/[2*\tan(L\_th)] - Iw'*Iw1/\tan(L\_th))/(Ih'*Iw')$$

$$\text{Wherein,} Iw1 = -B + \tan(L\_th)*Ih'/2 - Iw'/2 - phase_R \quad (36)$$

FIG. 48 is a diagram illustrating an area ratio of the region seen by the right eye in the sub pixel under the fourth condition of FIG. 44.

As shown in FIG. 48, under the fourth condition, a boundary of the region seen by the right eye is present in the sub pixel, and the region outside the boundary of the region seen by the right eye has a triangular shape. Thus, using the following expression (37), the area ratio of the region of the sub pixel inside the boundary of the region seen by the right eye to the area of the sub pixel is obtained as an area ratio area_r of the region seen by the right eye.

$$area\_r = (Iw2*Iw2/[2*\tan(L\_th)])/(Ih'*Iw')$$

$$\text{Wherein,} Iw2 = phase_R - (-B - \tan(L\_th)*Ih'/2 - Iw'/2) \quad (37)$$

FIG. 49 is a diagram illustrating an area ratio of the region seen by the right eye in the sub pixel under the fifth condition of FIG. 44.

As shown in FIG. 49, under the fifth condition, the whole region of the sub pixel is outside of the region seen by the right eye, and thus an area ratio area_r of the region seen by the right eye is decided to be 0.

Note that a method for obtaining an area ratio area_l of a region seen by the left eye to each sub pixel based on the phase $phase_L$ and the maximum value B of the phase $phase_L$ is the same as the method for obtaining an area ratio area_r of a region seen by the right eye to each sub pixel based on the phase $phase_R$ and the maximum value B of the phase $phase_R$, and thus description thereof will be omitted.

Figure 50:
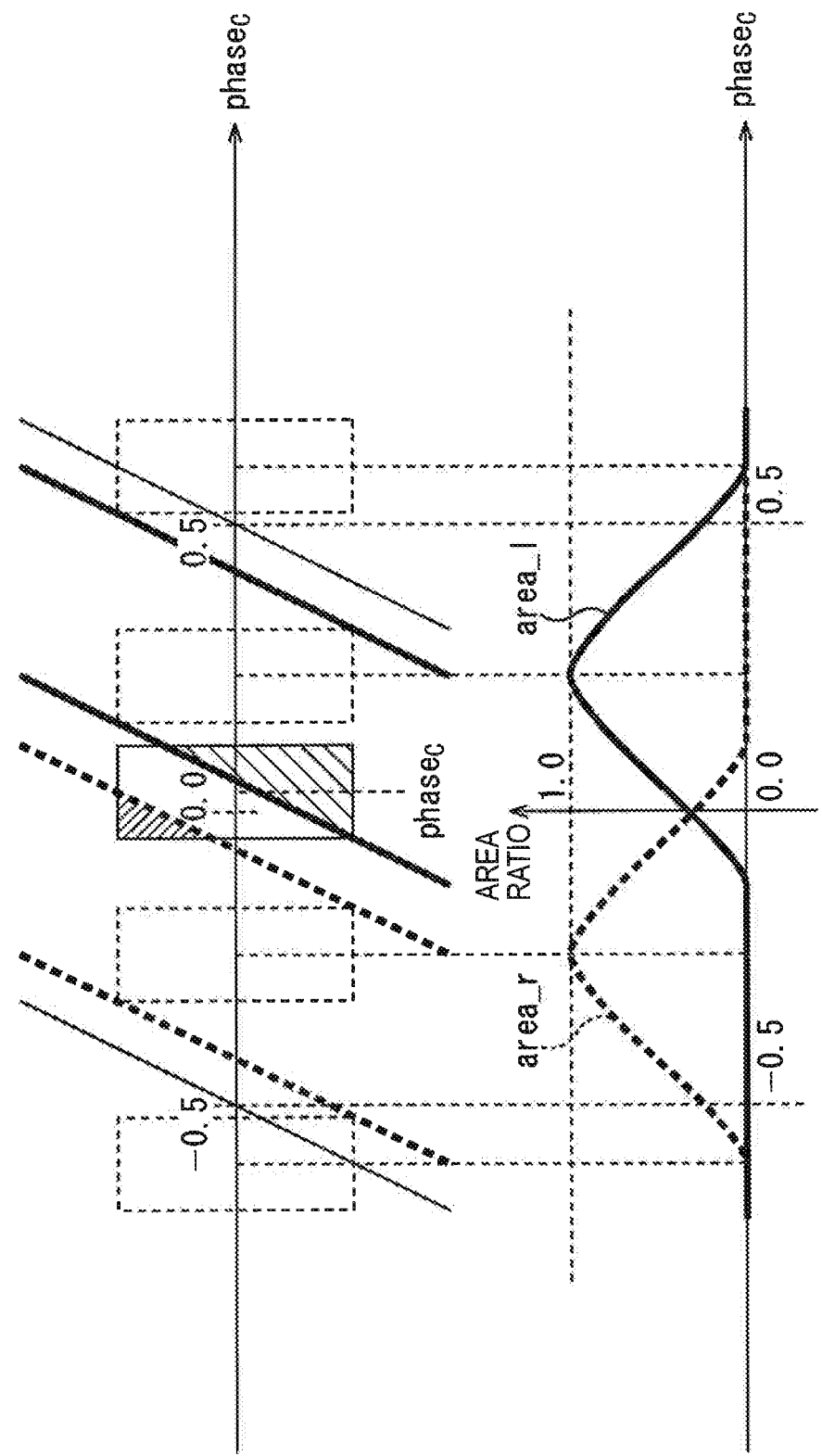
FIG. 50 is a diagram illustrating the relationship between a phase $phase_C$ and an area ratio of a region seen by the left eye and an area ratio of a region seen by the right eye.

FIG. 50 is a diagram illustrating the relationship between a phase $phase_C$ when the position of the middle of the eyebrows is set to be a viewing position and an area ratio of a region seen by the left eye and an area ratio of a region seen by the right eye.

When the phase $phase_R$ of each sub pixel is converted into the phase $phase_C$, and the area ratio area_r corresponding to the phase $phase_R$ is set to be an area ratio area_r corresponding to the phase $phase_C$, the area ratio area_r has the maximum value 1 when the phase $phase_C$ is negative, and decreases as the area ratio is further away from the phase $phase_C$ from the point of the maximum value 1 of the phase $phase_C$ in the example of FIG. 50.

In addition, when the phase $phase_L$ of each sub pixel is converted into the phase $phase_C$, and the area ratio area corresponding to the phase $phase_L$ is set to be an area ratio area_l corresponding to the phase $phase_C$, the area ratio area_l has the maximum value 1 when the phase $phase_C$ is positive, and decreases as the area ratio is further away from the phase $phase_C$ from the point of the maximum value 1 of the phase $phase_C$ in the example of FIG. 50.

<Example of a Blend Ratio>

FIGS. 51A and 51B are diagrams illustrating an example of the relationship between an area ratio area_l and a blend ratio of an image for the left eye and an area ratio area_r and a blend ratio of an image for the right eye.

A blend ratio rate_l and a blend ratio rate_r are decided using the following expression (38).

$$rate\_l = area\_l/(area\_r + area\_l)$$

$$rate\_r = area\_r/(area\_r + area\_l) \quad (38)$$

Thus, when the relationship between the area ratio area_l, the area ratio area_r, and the phase $phase_C$ is the relationship, for example, shown in FIG. 51A, the relationship between the blend ratio rate_l, the blend ratio rate_r, and the phase $phase_C$ becomes as shown in FIG. 51B. Accordingly, only when the phase is around 0 and overlapping pixels are generated, can an image for the left eye and an image for the right eye be combined.

As a result, crosstalk in the overlapping pixels is not conspicuous. In addition, it is possible to prevent crosstalk caused by combination of an image for the left eye and an image for the right eye in sub pixels which are not overlapping pixels from increasing.

<Configuration Example of the L Projection Conversion Unit and the R Projection Conversion Unit>

Figure 53:
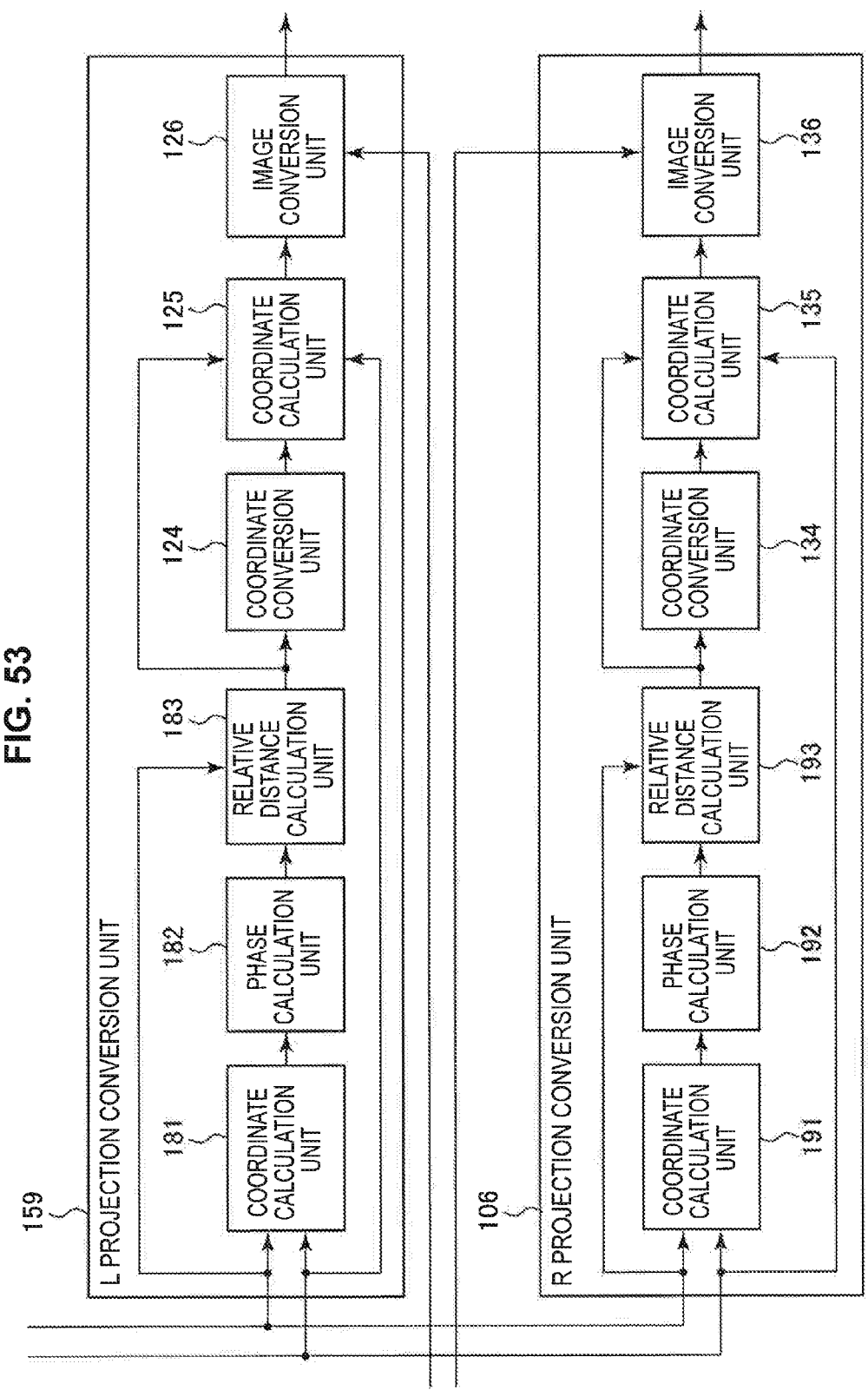
FIG. 53 is a block diagram illustrating a configuration example of an L projection conversion unit and an R projection conversion unit of FIG. 33.

FIG. 53 is a block diagram illustrating a configuration example of the L projection conversion unit 159 and the R projection conversion unit 160 of FIG. 33.

The same reference numerals are given to the constituent elements shown in FIG. 53 which are the same as those of FIG. 30. Overlapping description will be appropriately omitted.

The configuration of the L projection conversion unit 159 of FIG. 53 is different from that of the L projection conversion unit 105 of FIG. 30 in that a coordinate calculation part 181, a phase calculation part 182, and a relative distance calculation part 183 are provided instead of the coordinate calculation part 121, the phase calculation part 122, and the relative distance calculation part 123. The L projection conversion unit 159 performs projection conversion on an image for the left eye having a position of the left eye as a reference.

To be specific, the coordinate calculation part 181 of the L projection conversion unit 159 calculates the coordinates of each sub pixel on the lenticular lens 109 having the position of the left eye as a reference based on the position of the left eye supplied from the face detection unit 151 and the coordinates of each sub pixel on the screen input from the outside, in the same manner as the coordinate calculation unit 152 of FIG. 33. The coordinate calculation part 181 supplies the calculated coordinates of each sub pixel to the phase calculation part 182.

The phase calculation part 182 calculates a phase $phase_I$ of each sub pixel on the lenticular lens 109 having the position of the left eye based on the coordinates of each sub pixel supplied from the coordinate calculation part 181, in the same manner as the phase calculation unit 153. The phase calculation part 182 supplies the calculated phase $phase_I$ to the relative distance calculation part 183.

The relative distance calculation part 183 obtains the coordinate x0' of each sub pixel using the expressions (14) to (16) described above to which the position of the left eye is applied as a viewing position (E_x, E_y, and E_z) of the expressions based on the phase $phase_I$ of each sub pixel supplied from the phase calculation part 182, and supplies the coordinate to the coordinate conversion part 124 and the coordinate calculation part 125.

The configuration of the R projection conversion unit 160 is different from that of the R projection conversion unit 106 in that a coordinate calculation part 191, a phase calculation part 192, and a relative distance calculation part 193 are provided instead of the coordinate calculation part 131, the phase calculation part 132, and the relative distance calculation part 133. Since processes of the coordinate calculation part 191, the phase calculation part 192, and the relative distance calculation part 193 of the R projection conversion unit 160 are the same as those of the corresponding parts of the L projection conversion unit 159 except for using a position of the right eye as a reference instead of a position of the left eye, description thereof will be omitted.

<Description of a Process of the Image Processing Device>

Figure 54:
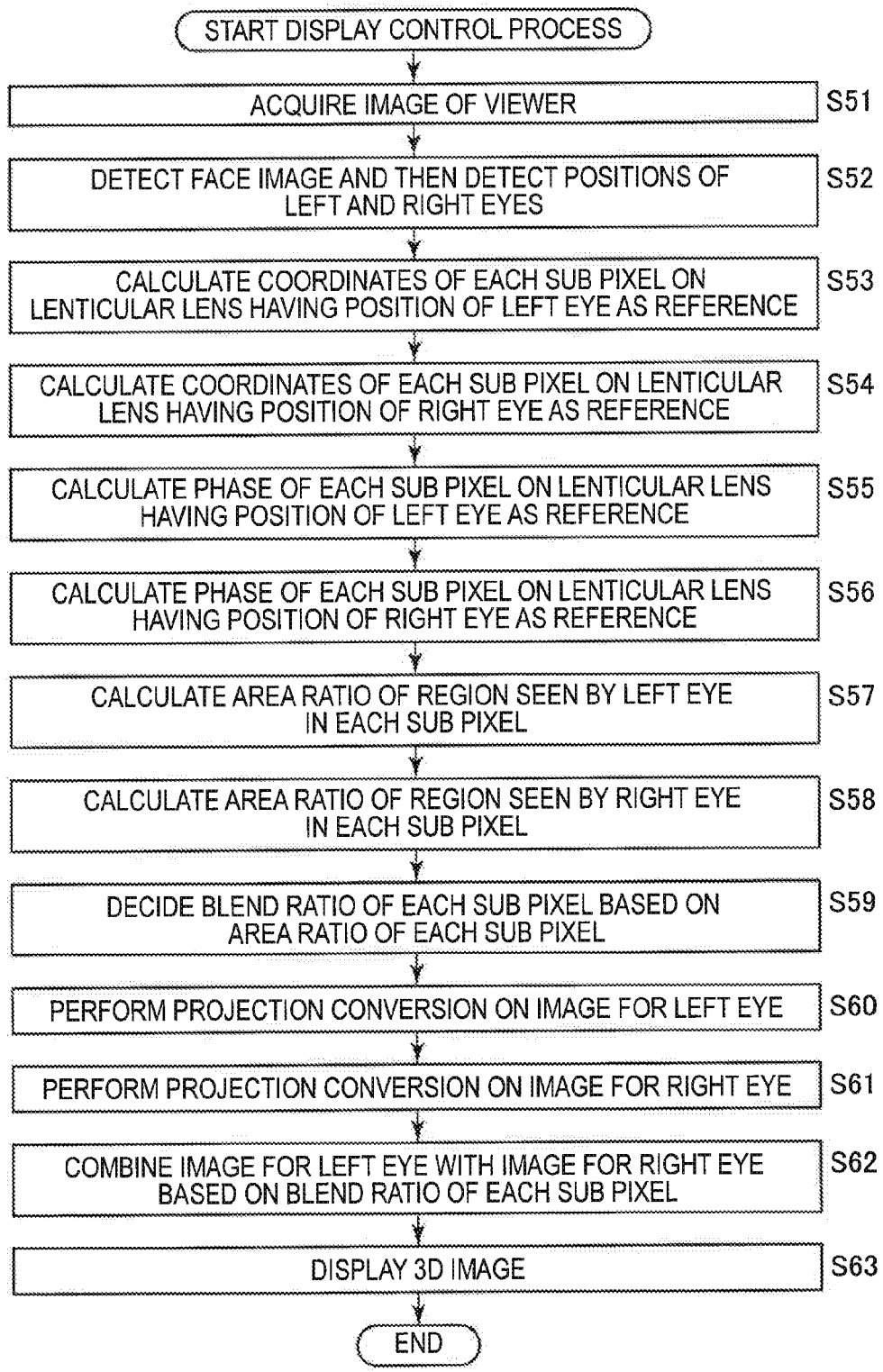
FIG. 54 is a flowchart for describing a display control process of the image processing device of FIG. 33.

FIG. 54 is a flowchart for describing a display control process of the image processing device 150 of FIG. 33. The display control process is started when, for example, an image for the left eye and an image for the right eye are input to the image processing device 150.

In Step S51 of FIG. 54, the face detection unit 151 of the image processing device 150 images a viewer, and thereby acquires an image of the viewer. In Step S52, the face detection unit 151 detects a face image from the image of the viewer, and then detects the position of the left eye and the position of the right eye from the face image. The face detection unit 151 supplies the position of the left eye to the coordinate calculation unit 152 and the L projection conversion unit 159, and supplies the position of the right eye to the coordinate calculation unit 155 and the R projection conversion unit 160.

In Step S53, the coordinate calculation unit 152 calculates the coordinates of each sub pixel on the lenticular lens 109 having the position of the left eye as a reference based on the position of the left eye supplied from the face detection unit 151. The coordinate calculation unit 152 supplies the computed coordinates of each sub pixel to the phase calculation unit 153.

In Step S54, the coordinate calculation unit 155 calculates the coordinates of each sub pixel on the lenticular lens 109 having the position of the right eye as a reference based on the position of the right eye supplied from the face detection unit 151 and the coordinates of each sub pixel on the screen input from the outside. The coordinate calculation unit 155 supplies the computed coordinates of each sub pixel to the phase calculation unit 156.

In Step S55, the phase calculation unit 153 calculates the phase of each sub pixel on the lenticular lens 109 having the position of the left eye as a reference using the expression (13) described above based on the coordinates of each sub pixel supplied from the coordinate calculation unit 152. The phase calculation unit 153 supplies the calculated phase of each sub pixel to the area ratio calculation unit 154.

In Step S56, the phase calculation unit 156 calculates the phase of each sub pixel on the lenticular lens 109 having the position of the right eye as a reference using the expression (13) described above based on the coordinates of each sub pixel supplied from the coordinate calculation unit 155. The phase calculation unit 156 supplies the calculated phase of each sub pixel to the area ratio calculation unit 157.

In Step S57, the area ratio calculation unit 154 calculates an area ratio area_l of a region seen by the left eye to each sub pixel based on the phase of each sub pixel supplied from the phase calculation unit 153, and then supplies the area ratio to the blend ratio calculation unit 158.

In Step S58, the area ratio calculation unit 157 calculates an area ratio area_r of a region seen by the right eye to each sub pixel based on the phase of each sub pixel supplied from the phase calculation unit 156, and then supplies the area ratio to the blend ratio calculation unit 158.

In Step S59, the blend ratio calculation unit 158 calculates a bend ratio rate_l and a blend ratio rate_r of each sub pixel based on the area ratio area_l of the region seen by the left eye to each sub pixel supplied from the area ratio calculation unit 154 and the area ratio area_r of the region seen by the right eye to each sub pixel supplied from the area ratio calculation unit 157. The blend ratio calculation unit 158 supplies the blend ratio rate_l and the blend ratio rate_r to the blend processing unit 107.

In Step S60, the L projection conversion unit 159 performs a projection conversion process on an image for the left eye input from the outside based on the position of the left eye supplied from the face detection unit 151 and the coordinates of each sub pixel on the screen input from the outside. Details of the projection conversion process are the same as those of the projection conversion process of FIG. 32 except that the position of the left eye serves as a reference rather than the position of the middle of the eyebrows, and thus description thereof will be omitted.

In Step S61, the R projection conversion unit 160 performs a projection conversion process on an image for the right eye input from the outside based on the position of the right eye supplied from the face detection unit 151 and the coordinates of each sub pixel on the screen input from the outside. Details of the projection conversion process are the same as those of the projection conversion process of FIG. 32 except that the position of the right eye serves as a reference rather than the position of the middle of the eyebrows, and thus description thereof will be omitted.

The processes of Step S62 and Step S63 are the same as those of Step S18 and Step S19 of FIG. 31, and thus description thereof will be omitted.

As described above, the image processing device 150 calculates an area ratio area_l and an area ratio area_r of each sub pixel based on the phase $phase_L$ and the phase $phase_R$, and combines an image for the left eye and an image for the right eye for each sub pixel based on the area ratio area_l and the area ratio area_r of each sub pixel. Therefore, 3D images with high image quality in which crosstalk is not conspicuous in such pixels which are overlapping pixels and crosstalk is not intensified in sub pixels which are not overlapping pixels can be easily generated and displayed.

In addition, the image processing device 150 obtains the phase $phase_L$ and the phase $phase_R$ using a position of the left eye and a position of the right eye, and thus the image processing device can precisely combine an image for the left eye and an image for the right eye in overlapping pixels even when a viewing position changes.

Third Embodiment

<Configuration example of a third embodiment of the image processing device>

Figure 55:
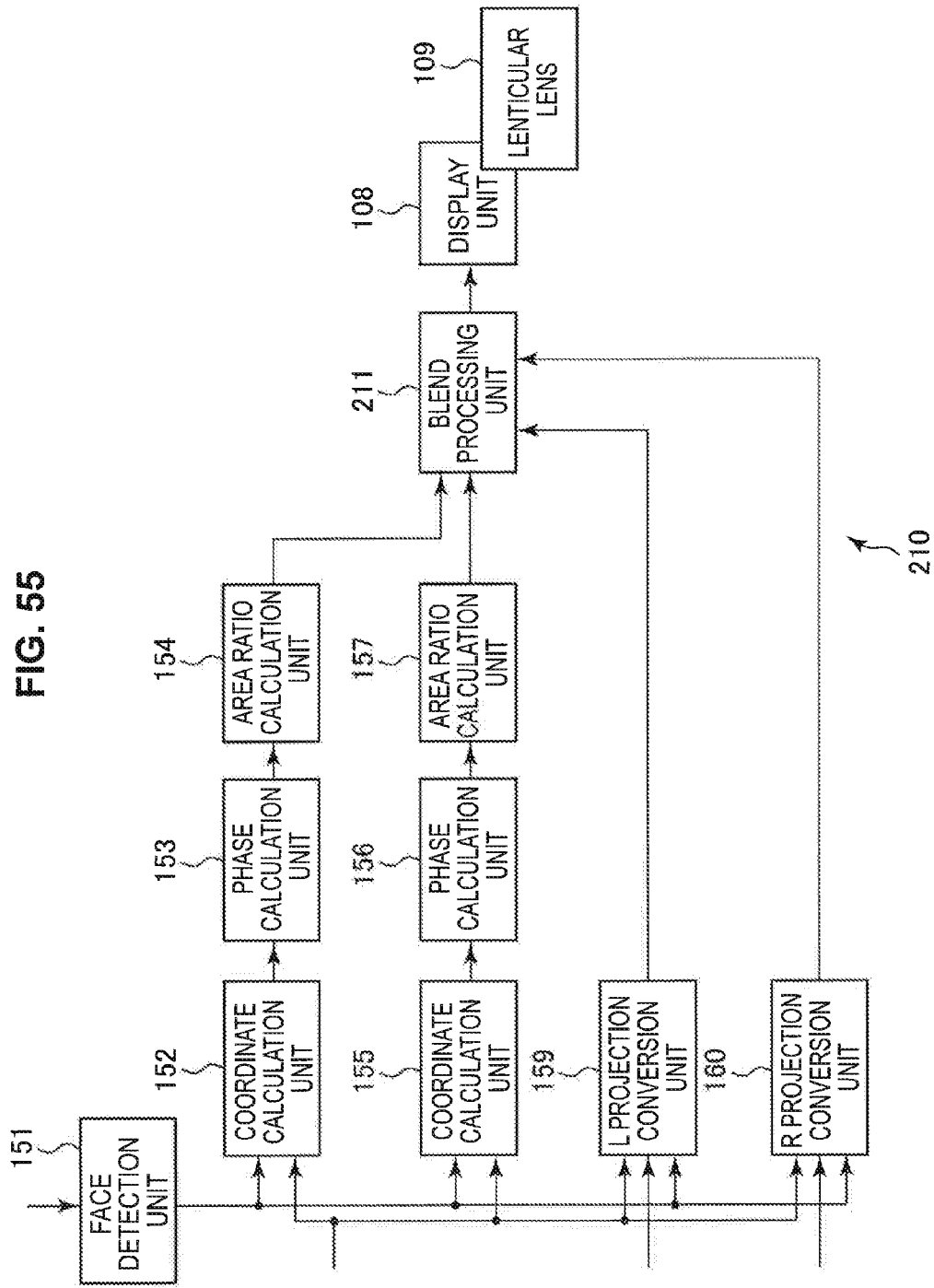
FIG. 55 is a block diagram illustrating a configuration example of a third embodiment of the image processing device to which the present technology is applied.

FIG. 55 is a block diagram illustrating a configuration example of a third embodiment of the image processing device to which the present technology is applied The same reference numerals are given to the constituent elements shown in FIG. 55 which are the same as those of FIG. 33. Overlapping description will be appropriately omitted.

The configuration of the image processing device 210 of FIG. 55 is different from the configuration of the image processing device 150 of FIG. 33 in that a blend processing unit 211 is provided instead of the blend ratio calculation unit 158 and the blend processing unit 107. The image processing device 210 combines an image for the left eye and an image for the right eye based on an area ratio area_l and an area ratio area_r using an expression that considers characteristics of vision.

To be specific, the blend processing unit 211 of the image processing device 210 combines an image for the left eye from the L projection conversion unit 159 and an image for the right eye from the R projection conversion unit 160 for each sub pixel using the expression that considers characteristics of vision based on the area ratio area_l of each sub pixel from the area ratio calculation unit 154 and the area ratio area_r of each sub pixel from the area ratio calculation unit 157. The blend processing unit 211 causes a 3D image to be displayed by supplying the combined image of each sub pixel to the display unit 108 as the 3D image.

<Description of the Expressions that Consider Characteristics of Vision>

Figure 56:
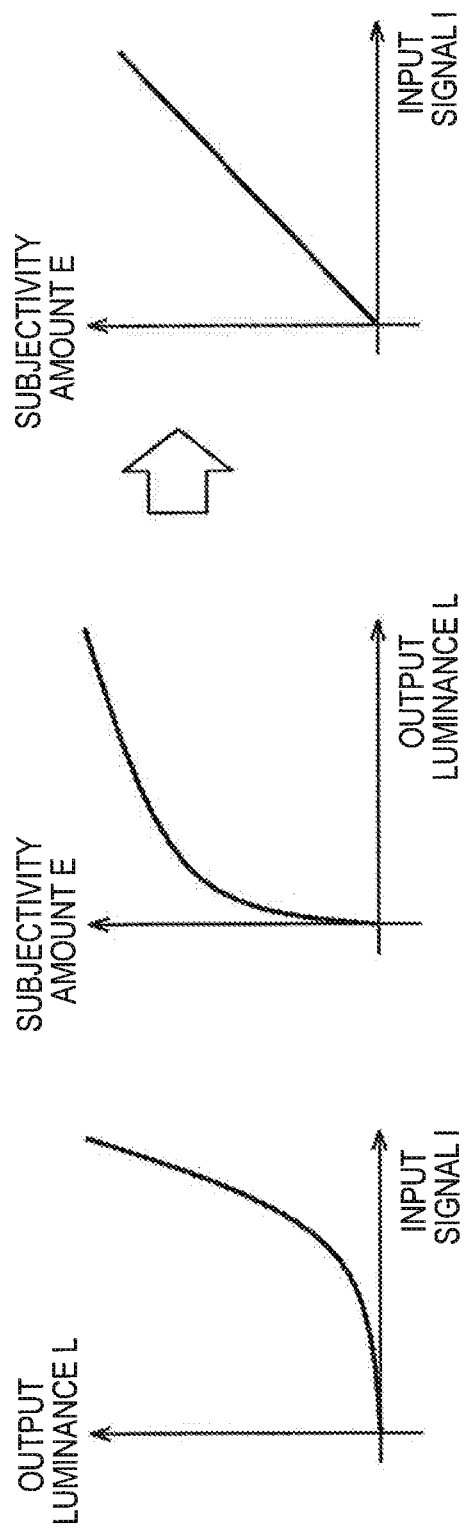
FIG. 56 is a diagram for describing characteristics of the display unit.

FIG. 56 is a diagram for describing a characteristic of the display unit 108.

As shown in FIG. 56, the relationship between an input signal I that is a 3D image input to the display unit 108 and output luminance L that is luminance output is generally set such that the relationship between a subjectivity amount E that is an amount visually perceived by a viewer and the input signal I becomes linear.

To be specific, a characteristic of human vision is that sensitivity to changes in luminance decreases as brightness increases, and thus the relationship between the output luminance L and the subjectivity amount E is approximated as shown in FIG. 56 using the following expression (39).

$$E = b \cdot L^{1/\gamma}, \gamma = 2.2 \tag{39}$$

Note that, in the expression (39), b is a constant.

In addition, in order to express the relationship between the subjectivity amount E and the input signal I to be linear, it is necessary to satisfy the following expression (40).

$$E = b \cdot L^{1/\gamma} = b \cdot (a \cdot I^{\gamma})^{1/\gamma} = c \cdot I, \gamma = 2.2 \tag{40}$$

Note that, in the expression (40), a and b are constants.

Thus, the relationship between the input signal I and the output luminance L is set so that the following expression (41) is satisfied.

$$L = a \cdot I^{\gamma}, \gamma = 2.2 \tag{41}$$

Note that, in the expression (41), a is a constant.

FIGS. 57A to 57D are diagrams illustrating an example of the subjectivity amount E of a 3D image combined based on the area ratio area_l and the area ratio area_r which is displayed on the display unit 108 that has the characteristic shown in FIG. 56.

In the example of FIGS. 57A and 57B, pixel values of all pixels of the image for the right eye is 1 (white), pixel values of all pixels in the image for the left eye are 0 (black), and an area ratio area_l and an area ratio area_r of one sub pixel on the boundaries of regions seen by the right eye and seen by the left eye are 0.5.

In this case, when an image for the left eye and an image for the right eye are combined based on the area ratio area_l and the area ratio area_r as in the second embodiment, the pixel values of sub pixels on the boundaries of the regions seen by the right eye and regions seen by the left eye become 0.5 as shown in FIG. 57A. In addition, pixel values of sub pixels in the regions seen by the right eye other than the aforementioned sub pixels are 1, and pixel values of sub pixels in the regions seen by the left eye are 0.

In this case, if the magnification ratio A of the lenticular lens 109 is set to be 2, pixel values of images seen by the right eye and left eye are set as shown in FIG. 57B. Thus, subjectivity amounts of each sub pixel become as shown in FIG. 57C when characteristics of vision are not considered. In other words, the subjectivity amount of the right eye for each sub pixel is 1 or 0.75 (=(0.5+1)/2), and the subjectivity amount of the left eye for each sub pixel is 0 or 0.25 (=(0.5+0)/2).

However, since the characteristics of vision actually exists, the characteristics of vision are considered in the display unit 108, and the subjectivity amounts become as shown in FIG. 57D.

In other words, considering the expressions (40) and (41) described above, the subjectivity amount $E_0$ of the right eye for each sub pixel and the subjectivity amount $E_1$ of the left eye for each sub pixel are expressed by the following expression (42).

$$E_0 = \{I_0^{\gamma} * (1 - \text{area\_}r) + I'^{\gamma} * \text{area\_}r\}^{1/\gamma}$$

$$E_1 = \{I'^{\gamma} * (1 - \text{area\_}l) + I_1^{\gamma} * \text{area\_}l\}^{1/\gamma} \quad (42)$$

Note that, in the expression (42), I is a combined image of each sub pixel, and $I_0$ and $I_1$ are respectively an image for the right eye and an image for the left eye of each sub pixel. In addition, $\gamma$ is 2.2.

In the example of FIGS. 57A and 57B, the area ratio area_r and the area ratio area_l are 0.5, and thus based on the expression (42) described above, the subjectivity amount $E_0$ of the sub pixels on the boundaries is about 0.80, and the subjectivity amount $E_1$ is about 0.36. Therefore, black flotation is greater than white sinking.

As described above, when an image for the left eye and an image for the right eye are combined based on the area ratio area_l and the area ratio area_r as in the second embodiment without considering characteristics of vision, the degrees of black flotation and white sinking are different. Thus, the blend processing unit 211 combines the image for the left eye and the image for the right eye so that the degrees of black flotation and white sinking become the same using the following expression (43) that considers characteristics of vision. In other words, the blend processing unit 211 obtains a combined image I of each sub pixel based on a table or iteration using the expression (43) that considers characteristics of vision.

$$E_0 - I_0 = -(E_1 - I_1)$$

$$\therefore E_0 + E_1 = I_0 + I_1$$

$$\therefore \{I_0^{\gamma} * (1 - \text{area\_}r) + I'^{\gamma} * \text{area\_}r\}^{1/\gamma} + \{I'^{\gamma} * (1 - \text{area\_}l) + I_1^{\gamma} * \text{area\_}l\}^{1/\gamma} - (I_0 + I_1) = 0 \quad (43)$$

Note that, in the expression (43), 1 is the combined image of each sub pixel, and $I_0$ and $I_1$ are respectively the image for the right eye and the image for the left eye of each sub pixel. In addition, $\gamma$ is 2.2.

Figure 58A:
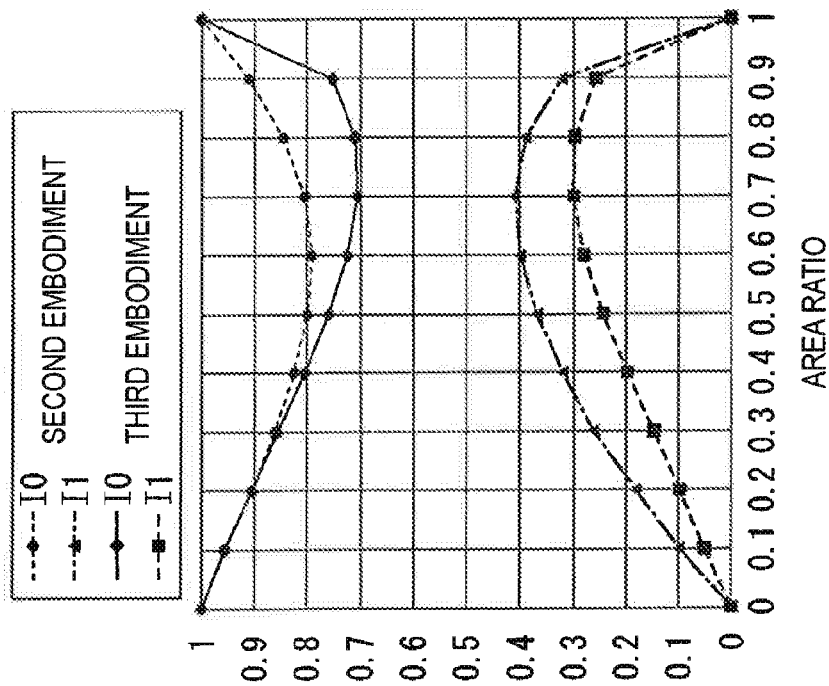
FIGS. 58A and 58B are diagrams for describing combined images.
Figure 58B:
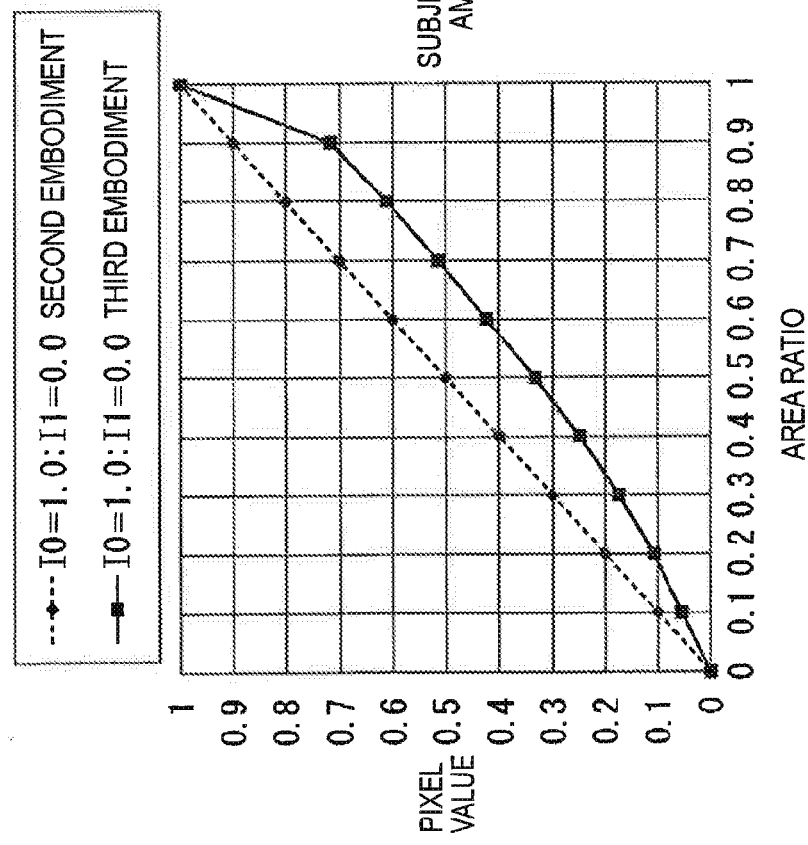

FIGS. 58A and 58B are diagrams for describing a combined image in the second embodiment in the case of FIG. 57 and a combined image by the blend processing unit 211.

Note that, in FIGS. 58A and 58B, a value of the image for the right eye $I_0$ of a sub pixel is 1, and a value of the image for the left eye $I_1$ is 0.

In FIG. 58A, the relationship between an area ratio of a sub pixel and the pixel value of the combined image of the sub pixel is linear in the second embodiment, and non-linear in the blend processing unit 211.

In addition, with regard to the relationship between an area ratio of a sub pixel and a subjectivity amount of the sub pixel, black flotation is greater than white sinking in the second embodiment, but the degrees of black flotation and white sinking are the same in the blend processing unit 211 as shown in FIG. 58B.

<Description of a process of the image processing device>

Figure 59:
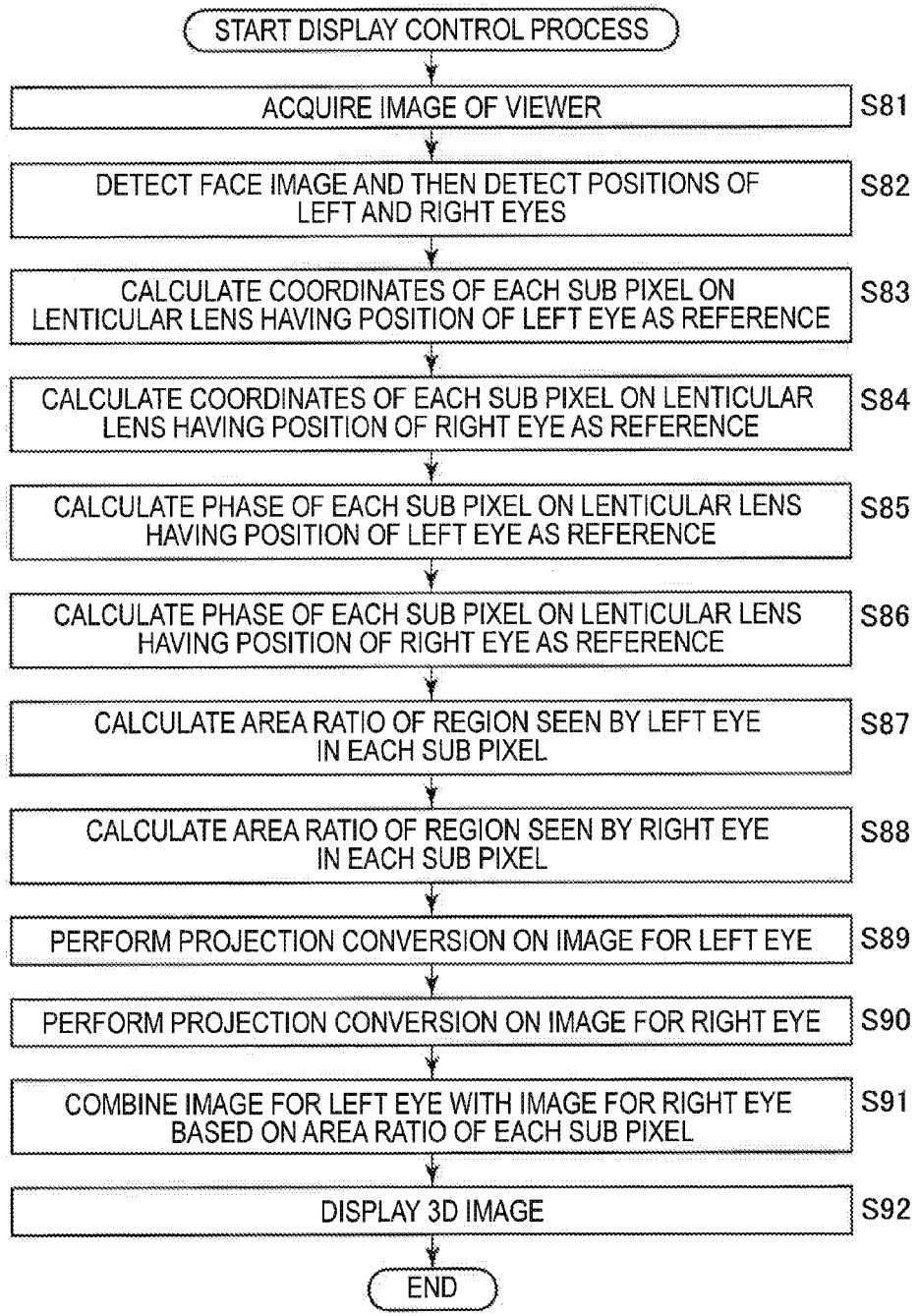
FIG. 59 is a flowchart for describing a display control process of the image processing device of FIG. 55.

FIG. 59 is a flowchart for describing a display control process of the image processing device 210 of FIG. 55. The display control process is started when, for example, an image for the left eye and an image for the right eye are input to the image processing device 210.

Since the processes of Steps S81 to S90 of FIG. 59 are the same as the processes of Steps S51 to S58, S60 and S61 of FIG. 54, description thereof will be omitted.

In Step S91, the blend processing unit 211 combines the image for the left eye from the L projection conversion unit 159 and the image for the right eye from the R projection conversion unit 160 for each sub pixel based on an area ratio area_l of each sub pixel from the area ratio calculation unit 154 and an area ratio area_r of each sub pixel from the area ratio calculation unit 157 using the expression (43) that considers characteristics of vision. To be specific, the blend processing unit 211 obtains the combined image I from the expression (43) for each sub pixel based on the area ratio area_l and the area ratio area_r of each sub pixel, the image for the left eye, and the image for the right eye.

In Step S92, the blend processing unit 211 supplies the combined image I of each sub pixel to the display unit 108 as the 3D image so that the 3D image is displayed on the display unit 108. Then, the process ends.

As described above, the image processing device 210 combines the image for the left eye and the image for the right eye for each sub pixel based on the area ratio area_l and the area ratio area_r of each sub pixel using the expression that considers characteristics of vision. Thus, the degrees of black flotation and white sinking become the same, and accordingly, a 3D image with high image quality that does not include conspicuous crosstalk can be easily generated and displayed.

Fourth Embodiment

<Configuration example of a fourth embodiment of the image processing device>

Figure 60:
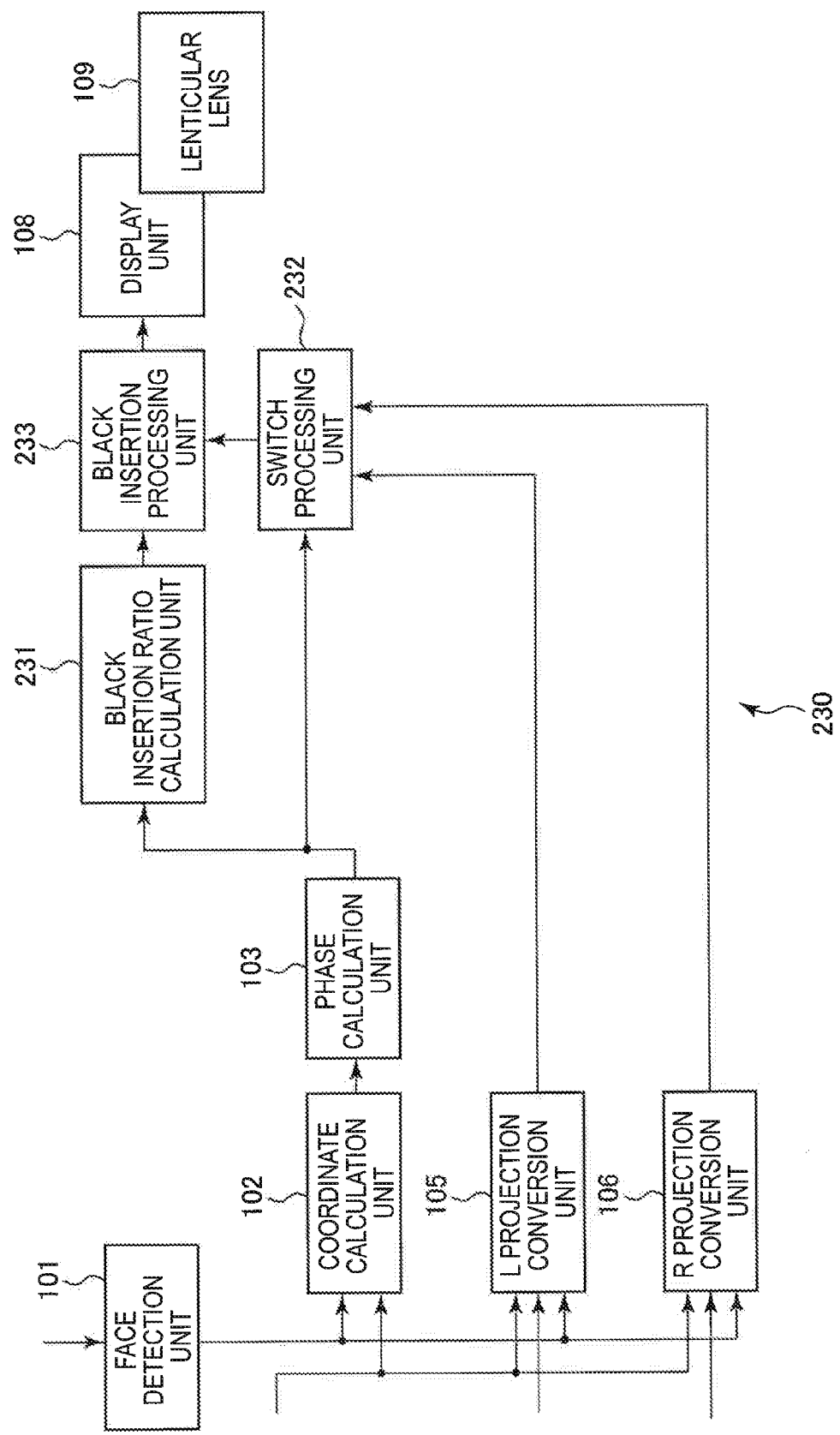
FIG. 60 is a block diagram illustrating a configuration example of a fourth embodiment of the image processing device to which the present technology is applied.

FIG. 60 is a block diagram illustrating a configuration example of a fourth embodiment of the image processing device to which the present technology is applied.

The same reference numerals are given to the constituent elements shown in FIG. 60 which are the same as those of FIG. 10. Overlapping description will be appropriately omitted.

The configuration of the image processing device 230 of FIG. 60 is different from that of the image processing device 100 of FIG. 10 in that a black insertion ratio calculation unit 231, a switch processing unit 232, and a black insertion processing unit 233 are provided, without the blend ratio calculation unit 104 and the blend processing unit 107. The image processing device 230 combines a black image with an image for the left eye and an image for the right eye based on the phase $phase_C$ of each sub pixel on the lenticular lens 109 having the position of the middle of the eyebrows as a reference.

To be specific, the black insertion ratio calculation unit 231 decides an insertion ratio of a black image (hereinafter referred to as a black insertion ratio) to an image for the left eye and an image for the right eye for each sub pixel based on the phase $phase_C$ of each sub pixel calculated by the phase calculation unit 103, and supplies the ratio to the black insertion processing unit 233.

The switch processing unit 232 selects an image for the left eye projection-converted by the L projection conversion unit 105 or an image for the right eye 26 projection-converted by the R projection conversion unit 106 based on the phase $phase_C$ of each sub pixel calculated by the phase calculation unit 103. The switch processing unit 232 supplies the selected image to the black insertion processing unit 233.

The black insertion processing unit 233 combines a black image with the image supplied from the switch processing unit 232 for each sub pixel based on the black insertion ratio of each sub pixel supplied from the black insertion ratio calculation unit 231. The black insertion processing unit 233 supplies the image combined with the black image to the lenticular lens 109 as a 3D image so as to be displayed on the display unit 108.

<Example of a Black Insertion Ratio>

Figure 61:
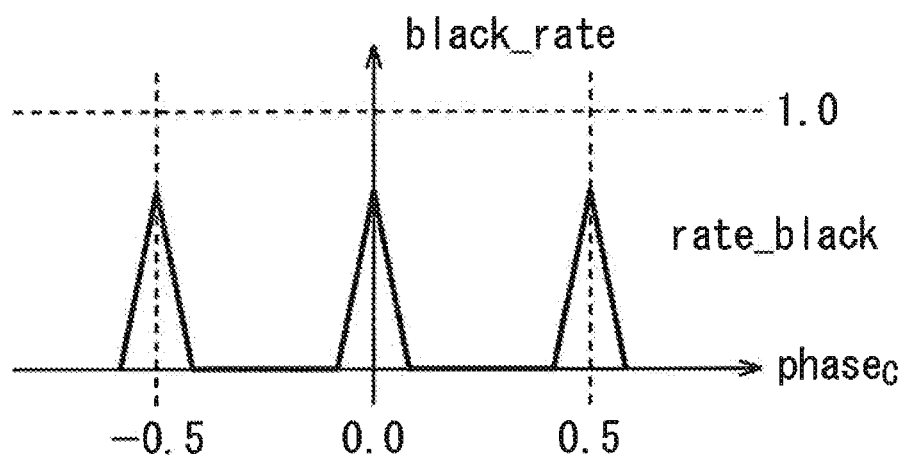
FIG. 61 is a diagram illustrating an example of the relationship between the phase $phase_C$ and a black insertion ratio.

FIG. 61 is a diagram illustrating an example of the relationship between the phase $phase_C$ and a black insertion ratio.

In the example of FIG. 61, when the phase $phase_C$ is around ±0.5 and 0, for example, a black insertion ratio black_rate increases as the phase $phase_C$ approaches ±0.5 and 0, and the black insertion ratio black_rate is 0 when the phase $phase_C$ is not around ±0.5 and 0.

Figure 62:
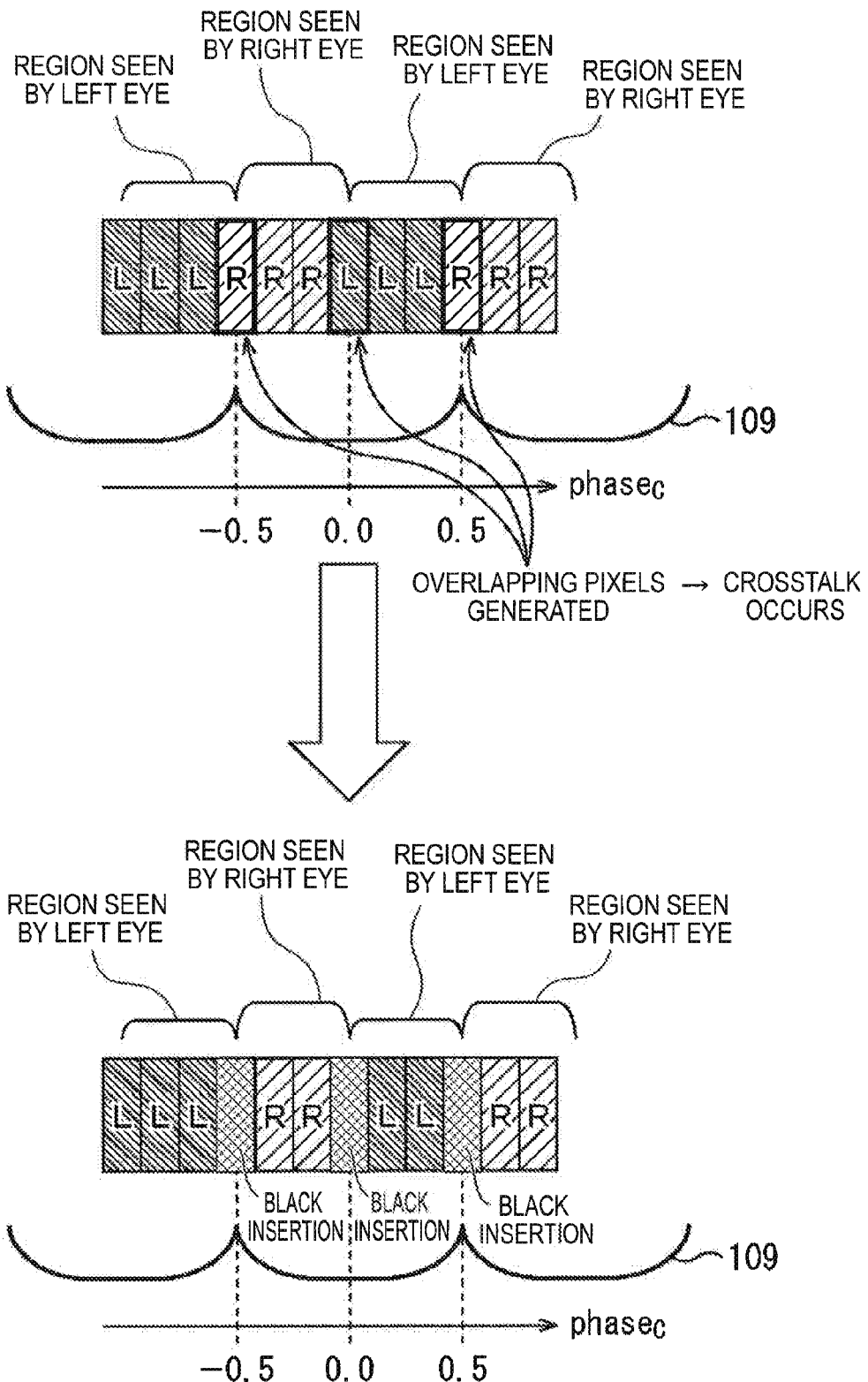
FIG. 62 is a diagram for describing an image combined with a black image based on the black insertion ratio of FIG. 61.

Here, an image for the right eye is allocated to a sub pixel having a phase equal to or lower than 0, and an image for the left eye is allocated to a sub pixel having a phase greater than 0 as described above. Thus, when a black image is combined at the black insertion ratio black_rate shown in FIG. 61, a combined image of a sub pixel having the phase $phase_C$ greater than a value around −0.5 and smaller than a negative value around 0 serves as an image for the right eye as shown in FIG. 62. In addition, a combined image of a sub pixel having the phase $phase_C$ greater than a positive value around 0 and smaller than a value around 0.5 serves as an image for the left eye.

In addition, a combined image of a sub pixel having the phase $phase_C$ that is a value around −0.5 or a negative value around 0 serves as an image in which the image for the right eye is combined with the black image, and a combined image of a sub pixel having the phase $phase_C$ that is a positive value around 0 or a value around 0.5 serves as an image in which the image for the left eye is combined with the black image.

As described above, in the example of FIG. 61, when the phase $phase_C$ of a sub pixel is around ±0.5 and around 0, a black insertion ratio black_rate is greater than 0, and thus a sub pixel forms an image in which an image for the left eye or an image for the right eye allocated to the sub pixel is combined with a black image. Here, the overlapping pixels described above are sub pixels having the phase $phase_C$ around ±0.5 or around 0.

Thus, when a black insertion ratio is decided as shown in FIG. 61, a sub pixel having the phase $phase_C$ around ±0.5 and around 0 forms an image in which the image for the left eye or the image for the right eye allocated to the sub pixel is combined with the black image, and crosstalk becomes inconspicuous.

<Description of a Process of the Image Processing Device>

Figure 63:
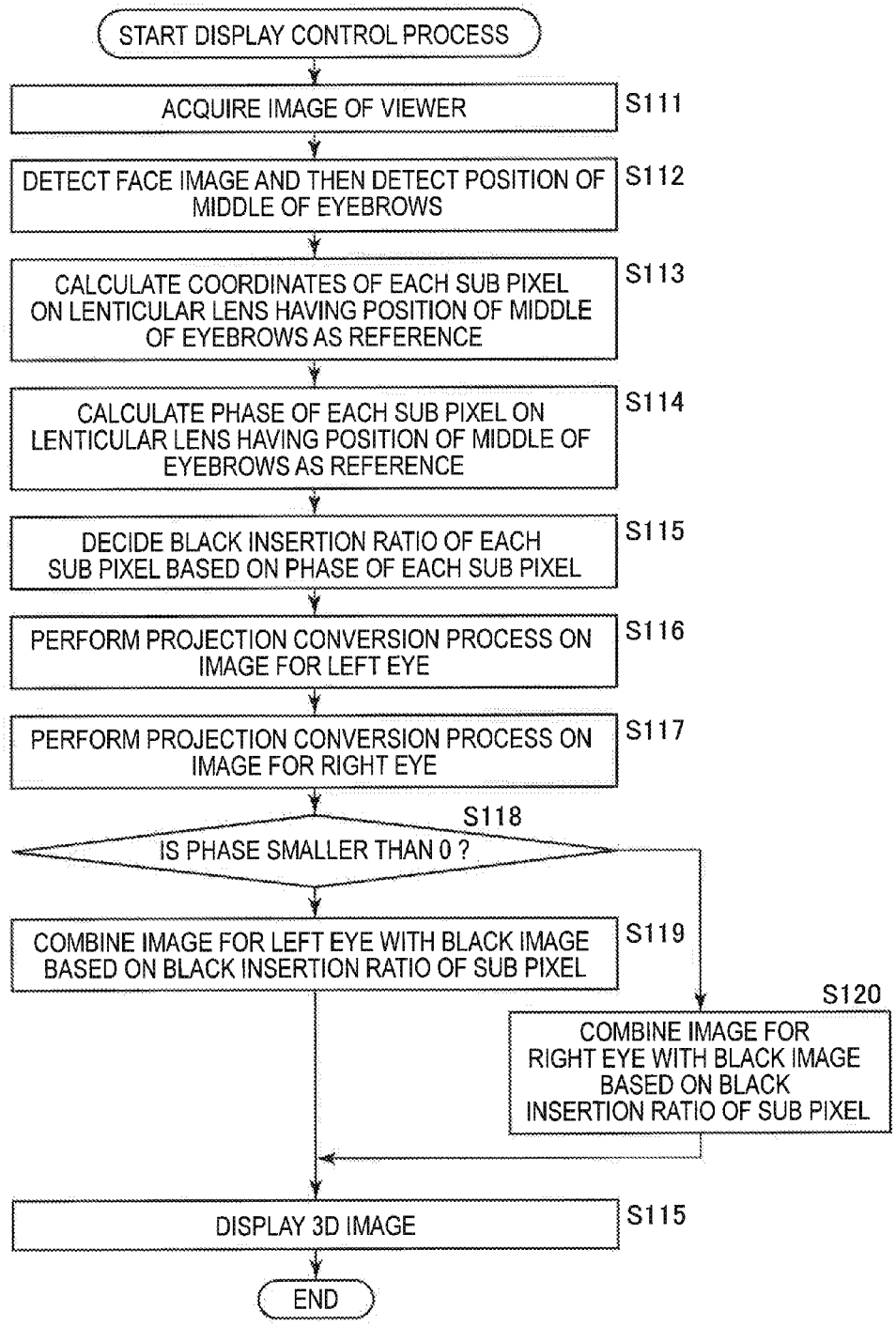
FIG. 63 is a flowchart for describing a display control process of the image processing device of FIG. 60.

FIG. 63 is a flowchart for describing a display control process of the image processing device 230 of FIG. 60. The display control process is started when, for example, an image for the left eye and an image for the right eye are input to the image processing device 230.

Since the processes of Steps S111 to S114 of FIG. 63 are the same as those of Steps S1 to S14 of FIG. 31, description thereof will be omitted.

In Step S115, the black insertion ratio calculation unit 231 decides a black insertion ratio black_rate of each sub pixel based on the phase $phase_C$ of each sub pixel calculated by the phase calculation unit 103, and then supplies the ratio to the black insertion processing unit 233.

Since the processes of Steps S116 and S117 are the same as those of Steps S16 and S17 of FIG. 31, description thereof will be omitted. Note that the processes of the following Steps S118 to S120 are performed in units of sub pixels.

In Step S118, the switch processing unit 232 determines whether or not the phase $phase_C$, which is calculated by the phase calculation unit 103, of each sub pixel to be processed is smaller than 0. When the phase $phase_C$ is determined to be smaller than 0 in Step S118, the switch processing unit 232 selects an image for the left eye, which has undergone projection conversion by the L projection conversion unit 105, of the sub pixel to be processed, and supplies the image to the black insertion processing unit 233.

Then, in Step S119, the black insertion processing unit 233 combines the image for the left eye supplied from the switch processing unit 232 with a black image based on the black insertion ratio black_rate of the sub pixel to be processed supplied from the black insertion ratio calculation unit 231. Then, the process proceeds to Step S121.

On the other hand, when the phase $phase_C$ is determined not to be smaller than 0 in Step S118, the switch processing unit 232 selects an image for the right eye, which has undergone projection conversion by the R projection conversion unit 106, of the sub pixel to be processed, and supplies the image to the black insertion processing unit 233.

Then, in Step S120, the black insertion processing unit 233 combines the image for the right eye supplied from the switch processing unit 232 with a black image based on the black insertion ratio black_rate of the sub pixel to be processed supplied from the black insertion ratio calculation unit 231. Then, the process proceeds to Step S121.

In Step S121, the black insertion processing unit 233 supplies the image for the left eye or the image for the right eye combined with the black image to the lenticular lens 109 as a 3D image so as to be displayed on the display unit 108.

As described above, the image processing device 230 calculates the phase $phase_C$ of each sub pixel on the lenticular lens 109, and combines the image for the left eye or the image for the right eye allocated to the sub pixel with the black image based on the phase $phase_C$. Accordingly, the image processing device 230 can insert the black image into the sub pixel on the boundary of a region to which the image for the left eye is allocated and a region to which the image for the right eye is allocated. As a result, a 3D image with high image quality that does not have conspicuous crosstalk that would otherwise be generated on the boundary of the image for the left eye and the image for the right eye can be easily generated and displayed.

In addition, since the image processing device 230 obtains the phase $phase_C$ using the position of the middle of the eyebrows, the black image can be accurately inserted on the boundary of the image for the left eye and the image for the right eye even when a viewing position changes.

Fifth Embodiment

<Configuration example of a fifth embodiment of the image processing device>

Figure 64:
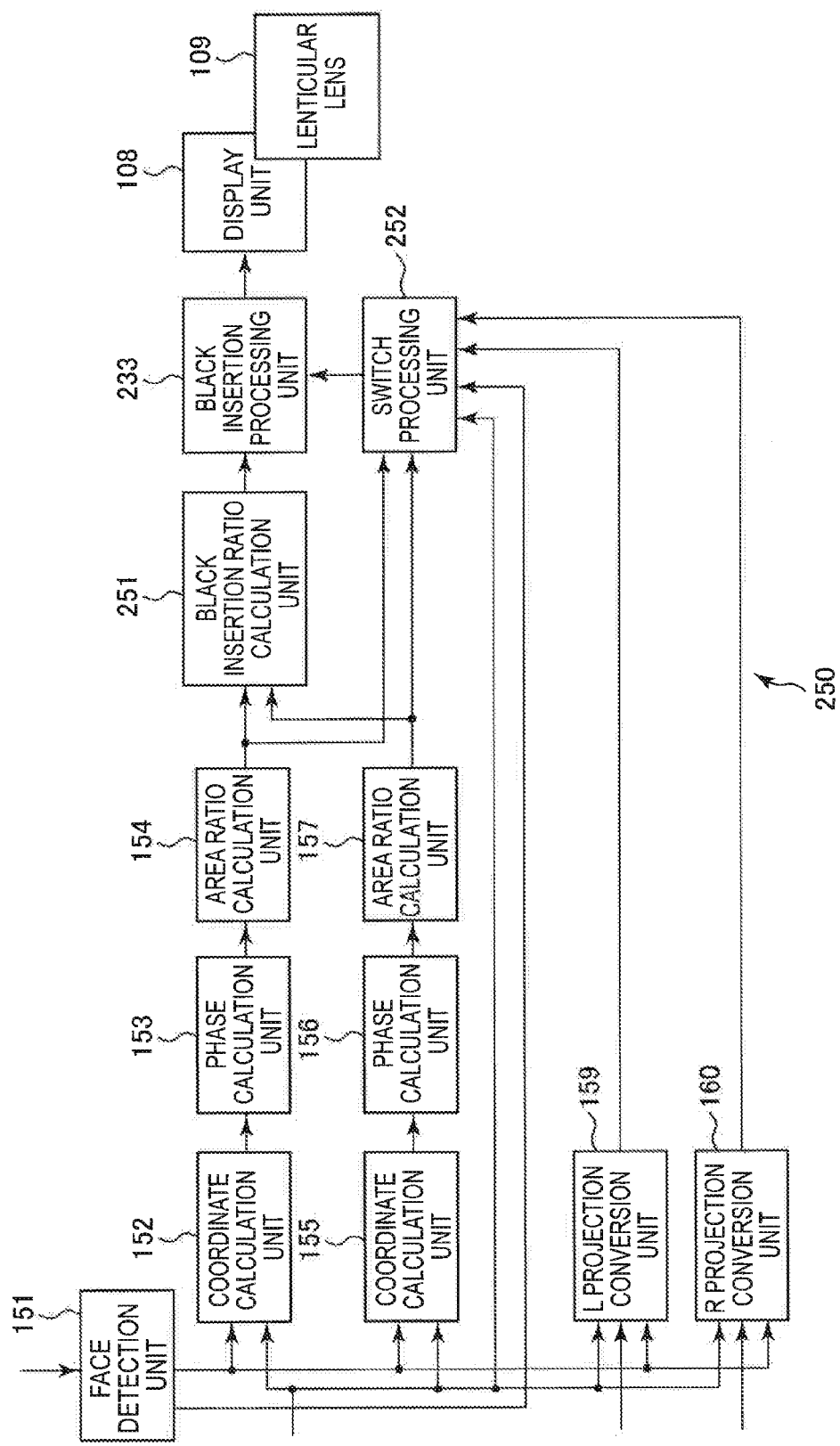
FIG. 64 is a block diagram illustrating a configuration example of a fifth embodiment of the image processing device to which the present technology is applied.

FIG. 64 is a block diagram illustrating a configuration example of a fifth embodiment of the image processing device to which the present technology is applied.

The same reference numerals are given to the constituent elements shown in FIG. 64 which are the same as those of FIGS. 33 and 60. Overlapping description will be appropriately omitted.

The configuration of the image processing device 250 of FIG. 64 is different from that of the image processing device 150 of FIG. 33 in that the black insertion processing unit 233, a black insertion ratio calculation unit 251, and a switch processing unit 252 are provided instead of the blend ratio calculation unit 158 and the blend processing unit 107. The image processing device 250 combines an image for the left eye or an image for the right eye allocated to a sub pixel with a black image based on an area ratio area_l and an area ratio area_r of each sub pixel.

To be specific, the black insertion ratio calculation unit 251 decides a black insertion ratio black_rate of each sub pixel based on an area ratio area_l of each sub pixel calculated by the area ratio calculation unit 154 and an area ratio area_r of each sub pixel calculated by the area ratio calculation unit 157. The black insertion ratio calculation unit 251 supplies the black insertion ratio black_rate of each sub pixel to the black insertion processing unit 233.

The switch processing unit 252 selects an image for left eye that has undergone projection conversion by the L projection conversion unit 105 or an image for the right eye that has undergone projection conversion by the R projection conversion unit 106 which corresponds to a greater ratio between the area ratio area_l calculated by the area ratio calculation unit 154 and the area ratio area_r calculated by the area ratio calculation unit 157.

Note that when the area ratio area_l and the area ratio area_r have the same value, the switch processing unit 252 obtains the position of the center of the position of the left eye and the position of the right eye detected by the face detection unit 151 as the position of the middle of the eyebrows. Then, the switch processing unit 252 obtains the phase $phase_C$ by performing the same process as the coordinate calculation unit 102 and the phase calculation unit 103 based on the position of the middle of the eyebrows and the coordinates of a sub pixel on the screen input from the outside, and then selects an image based on the phase $phase_C$. The switch processing unit 252 supplies the selected image to the black insertion processing unit 233.

<Example of a Black Insertion Ratio>

Figure 65:
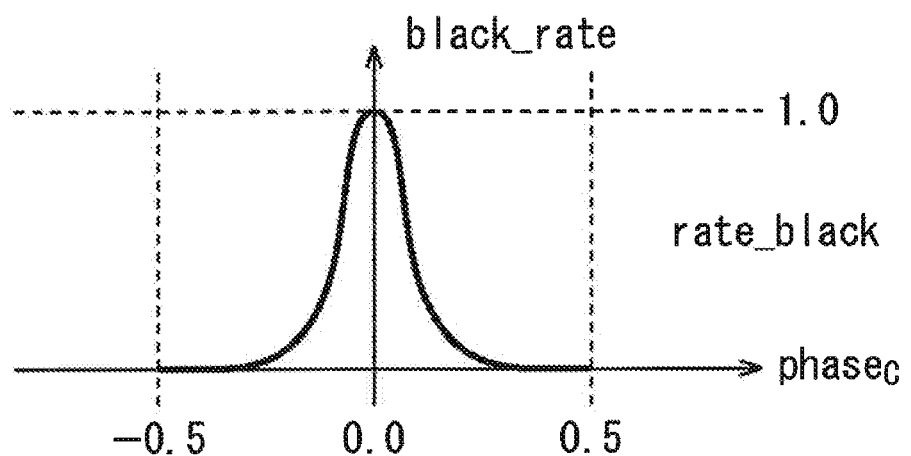
FIG. 65 is a diagram illustrating an example of the relationship between an area ratio area_l, an area ratio area_r, and a black insertion ratio black_rate.

FIG. 65 is a diagram illustrating an example of the relationship between an area ratio area_l, an area ratio area_r, and a black insertion ratio black_rate.

The black insertion ratio black_rate is decided by the following expression (44).

$$black\_rate=min(area\_l,area\_r)/max(area\_l,area\_r) \quad (44)$$

Thus, when overlapping pixels are generated only when a phase is around 0, the black insertion ratio black_rate shown in FIG. 65 is decided, and a black image is inserted only when the phase is around 0 as shown in FIG. 66.

As a result, crosstalk is not conspicuous in the overlapping pixels. In addition, it is possible to prevent luminance from lowering by inserting the black image into sub pixels that are not overlapping pixels.

<Description of a Process of the Image Processing Device>

Figure 67:
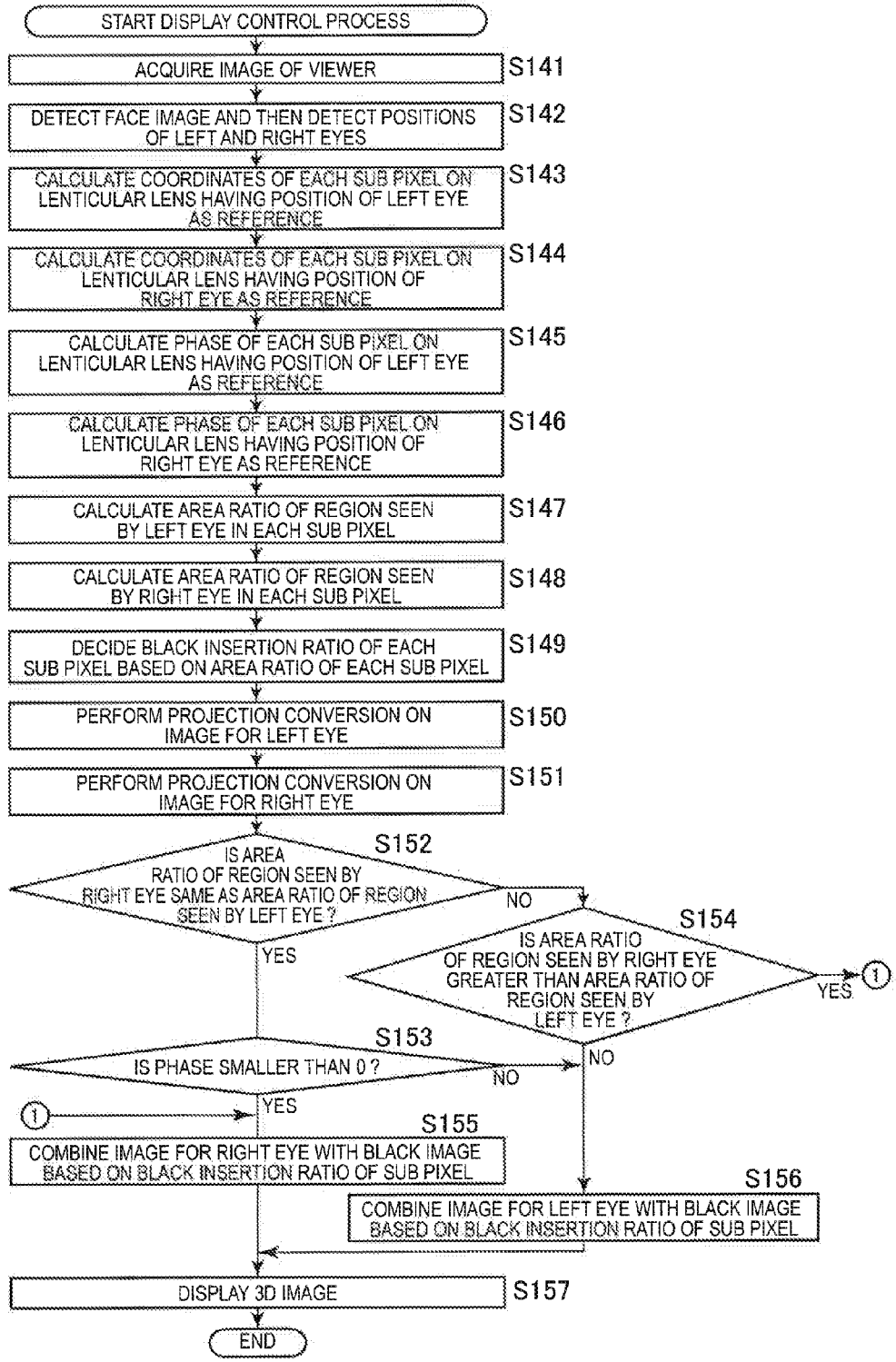
FIG. 67 is a flowchart for describing a display control process of the image processing device of FIG. 64.

FIG. 67 is a flowchart for describing a display control process of the image processing device 250 of FIG. 64. The display control process is started when, for example an image for the left eye and an image for the right eye are input to the image processing device 250.

Since the processes of Steps S141 to 148 of FIG. 67 are the same as those of Steps S51 to S58 of FIG. 54, description thereof will be omitted.

In Step S149, the black insertion ratio calculation unit 251 decides a black insertion ratio black_rate for each sub pixel using the expression (44) described above based on an area ratio area_l of each sub pixel calculated by the area ratio calculation unit 154 and an area ratio area_r of each sub pixel calculated by the area ratio calculation unit 157. The black insertion ratio calculation unit 251 supplies the black insertion ratio black_rate of each sub pixel to the black insertion processing unit 233.

Since the processes of Steps S150 and 151 are the same as those of Steps S60 and S61 of FIG. 54, description thereof will be omitted. Note that the processes of the following Steps S152 to 156 are performed for each sub pixel.

In Step S152, the switch processing unit 252 determines whether or not the area ratio area_r of a region seen by the right eye calculated by the area ratio calculation unit 157 and the area ratio area_l of a region seen by the left eye calculated by the area ratio calculation unit 154 for a sub pixel to be processed are the same. When the area ratio area_l and the area ratio area_r are determined to be the same in Step S152, the process proceeds to Step S153.

In Step S153, the switch processing unit 252 obtains the phase $phase_C$ based on the positions of the left eye and the right eye supplied from the face detection unit 151 and the position of the sub pixel on the screen input from the outside, and determines whether or not the phase $phase_C$ is smaller than 0.

When the phase $phase_C$ is determined to be smaller than 0 in Step S153, the switch processing unit 252 selects an image for the right eye that has undergone projection conversion by the R projection conversion unit 106, and supplies the image to the black insertion processing unit 233. Then the process proceeds to Step S155.

On the other hand, when the phase $phase_C$ is determined not to be smaller than 0 in Step S153, the switch processing unit 252 selects an image for the left eye that has undergone projection conversion by the L projection conversion unit 105, and supplies the image to the black insertion processing unit 233. Then the process proceeds to Step S156.

In addition, when the area ratio area_l and the area ratio area_r are determined not to be the same in Step S152, the switch processing unit 252 determines whether or not the area ratio area_r of the region seen by the right eye is greater than the area ratio area_l of the region seen by the left eye in Step S154.

When the area ratio area_r is determined not to be greater than the area ratio area_l in Step S154, the switch processing unit 252 selects the image for the left eye that has undergone projection conversion by the L projection conversion unit 105, and supplies the image to the black insertion processing unit 233. Then, the process proceeds to Step S156.

On the other hand, when the area ratio area_r is determined to be greater than the area ratio area_l in Step S154, the switch processing unit 252 selects the image for the right eye that has undergone projection conversion by the R projection conversion unit 106, and supplies the image to the black insertion processing unit 233. Then, the process proceeds to Step S155.

Since the processes of Steps S155 to 157 are the same as those of Steps S119 to S121 of FIG. 63, description thereof will be omitted.

As described above, the image processing device 250 calculates the area ratio area_l and the area ratio area_r of each sub pixel based on the phase $phase_L$ and the phase $phase_R$, and inserts a black image into each sub pixel based on the area ratio area_l and the area ratio area_r of each sub pixel. Accordingly, a 3D image with high image quality in which sub pixels which are overlapping pixels do not include conspicuous crosstalk and luminance of sub pixels which are not overlapping pixels does not decrease can be easily generated and displayed.

In addition, since the image processing device 250 obtains the phase $phase_L$ and the phase $phase_R$ using the position of the left eye and the position of the right eye, a black image can be accurately inserted into overlapping pixels even when a viewing position changes.

Sixth Embodiment

<A configuration example of a sixth embodiment of the image processing device>

Figure 68:
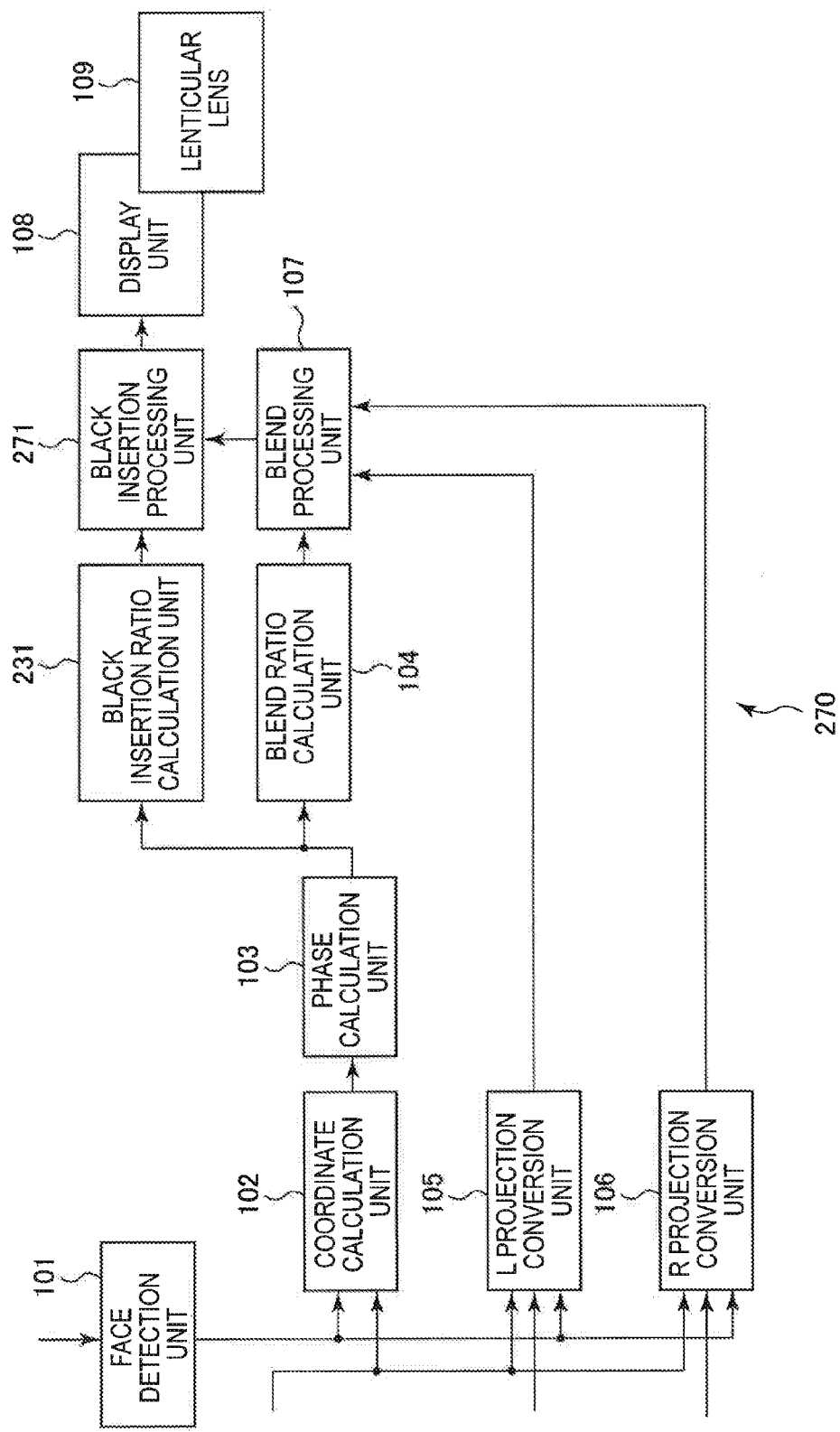
FIG. 68 is a block diagram illustrating a configuration example of a sixth embodiment of the image processing device to which the present technology is applied.

FIG. 68 is a block diagram illustrating a configuration example of a sixth embodiment of the image processing device to which the present technology is applied.

The same reference numerals are given to the constituent elements shown in FIG. 68 which are the same as those of FIGS. 10 and 60. Overlapping description will be appropriately omitted.

The configuration of the image processing device 270 of FIG. 68 is different from that of the image processing device 100 of FIG. 10 in that the black insertion ratio calculation unit 231 and a black insertion processing unit 271 are newly provided.

The image processing device 270 of FIG. 68 is a combination of the first embodiment and the fourth embodiment, by which an image for the left eye and an image for the right eye are combined based on a phase $phase_C$, and the combined image is combined with a black image, thereby generating a 3D image.

To be specific, the black insertion processing unit 271 combines the combined image of each sub pixel generated by the blend processing unit 107 and the black image for each sub pixel based on a black insertion ratio of each sub pixel supplied from the black insertion ratio calculation unit 231. The black insertion processing unit 271 supplies the image combined with the black image to the lenticular lens 109 as a 3D image to be displayed on the display unit 108.

<Description of a Process of the Image Processing Device>

Figure 69:
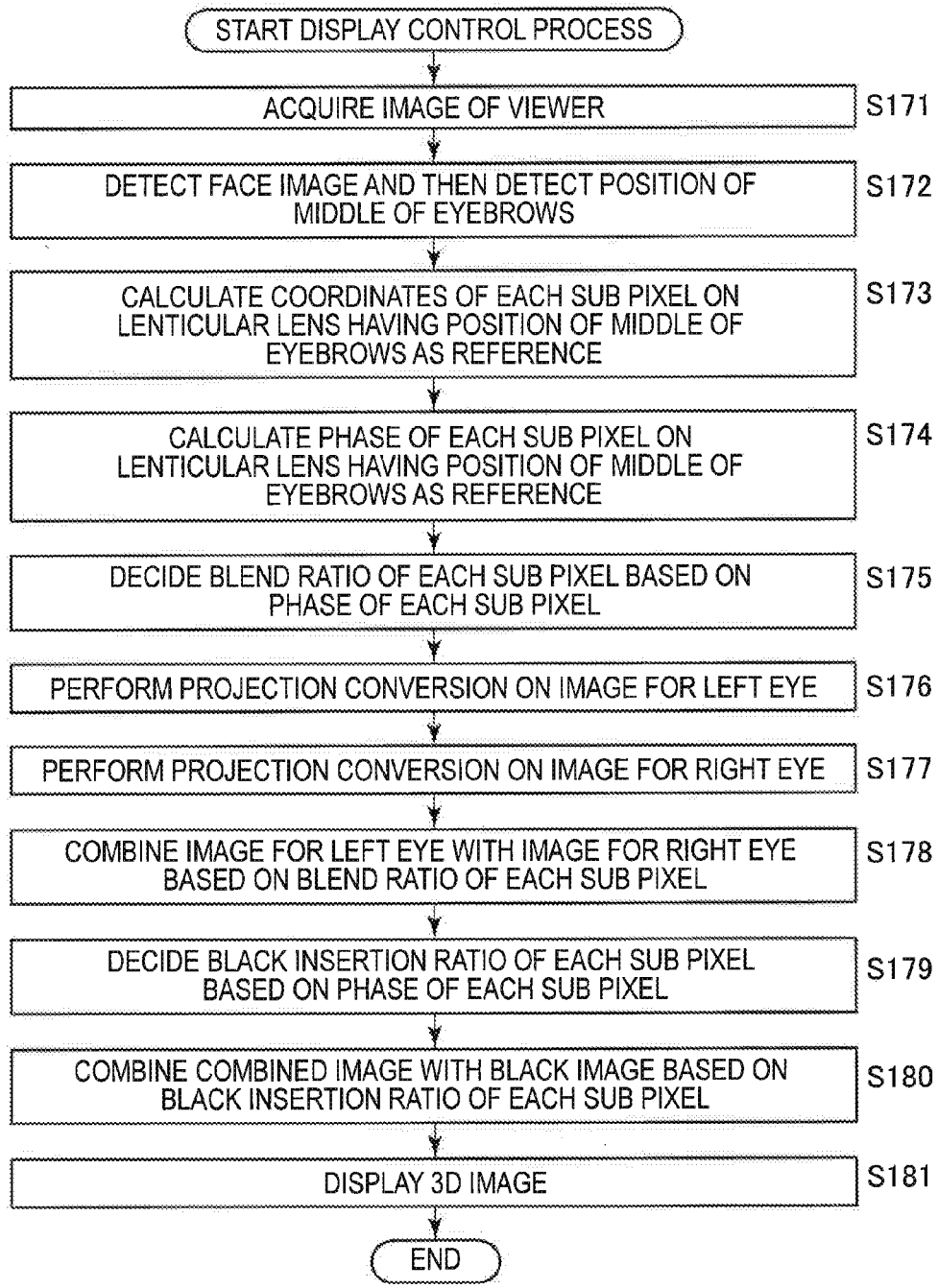
FIG. 69 is a flowchart for describing a display control process of the image processing device of FIG. 68.

FIG. 69 is a flowchart for describing a display control process of the image processing device 270 of FIG. 68. The display control process is started when, for example an image for the left eye and an image for the right eye are input to the image processing device 270.

Since the processes of Steps S171 to 178 of FIG. 69 are the same as those of Steps S11 to S18 of FIG. 31, description thereof will be omitted.

In Step S179, the black insertion ratio calculation unit 231 decides a black insertion ratio black_rate of each sub pixel based on the phase $phase_C$ of each sub pixel calculated by the phase calculation unit 103, and supplies the ratio to the black insertion processing unit 271.

In Step S180, the black insertion processing unit 271 combines the combined image of each sub pixel generated by the blend processing unit 107 with a black image for each sub pixel based on the a black insertion ratio black_rate of each sub pixel supplied from the black insertion ratio calculation unit 231.

In Step S181, the black insertion processing unit 271 supplies the image combined with the black image to the lenticular lens 109 as a 3D image, and thereby the 3D image is displayed on the display unit 108.

Seventh Embodiment

<A configuration example of a seventh embodiment of the image processing device>

Figure 70:
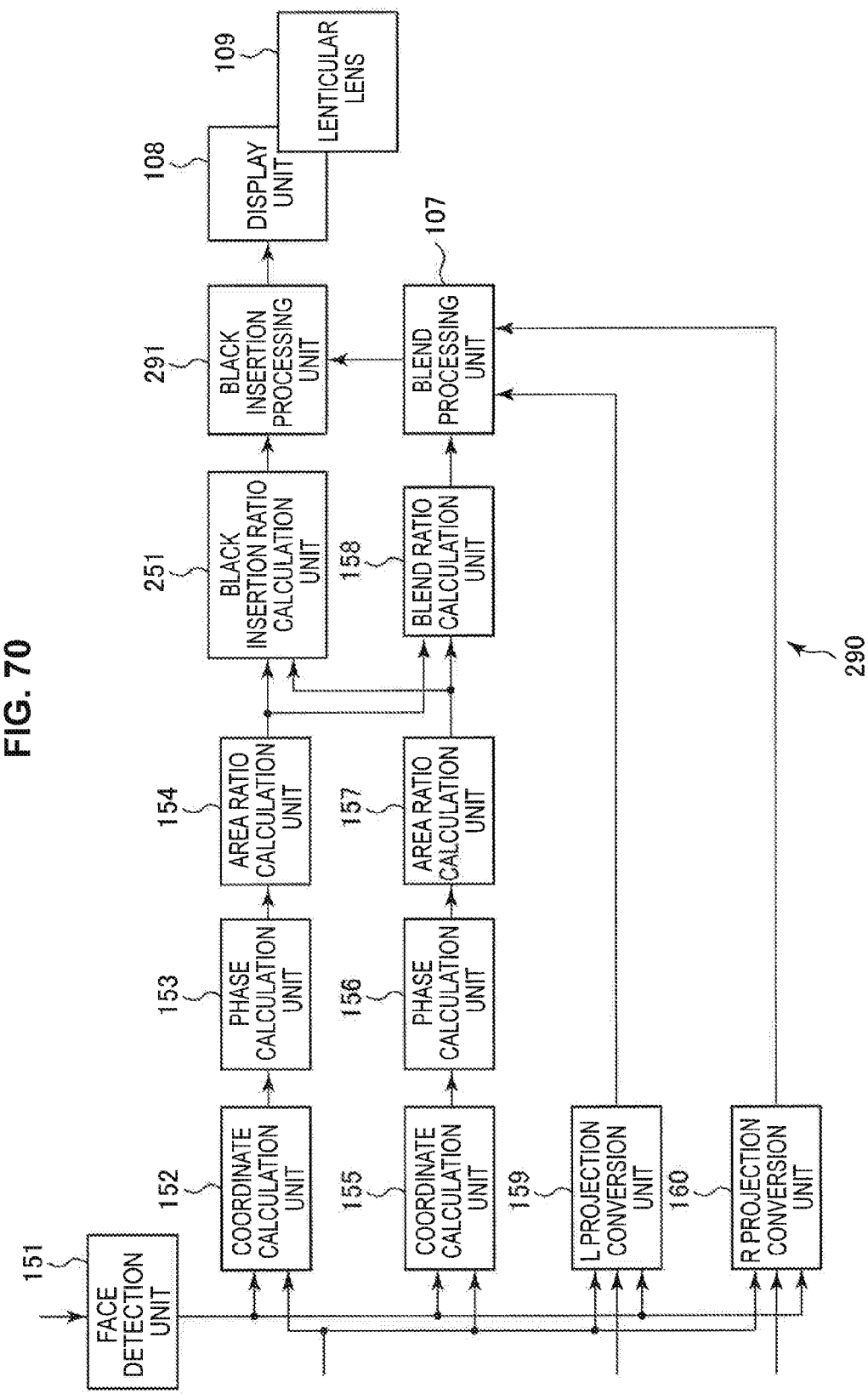
FIG. 70 is a block diagram illustrating a configuration example of a seventh embodiment of the image processing device to which the present technology is applied.

FIG. 70 is a block diagram illustrating a configuration example of a seventh embodiment of the image processing device to which the present technology is applied.

The same reference numerals are given to the constituent elements shown in FIG. 70 which are the same as those of FIGS. 33 and 64. Overlapping description will be appropriately omitted.

The configuration of the image processing device 290 of FIG. 70 is different from that of the image processing device 150 of FIG. 33 in that the black insertion ratio calculation unit 251 and a black insertion processing unit 291 are newly provided.

The image processing device 290 of FIG. 70 is a combination of the second embodiment and the fifth embodiment, by which an image for the left eye and an image for the right eye are combined based an area ratio area_r and an area ratio area_l, and the combined image is combined with a black image, thereby generating a 3D image.

To be specific, the black insertion processing unit 291 combines the combined image of each sub pixel generated by the blend processing unit 107 and the black image for each sub pixel based on a black insertion ratio of each sub pixel supplied from the black insertion ratio calculation unit 251. The black insertion processing unit 291 supplies the image combined with the black image to the lenticular lens 109 as a 3D image to be displayed on the display unit 108.

<Description of a Process of the Image Processing Device>

Figure 71:
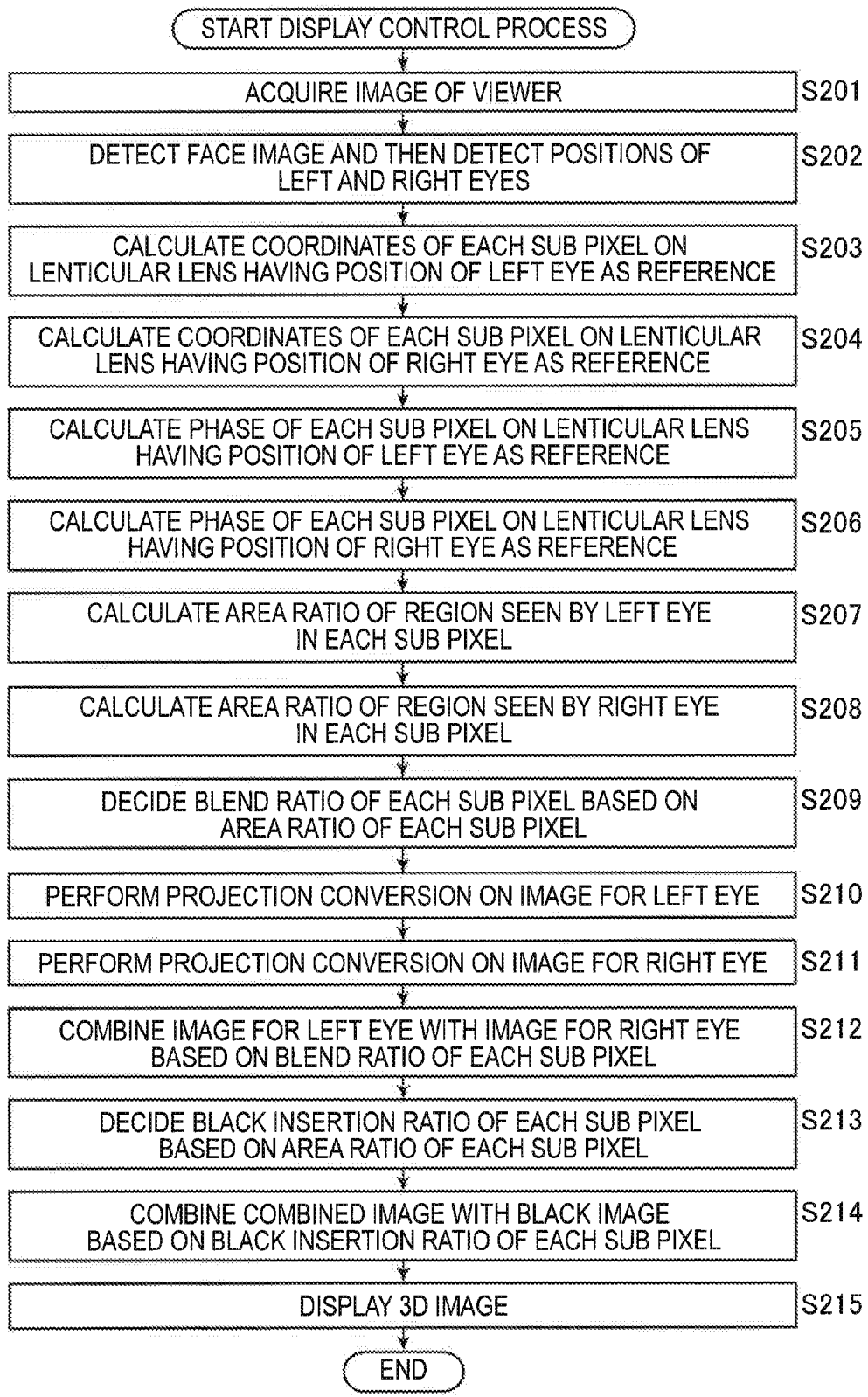
FIG. 71 is a flowchart for describing a display control process of the image processing device of FIG. 70.

FIG. 71 is a flowchart for describing a display control process of the image processing device 290 of FIG. 70. The display control process is started when, for example, an image for the left eye and an image for the right eye are input to the image processing device 290.

Since the processes of Steps S201 to 212 of FIG. 71 are the same as those of Steps S51 to S62 of FIG. 54, description thereof will be omitted.

In Step S213, the black insertion ratio calculation unit 251 decides a black insertion ratio black_rate based on the area ratio area_l of each sub pixel calculated by the area ratio calculation unit 154 and the area ratio area_r of each sub pixel calculated by the area ratio calculation unit 157 for each sub pixel using the expression (44). The black insertion ratio calculation unit 251 supplies the black insertion ratio black_rate to the black insertion processing unit 291.

In Step S214, the black insertion processing unit 291 combines the combined image generated by the blend processing unit 107 with a black image for each sub pixel based on the black insertion ratio black_rate of each sub pixel supplied from the black insertion ratio calculation unit 251.

In Step S215, the black insertion processing unit 291 supplies the image combined with the black image to the lenticular lens 109 as a 3D image, and accordingly, the 3D image is displayed on the display unit 108.

Eight Embodiment

<A configuration example of an eighth embodiment of the image processing device>

Figure 72:
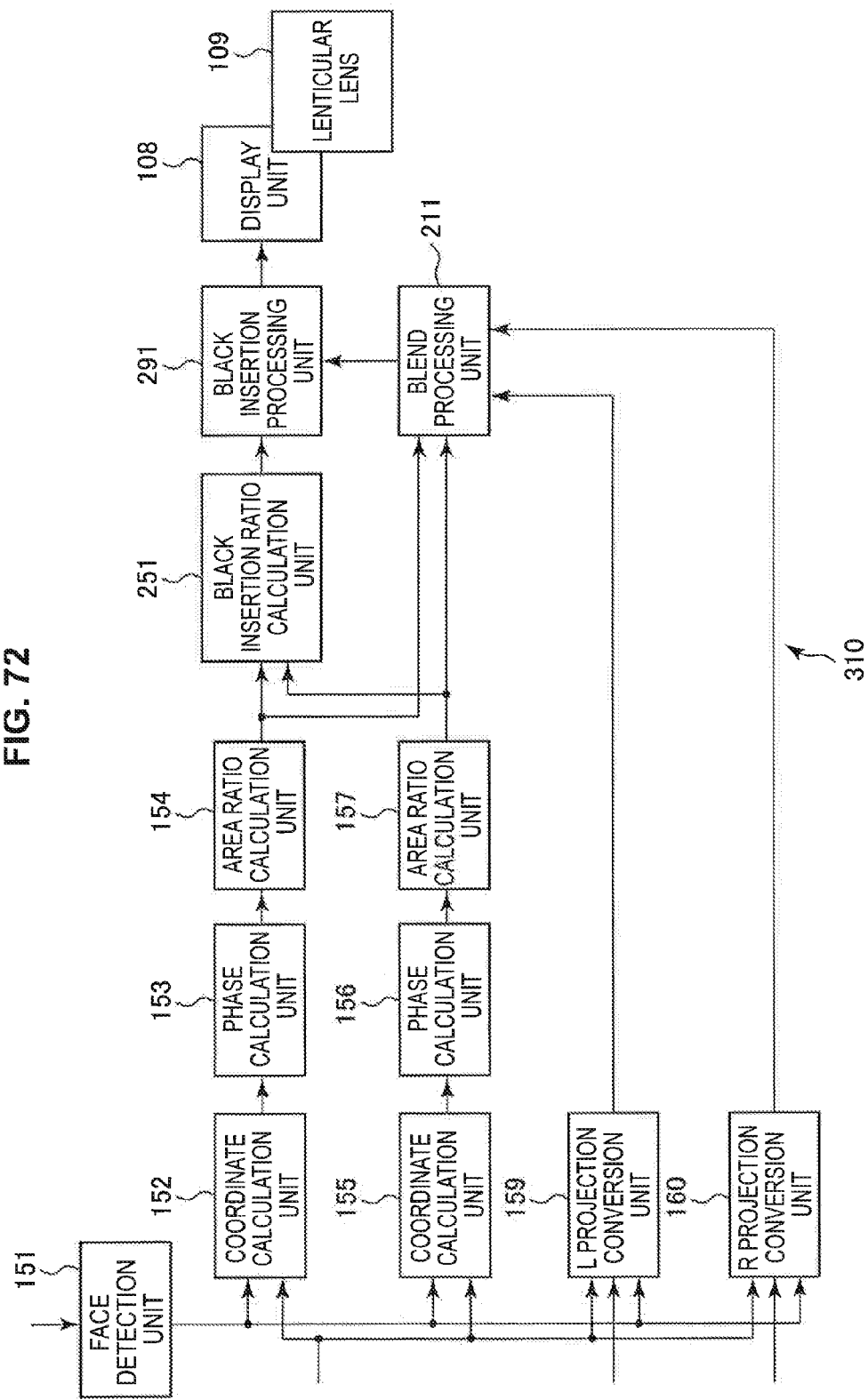
FIG. 72 is a block diagram illustrating a configuration example of an eighth embodiment of the image processing device to which the present technology is applied.

FIG. 72 is a block diagram illustrating a configuration example of an eighth embodiment of the image processing device to which the present technology is applied.

The same reference numerals are given to the constituent elements shown in FIG. 72 which are the same as those of FIGS. 55, 65 and 70. Overlapping description will be appropriately omitted.

The configuration of the image processing device 310 of FIG. 72 is different from that of the image processing device 210 of FIG. 55 in that the black insertion ratio calculation unit 251 and the black insertion processing unit 291 are newly provided.

The image processing device 310 of FIG. 72 is a combination of the third embodiment and the fifth embodiment, by which an image for the left eye and an image for the right eye are combined based on an area ratio area_r and an area ratio area_l using the expression (43) that considers characteristics of vision, the combined image is combined with a black image, and thereby a 3D image is generated.

<Description of a Process of the Image Processing Device>

Figure 73:
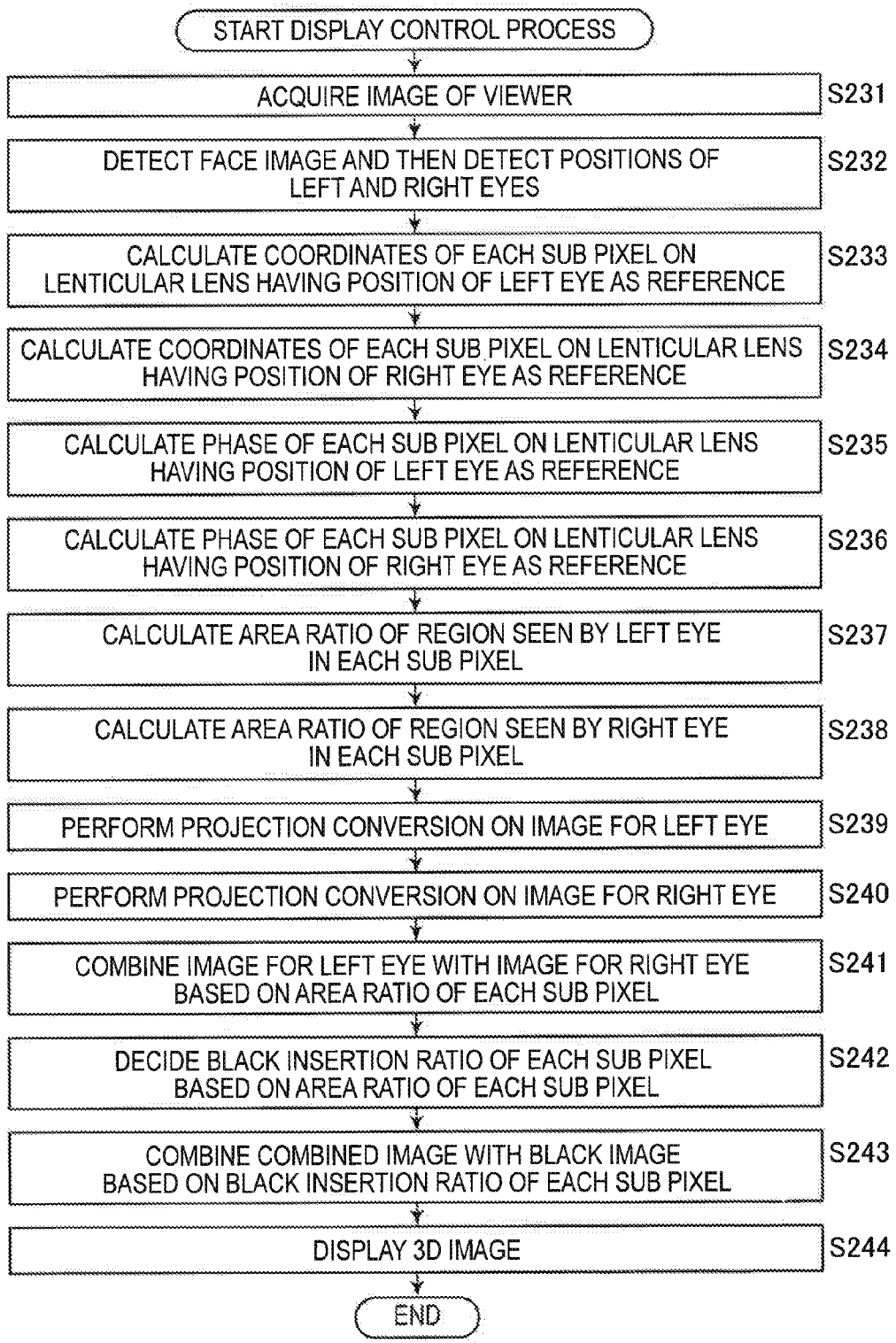
FIG. 73 is a flowchart for describing a display control process of the image processing device of FIG. 72.

FIG. 73 is a flowchart for describing a display control process of the image processing device 310 of FIG. 72. The display control process is started when, for example, an image for the left eye and an image for the right eye are input to the image processing device 310.

Since the processes of Steps S231 to S241 of FIG. 73 are the same as those of Steps S81 to S91 of FIG. 59, description thereof will be omitted. In addition, since the processes of Steps S242 to S244 are the same as those of Steps S213 to S215 of FIG. 71, description thereof will be omitted.

Ninth Embodiment

<Description of Computer to which Present Technology is Applied>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 74:
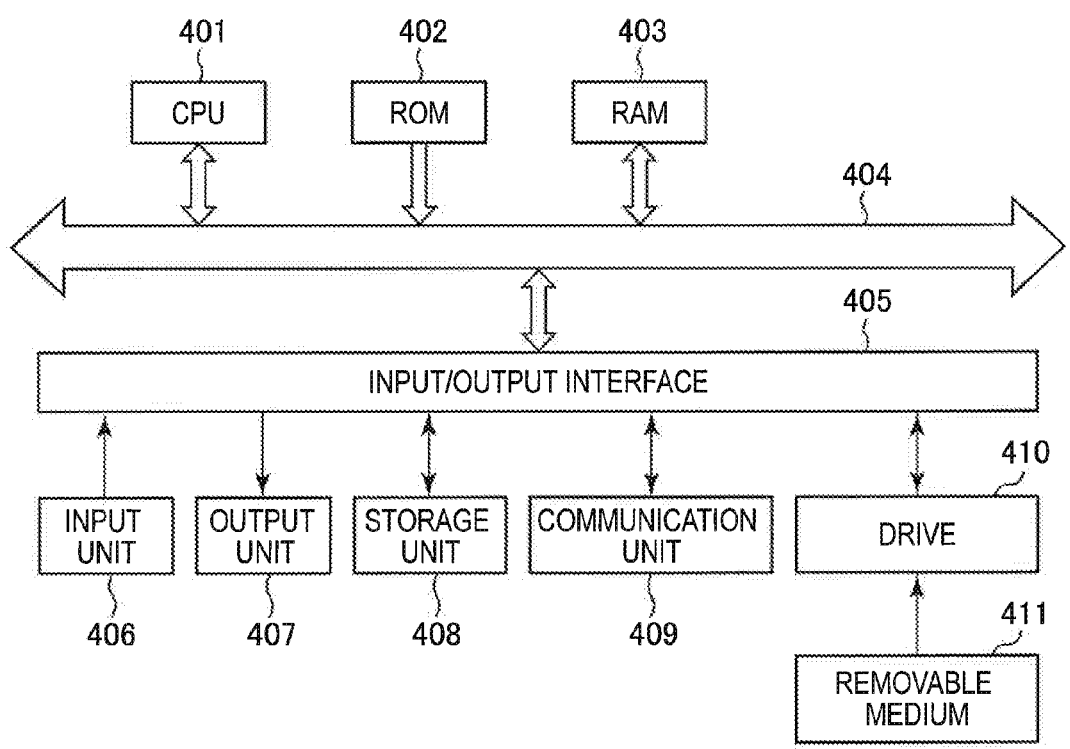
FIG. 74 is a block diagram illustrating a configuration example of hardware of a computer.

FIG. 74 is a block diagram showing an example configuration of the hardware of a computer that executes the series of processes described earlier according to a program.

In the computer, a central processing unit (CPU) 401, a read only memory (ROM) 402 and a random access memory (RAM) 403 are mutually connected by a bus 404.

An input/output interface 405 is also connected to the bus 404. An input unit 406, an output unit 407, a storage unit 408, a communication unit 409, and a drive 410 are connected to the input/output interface 405.

The input unit 406 is configured from a keyboard, a mouse, a microphone or the like. The output unit 407 is configured from a display, a speaker or the like. The storage unit 408 is configured from a hard disk, a non-volatile memory or the like. The communication unit 409 is configured from a network interface or the like. The drive 410 drives a removable media 411 such as a magnetic disk, an optical disk, a magneto-optical disk, a semiconductor memory or the like.

In the computer configured as described above, the CPU 401 loads a program that is stored, for example, in the storage unit 408 onto the RAM 403 via the input/output interface 405 and the bus 404, and executes the program. Thus, the above-described series of processing is performed.

Programs to be executed by the computer (the CPU 401) are provided being recorded in the removable media 411 which is a packaged media or the like. Also, programs may be provided via a wired or wireless transmission medium, such as a local area network, the Internet or digital satellite broadcasting.

In the computer, by inserting the removable media 411 into the drive 410, the program can be installed in the storage unit 408 via the input/output interface 405. Further, the program can be received by the communication unit 409 via a wired or wireless transmission media and installed in the storage unit 408. Moreover, the program can be installed in advance in the ROM 402 or the storage unit 408.

It should be noted that the program executed by a computer may be a program that is processed in time series according to the sequence described in this specification or a program that is processed in parallel or at necessary timing such as upon calling.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

The present technology can also be applied to, for example, a barrier type display device. In this case, the magnification ratio A is set to be 1, and the lenticular lens is replaced by a light shielding barrier as a light shielding unit.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An image processing device including:

a phase calculation unit configured to calculate a phase of pixels of a 3D image projected onto a light shielding unit that limits a region seen by a left eye and a region seen by a right eye of the 3D image displayed on a display unit; and a blend processing unit configured to combine an image for the left eye with an image for the right eye for each pixel based on the phase calculated by the phase calculation unit, the image for the left eye and the image for the right eye being included in the 3D image.

(2) The image processing device according to (1), further including:

an area ratio calculation unit configured to calculate area ratios of the region seen by the left eye and the region seen by the right eye in each pixel of the 3D image based on the phase calculated by the phase calculation unit, wherein the blend processing unit combines the image for the left eye with the image for the right eye for each pixel based on the area ratios calculated by the area ratio calculation unit.

(3) The image processing device according to (2), wherein the blend processing unit combines the image for the left eye with the image for the right eye for each pixel based on the area ratios calculated by the area ratio calculation unit using an expression that considers a characteristic of vision.

(4) The image processing device according to any one of (1) to (3), wherein the phase calculation unit calculates the phase based on a viewing position.

(5) The image processing device according to (4), wherein the phase calculation unit calculates the phase based on the viewing position using an expression that considers that a position of the light shielding unit in a vertical direction to a screen of the display unit differs according to a position thereof in a horizontal direction to the screen of the display unit.

(6) The image processing device according to (4) or (5), wherein the phase calculation unit calculates the phase based on the viewing position using an expression that considers that light emitted from the display unit is refracted by the light shielding unit.

(7) The image processing device according to any one of (1) to (6), further including:
a projection conversion unit configured to perform projection conversion on the image for the left eye and the image for the right eye based on a viewing position,
wherein the blend processing unit combines the image for the left eye with the image for the right eye, the image for the left eye and the image for the right eye having undergone projection conversion by the projection conversion unit.

(8) The image processing device according to any one of (1) to (7), further including:
a black insertion processing unit configured to combine a black image with an image obtained from the combination by the blend processing unit based on the phase calculated by the phase calculation unit.

(9) An image processing method including:
calculating, by an image processing device, a phase of pixels of a 3D image projected onto a light shielding unit that limits a region seen by a left eye and a region seen by a right eye of the 3D image displayed on a display unit; and
combining, by the image processing device, an image for the left eye and an image for the right eye included in the 3D image for each pixel based on the phase calculated in the step of calculating a phase.

(10) A program that causes a computer to function as:
a phase calculation unit configured to calculate a phase of pixels of a 3D image projected onto a light shielding unit that limits a region seen by a left eye and a region seen by a right eye of the 3D image displayed on a display unit; and
a blend processing unit configured to combine an image for the left eye with an image for the right eye for each pixel based on the phase calculated by the phase calculation unit, the image for the left eye and the image for the right eye being included in the 3D image.

What is claimed is:

1. An image processing device comprising:
a phase calculation unit configured to calculate a phase of pixels of a 3D image projected onto a light shielding unit that limits a region seen by a left eye and a region seen by a right eye of the 3D image displayed on a display unit; and
a blend processing unit configured to combine an image for the left eye with an image for the right eye for each pixel based on the phase calculated by the phase calculation unit, the image for the left eye and the image for the right eye being included in the 3D image,
wherein the phase calculation unit calculates the phase based on a viewing position using an expression that considers that a position of the light shielding unit in a vertical direction to a screen of the display unit differs according to a position thereof in a horizontal direction to the screen of the display unit,
wherein the display unit displays the combined images of the left and right eyes, and
wherein the phase calculation unit and the blend processing unit are each implemented via at least one processor.

2. The image processing device according to claim 1, further comprising:
an area ratio calculation unit configured to calculate area ratios of the region seen by the left eye and the region seen by the right eye in each pixel of the 3D image based on the phase calculated by the phase calculation unit,
wherein the blend processing unit combines the image for the left eye with the image for the right eye for each pixel based on the area ratios calculated by the area ratio calculation unit, and
wherein the area ratio calculation unit is implemented via at least one processor.

3. The image processing device according to claim 2, wherein the blend processing unit combines the image for the left eye with the image for the right eye for each pixel based on the area ratios calculated by the area ratio calculation unit using an expression that considers a characteristic of vision.

4. The image processing device according to claim 1, wherein the phase calculation unit calculates the phase based on the viewing position using an expression that considers that light emitted from the display unit is refracted by the light shielding unit.

5. The image processing device according to claim 1, further comprising:
a projection conversion unit configured to perform projection conversion on the image for the left eye and the image for the right eye based on a viewing position,
wherein the blend processing unit combines the image for the left eye with the image for the right eye, the image for the left eye and the image for the right eye having undergone projection conversion by the projection conversion unit, and
wherein the projection conversion unit is implemented via at least one processor.

6. The image processing device according to claim 1, further comprising:
a black insertion processing unit configured to combine a black image with an image obtained from the combination by the blend processing unit based on the phase calculated by the phase calculation unit,
wherein the black insertion processing unit is implemented via at least one processor.

7. An image processing method, the method being executed via at least one processor, and comprising:
calculating, by an image processing device, a phase of pixels of a 3D image projected onto a light shielding unit that limits a region seen by a left eye and a region seen by a right eye of the 3D image displayed on a display unit; and
combining, by the image processing device, an image for the left eye with an image for the right eye included in the 3D image for each pixel based on the calculated phase, the image for the left eye and the image for the right eye being included in the 3D image; and
displaying the combined images of the left and right eyes,
wherein the phase is calculated based on a viewing position using an expression that considers that a position of the light shielding unit in a vertical direction to a screen of the display unit differs according to a position thereof in a horizontal direction to the screen of the display unit.

8. A non-transitory computer-readable medium having stored thereon a program, which when executed by a computer causes the computer to execute a method, the method comprising:
calculating a phase of pixels of a 3D image projected onto a light shielding unit that limits a region seen by a left eye and a region seen by a right eye of the 3D image displayed on a display unit; and
combining an image for the left eye with an image for the right eye for each pixel based on the calculated phase, the image for the left eye and the image for the right eye being included in the 3D image; and
displaying the combined images of the left and right eyes, wherein the phase is calculated based on a viewing position using an expression that considers that a position of the light shielding unit in a vertical direction to a screen of the display unit differs according to a position thereof in a horizontal direction to the screen of the display unit.

* * * * *